United States Patent
Kon et al.

(10) Patent No.: US 10,690,895 B2
(45) Date of Patent: Jun. 23, 2020

(54) ZOOM LENS AND IMAGE PICKUP APPARATUS USING THE SAME

(71) Applicant: OLYMPUS CORPORATION, Hachioji-shi, Tokyo (JP)

(72) Inventors: Toyoki Kon, Hachioji (JP); Kazuteru Kawamura, Hachioji (JP); Yasuharu Yamada, Sagamihara (JP); Tetsuya Yanai, Akiruno (JP); Daichi Murakami, Hachioji (JP)

(73) Assignee: OLYMPUS CORPORATION, Tokyo (JP)

( * ) Notice: Subject to any disclaimer, the term of this patent is extended or adjusted under 35 U.S.C. 154(b) by 192 days.

(21) Appl. No.: 15/717,816

(22) Filed: Sep. 27, 2017

(65) Prior Publication Data
US 2018/0017770 A1     Jan. 18, 2018

Related U.S. Application Data

(63) Continuation of application No. PCT/JP2015/059793, filed on Mar. 27, 2015.

(51) Int. Cl.
*G02B 15/163*     (2006.01)
*G02B 13/00*     (2006.01)
(Continued)

(52) U.S. Cl.
CPC ......... *G02B 15/163* (2013.01); *G02B 13/009* (2013.01); *G02B 15/173* (2013.01); *G02B 15/20* (2013.01); *G02B 27/646* (2013.01)

(58) Field of Classification Search
CPC ...... G02B 15/163; G02B 15/22; G02B 15/14; G02B 15/173; G02B 15/177; G02B 15/20;
(Continued)

(56) References Cited

U.S. PATENT DOCUMENTS

| 5,847,882 A | 12/1998 | Nakayama |
| 5,956,184 A | 9/1999 | Sato |

(Continued)

FOREIGN PATENT DOCUMENTS

| JP | 08190051 A | 7/1996 |
| JP | 10133109 A | 5/1998 |

(Continued)

OTHER PUBLICATIONS

Japanese Office Action (and English language translation thereof) dated Oct. 3, 2018 issued in counterpart Japanese Application No. 2017-508867.

(Continued)

*Primary Examiner* — Jie Lei
(74) *Attorney, Agent, or Firm* — Holtz, Holtz & Volek PC

(57) ABSTRACT

A zoom lens includes in order from an object side, a first lens unit having a positive refractive power, a second lens unit having a negative refractive power, a third lens unit having a positive refractive power, a fourth lens unit having a negative refractive power, and a fifth lens unit having a positive refractive power. The first lens unit includes a positive lens, and the second lens unit includes a positive lens, and the following conditional expressions (1), (2), (3), and (4) are satisfied:

$$-0.015 \leq Tp_{2G\_min\_p} \leq 0.015 \qquad (1),$$

$$70.3 \leq vd_{1G\_max\_p} \qquad (2),$$

$$1.76 \leq nd_{2G\_max\_p} \leq 2.3 \qquad (3), \text{ and}$$

$$0.3 \leq |f_2/f_3| \leq 0.9 \qquad (4).$$

35 Claims, 34 Drawing Sheets

(51) Int. Cl.
  *G02B 15/20* (2006.01)
  *G02B 27/64* (2006.01)
  *G02B 15/173* (2006.01)

(58) Field of Classification Search
  CPC ...... G02B 27/64; G02B 27/646; G02B 21/02; G02B 7/10; G02B 13/18; G02B 13/04; G02B 13/00; G02B 13/009; G02B 13/24; G02B 9/60; G02B 9/34
  USPC ............... 359/557, 763, 764, 772, 773, 766, 359/657–660, 684, 686, 693, 695, 713, 359/714, 750–757
  See application file for complete search history.

(56) References Cited

U.S. PATENT DOCUMENTS

| | | | |
|---|---|---|---|
| 6,094,312 | A | 7/2000 | Nakayama |
| 6,404,561 | B1 | 6/2002 | Isono et al. |
| 7,280,286 | B2 | 10/2007 | Hayakawa |
| 8,456,747 | B2 | 6/2013 | Sakamoto |
| 2003/0165020 | A1 | 9/2003 | Satori et al. |
| 2006/0221460 | A1* | 10/2006 | Saruwatari ........... G02B 15/173 359/676 |
| 2007/0070521 | A1 | 3/2007 | Hayakawa |
| 2009/0251781 | A1* | 10/2009 | Adachi ................ G02B 15/161 359/557 |
| 2011/0080651 | A1 | 4/2011 | Sakamoto |
| 2011/0176224 | A1 | 7/2011 | Sato et al. |
| 2013/0194487 | A1* | 8/2013 | Eguchi .................. G02B 13/02 348/360 |
| 2014/0354857 | A1 | 12/2014 | Kato et al. |
| 2016/0025955 | A1 | 1/2016 | Ito |

FOREIGN PATENT DOCUMENTS

| | | |
|---|---|---|
| JP | 2001194590 A | 7/2001 |
| JP | 2003255228 A | 9/2003 |
| JP | 2007093975 A | 4/2007 |
| JP | 2007156251 A | 6/2007 |
| JP | 2007219315 A | 8/2007 |
| JP | 2009175324 A | 8/2009 |
| JP | 2010032702 A | 2/2010 |
| JP | 2010191199 A | 9/2010 |
| JP | 2011053296 A | 3/2011 |
| JP | 2011081065 A | 4/2011 |
| JP | 2013025085 A | 2/2013 |
| JP | 2014145807 A | 8/2014 |
| JP | 2014182180 A | 9/2014 |
| JP | 2014235238 A | 12/2014 |

OTHER PUBLICATIONS

International Preliminary Report on Patentability dated Oct. 12, 2017 issued in International Application No. PCT/JP2015/059793.

Chinese Office Action (and English language translation thereof) dated Apr. 11, 2019 issued in counterpart Chinese Application No. 201580078284.9.

Japanese Office Action dated May 28, 2018 (and English language translation thereof) issued in counterpart Japanese Application No. 2017-508867.

International Search Report (ISR) and Written Opinion dated Jun. 23, 2015 issued in International Application No. PCT/JP2015/059793.

Chinese Office Action dated Oct. 12, 2019 (and English translation thereof) issued in Chinese Application No. 201580078284.9.

* cited by examiner

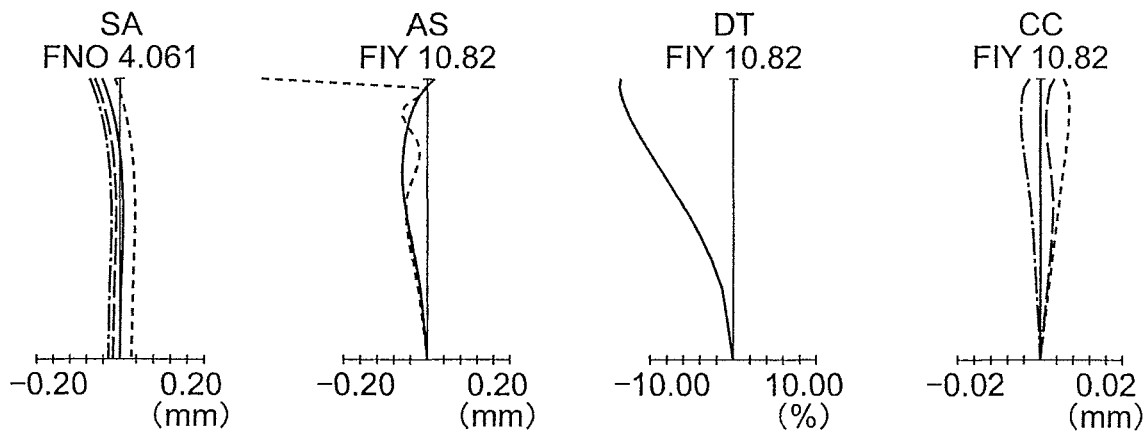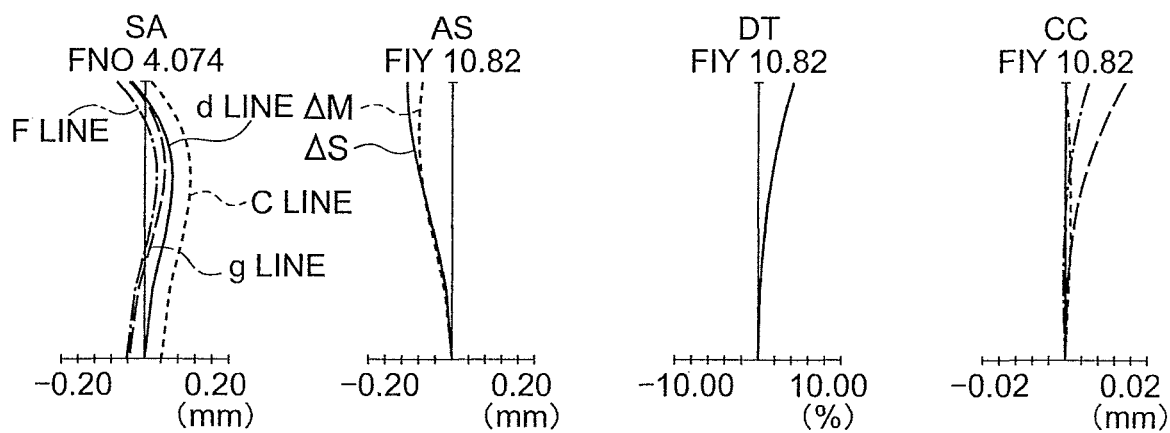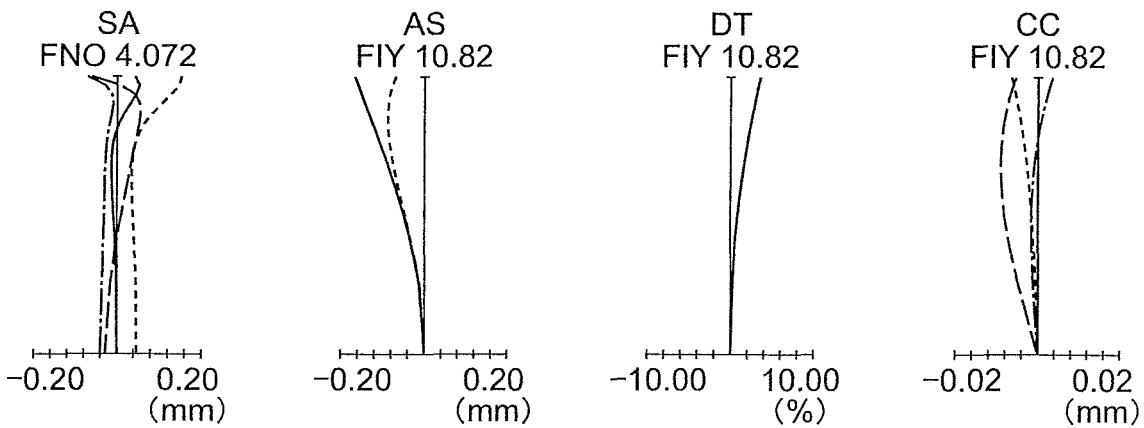

SA
FNO 4.082

-0.20  0.20
(mm)

AS
FIY 9.77

-0.20  0.20
(mm)

DT
FIY 9.77

-10.00  10.00
(%)

CC
FIY 9.77

-0.02  0.02
(mm)

SA
FNO 4.070

-0.20  0.20
(mm)

AS
FIY 10.82

-0.20  0.20
(mm)

DT
FIY 10.82

-10.00  10.00
(%)

CC
FIY 10.82

-0.02  0.02
(mm)

SA
FNO 4.053

-0.20  0.20
(mm)

AS
FIY 10.82

-0.20  0.20
(mm)

DT
FIY 10.82

-10.00  10.00
(%)

CC
FIY 10.82

-0.02  0.02
(mm)

SA
FNO 4.075

AS
FIY 9.84

DT
FIY 9.84

CC
FIY 9.84

SA
FNO 4.075

AS
FIY 10.82

DT
FIY 10.82

CC
FIY 10.82

SA
FNO 4.073

AS
FIY 10.82

DT
FIY 10.82

CC
FIY 10.82

FIG.19A  FIG.19B  FIG.19C  FIG.19D
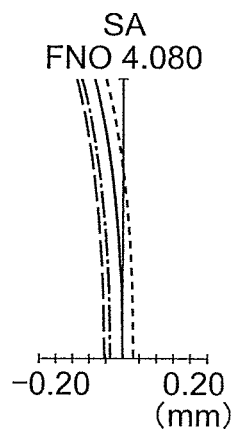 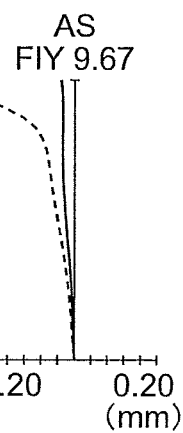 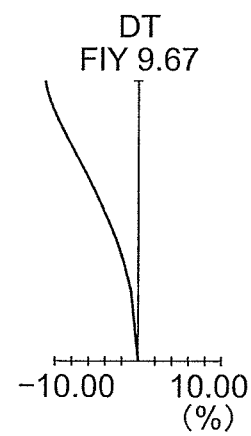 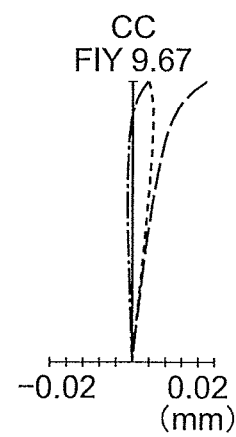
FIG.19E  FIG.19F  FIG.19G  FIG.19H
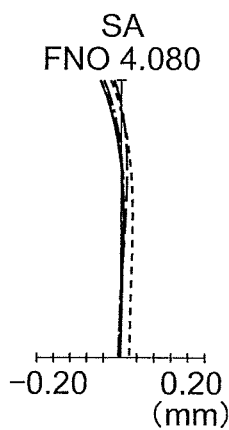 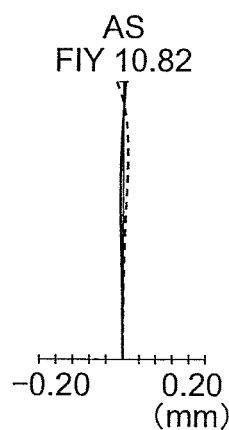 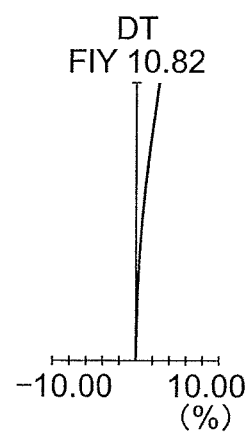 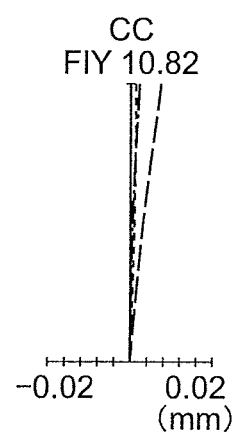
FIG.19I  FIG.19J  FIG.19K  FIG.19L
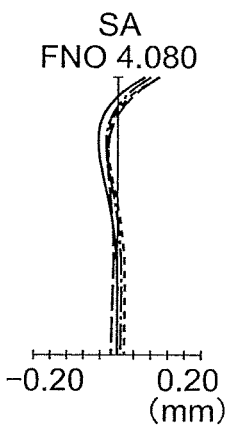 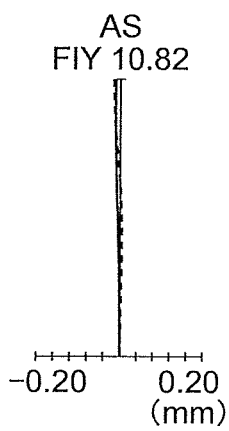 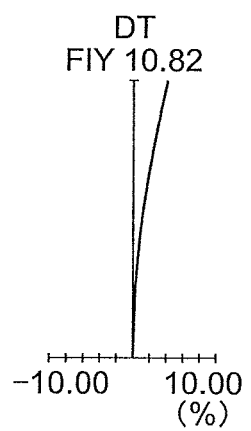 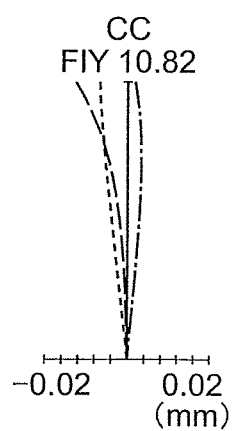

SA
FNO 4.080

-0.20  0.20
(mm)

AS
FIY 9.77

-0.20  0.20
(mm)

DT
FIY 9.77

-10.00  10.00
(%)

CC
FIY 9.77

-0.02  0.02
(mm)

SA
FNO 4.079

-0.20  0.20
(mm)

AS
FIY 10.82

-0.20  0.20
(mm)

DT
FIY 10.82

-10.00  10.00
(%)

CC
FIY 10.82

-0.02  0.02
(mm)

SA
FNO 4.080

-0.20  0.20
(mm)

AS
FIY 10.82

-0.20  0.20
(mm)

DT
FIY 10.82

-10.00  10.00
(%)

CC
FIY 10.82

-0.02  0.02
(mm)

SA
FNO 4.058
-0.20  0.20
(mm)

AS
FIY 9.94
-0.20  0.20
(mm)

DT
FIY 9.94
-10.00  10.00
(%)

CC
FIY 9.94
-0.02  0.02
(mm)

SA
FNO 4.064
-0.20  0.20
(mm)

AS
FIY 10.82
-0.20  0.20
(mm)

DT
FIY 10.82
-10.00  10.00
(%)

CC
FIY 10.82
-0.02  0.02
(mm)

SA
FNO 4.078
-0.20  0.20
(mm)

AS
FIY 10.82
-0.20  0.20
(mm)

DT
FIY 10.82
-10.00  10.00
(%)

CC
FIY 10.82
-0.02  0.02
(mm)

SA
FNO 4.080

-0.20　0.20
(mm)

AS
FIY 9.67

-0.20　0.20
(mm)

DT
FIY 9.67

-10.00　10.00
(%)

CC
FIY 9.67

-0.02　0.02
(mm)

SA
FNO 4.080

-0.20　0.20
(mm)

AS
FIY 10.82

-0.20　0.20
(mm)

DT
FIY 10.82

-10.00　10.00
(%)

CC
FIY 10.82

-0.02　0.02
(mm)

SA
FNO 4.079

-0.20　0.20
(mm)

AS
FIY 10.82

-0.20　0.20
(mm)

DT
FIY 10.82

-10.00　10.00
(%)

CC
FIY 10.82

-0.02　0.02
(mm)

SA
FNO 2.878
-0.20  0.20
(mm)

AS
FIY 9.94
-0.20  0.20
(mm)

DT
FIY 9.94
-10.00  10.00
(%)

CC
FIY 9.94
-0.02  0.02
(mm)

SA
FNO 3.860
-0.20  0.20
(mm)

AS
FIY 10.82
-0.20  0.20
(mm)

DT
FIY 10.82
-10.00  10.00
(%)

CC
FIY 10.82
-0.02  0.02
(mm)

SA
FNO 4.043
-0.20  0.20
(mm)

AS
FIY 10.82
-0.20  0.20
(mm)

DT
FIY 10.82
-10.00  10.00
(%)

CC
FIY 10.82
-0.02  0.02
(mm)

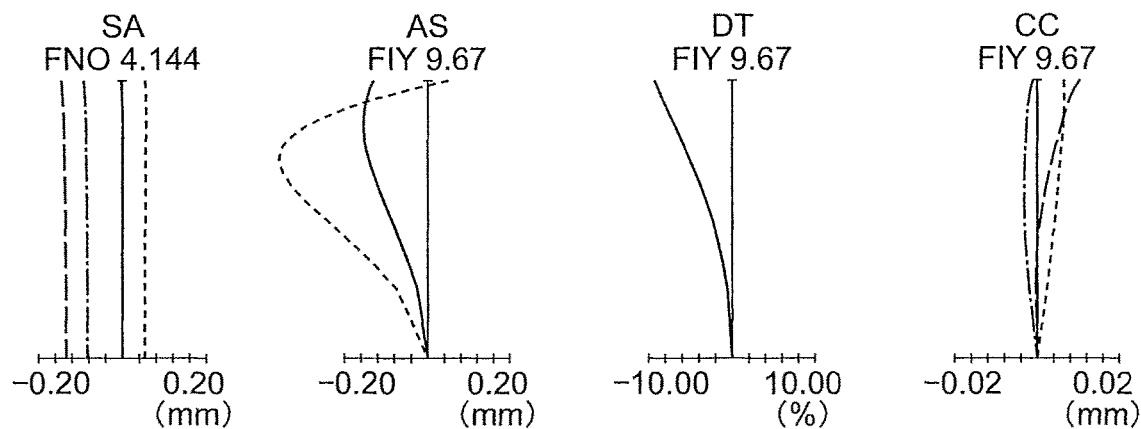
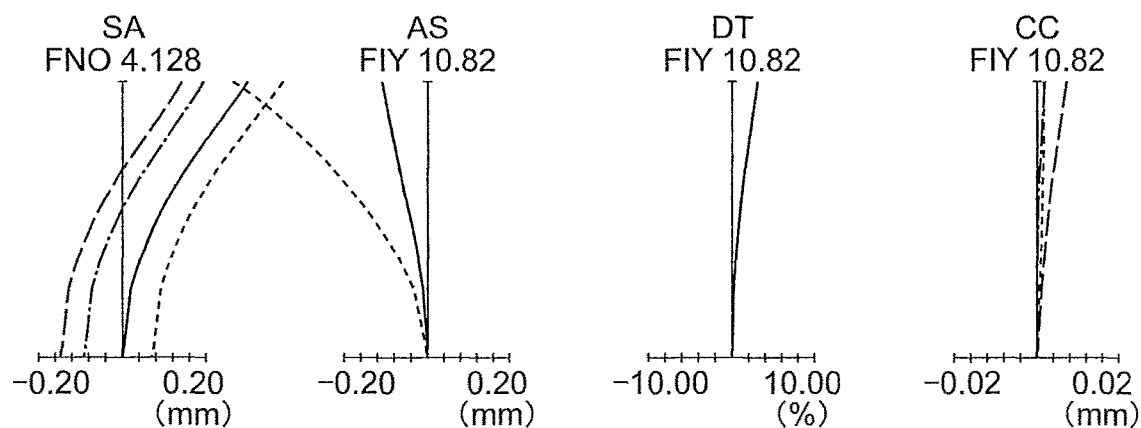
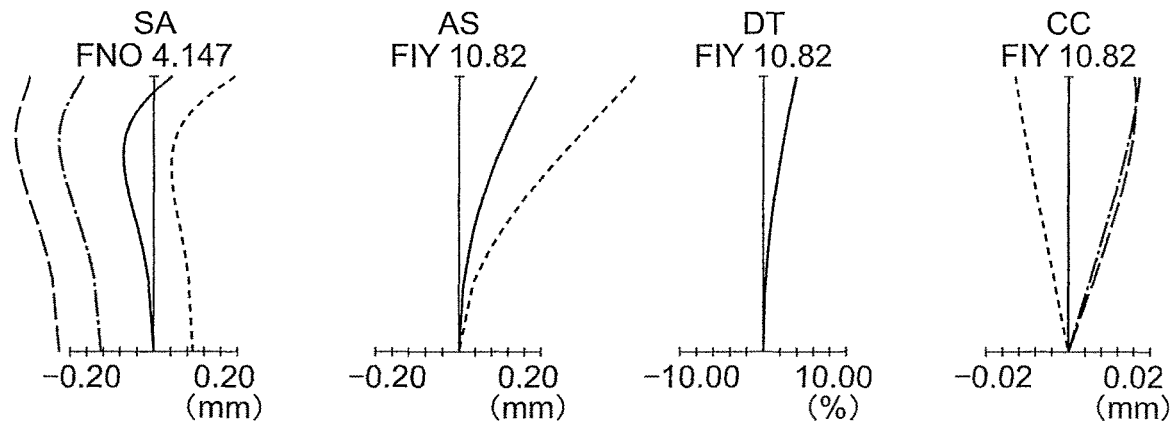

SA
FNO 4.100
-0.20  0.20
(mm)

AS
FIY 9.67
-0.20  0.20
(mm)

DT
FIY 9.67
-10.00  10.00
(%)

CC
FIY 9.67
-0.02  0.02
(mm)

SA
FNO 4.100
-0.20  0.20
(mm)

AS
FIY 10.82
-0.20  0.20
(mm)

DT
FIY 10.82
-10.00  10.00
(%)

CC
FIY 10.82
-0.02  0.02
(mm)

SA
FNO 4.100
-0.20  0.20
(mm)

AS
FIY 10.82
-0.20  0.20
(mm)

DT
FIY 10.82
-10.00  10.00
(%)

CC
FIY 10.82
-0.02  0.02
(mm)

SA
FNO 4.100

AS
FIY 9.89

DT
FIY 9.89

CC
FIY 9.89

SA
FNO 4.100

AS
FIY 10.79

DT
FIY 10.79

CC
FIY 10.79

SA
FNO 4.100

AS
FIY 10.77

DT
FIY 10.77

CC
FIY 10.77

SA
FNO 4.040

AS
FIY 9.54

DT
FIY 9.54

CC
FIY 9.54

SA
FNO 4.046

AS
FIY 10.79

DT
FIY 10.79

CC
FIY 10.79

SA
FNO 4.056

AS
FIY 10.77

DT
FIY 10.77

CC
FIY 10.77

SA
FNO 4.078

AS
FIY 9.94

DT
FIY 9.94

CC
FIY 9.94

SA
FNO 4.080

AS
FIY 10.78

DT
FIY 10.78

CC
FIY 10.78

SA
FNO 4.083

AS
FIY 10.76

DT
FIY 10.76

CC
FIY 10.76

SA
FNO 4.080

-0.20  0.20
(mm)

AS
FIY 9.78

-0.20  0.20
(mm)

DT
FIY 9.78

-10.00  10.00
(%)

CC
FIY 9.78

-0.02  0.02
(mm)

SA
FNO 4.080

-0.20  0.20
(mm)

AS
FIY 10.78

-0.20  0.20
(mm)

DT
FIY 10.78

-10.00  10.00
(%)

CC
FIY 10.78

-0.02  0.02
(mm)

SA
FNO 4.080

-0.20  0.20
(mm)

AS
FIY 10.76

-0.20  0.20
(mm)

DT
FIY 10.76

-10.00  10.00
(%)

CC
FIY 10.76

-0.02  0.02
(mm)

ZOOM LENS AND IMAGE PICKUP APPARATUS USING THE SAME

CROSS-REFERENCE TO RELATED APPLICATION

The present application is a continuation application of International Application No. PCT/JP2015/059793 filed on Mar. 27, 2015 the entire contents of which are incorporated herein by reference.

BACKGROUND OF THE INVENTION

Field of the Invention

The present invention relates to a zoom lens and an image pickup apparatus using the same.

Description of the Related Art

As a zoom lens capable of wide-angle photography and telephotography, zoom lenses described in Japanese Patent Application Laid-open Publication No. 2003-255228 (second example) and Japanese Patent Application Laid-open Publication No. Hei 8-190051 (first example) are available.

SUMMARY OF THE INVENTION

A zoom lens according to an aspect of the present invention comprises in order from an object side,
a first lens unit having a positive refractive power,
a second lens unit having a negative refractive power,
a third lens unit having a positive refractive power,
a fourth lens unit having a negative refractive power, and
a fifth lens unit having a positive refractive power, wherein
the first lens unit includes a positive lens, and
the second lens unit includes a positive lens, and
the following conditional expressions (1), (2), (3), and (4) are satisfied:

$$-0.015 \leq Tp_{2G\_min\_p} \leq 0.015 \quad (1),$$

$$70.3 \leq vd_{1G\_max\_p} \quad (2),$$

$$1.76 \leq nd_{2G\_max\_p} \leq 2.3 \quad (3), \text{ and}$$

$$0.3 \leq |f_2/f_3| \leq 0.9 \quad (4)$$

where,
$Tp_{2G\_min\_p} = \theta gF_{2G\_p} - (-0.0016 \times vd_{2G\_p} + 0.6415)$,
$\theta gF_{2G\_p} = (ng_{2G\_p} - nF_{2G\_p})/(nF_{2G\_p} - nC_{2G\_p})$
$vd_{2G\_p}$ denotes Abbe number for a predetermined positive lens in the second lens unit,
$ng_{2G\_p}$, $nF_{2G\_p}$, and $nC_{2G\_p}$ denote refractive indices of the predetermined positive lens in the second lens unit, for a g-line, for an F-line, and for a C-line respectively, here
the predetermined positive lens in the second lens unit is a lens for which Abbe number is the smallest, from among the positive lenses in the second lens unit,
$vd_{1G\_max\_p}$ denotes a maximum Abbe number from among Abbe numbers for the positive lenses in the first lens unit,
$nd_{2G\_max\_p}$ denotes a maximum refractive index from among refractive indices of the positive lenses in the second lens unit,
$f_2$ denotes a focal length of the second lens unit, and
$f_3$ denotes a focal length of the third lens unit.

Moreover, a zoom lens according to another aspect of the present invention comprises in order from an object side,
a first lens unit having a positive refractive power,
a second lens unit having a negative refractive power,
a third lens unit having a positive refractive power,
a fourth lens unit having a negative refractive power, and
a fifth lens unit having a positive refractive power, wherein
the first lens unit includes a positive lens, and
the second lens unit includes a positive lens, and
the following conditional expressions (1), (2'), (3'), and (5) are satisfied:

$$-0.015 \leq Tp_{2G\_min\_p} \leq 0.015 \quad (1),$$

$$70.5 \leq vd_{1G\_max\_p} \quad (2'),$$

$$1.7 \leq nd_{2G\_max\_p} \leq 2.3 \quad (3'), \text{ and}$$

$$2.0 \leq f_1/f_3 \leq 6.3 \quad (5)$$

where,
$Tp_{2G\_min\_p} = \theta gF_{2G\_p} - (-0.0016 \times vd_{2G\_p} + 0.6415)$,
$\theta gF_{2G\_p} = (ng_{2G\_p} - nF_{2G\_p})/(nF_{2G\_p} - nC_{2G\_p})$
$vd_{2G\_p}$ denotes Abbe number for a predetermined positive lens in the second lens unit,
$ng_{2G\_p}$, $nF_{2G\_p}$, and $nC_{2G\_p}$ denote refractive indices of the predetermined positive lens in the second lens unit, for a g-line, for an F-line, and for a C-line respectively, here
the predetermined positive lens in the second lens unit is a lens for which Abbe number is the smallest, from among the positive lenses in the second lens unit,
$vd_{1G\_max\_p}$ denotes a maximum Abbe number from among Abbe numbers for the positive lenses in the first lens unit,
$nd_{2G\_max\_p}$ denotes a maximum refractive index from among refractive indices of the positive lenses in the second lens unit,
$f_1$ denotes a focal length of the first lens unit, and
$f_3$ denotes a focal length of the third lens unit.

Moreover, a zoom lens according to still another aspect of the present invention comprises in order from an object side,
a first lens unit having a positive refractive power,
a second lens unit having a negative refractive power,
a third lens unit having a positive refractive power,
a fourth lens unit having a negative refractive power, and
a fifth lens unit having a positive refractive power, wherein
the first lens unit includes a positive lens, and
the second lens unit includes a positive lens, and
the following conditional expressions (1), (2"), (3'), and (6) are satisfied:

$$-0.015 \leq Tp_{2G\_min\_p} \leq 0.015 \quad (1),$$

$$64 \leq vd_{1G\_max\_p} \quad (2"),$$

$$1.7 \leq nd_{2G\_max\_p} \leq 2.3 \quad (3'), \text{ and}$$

$$1.05 \leq |\Phi_{max}/f_2| \leq 3.0 \quad (6)$$

where,
$Tp_{2G\_min\_p} = \theta gF_{2G\_p} - (-0.0016 \times vd_{2G\_p} + 0.6415)$,
$\theta gF_{2G\_p} = (ng_{2G\_p} - nF_{2G\_p})/(nF_{2G\_p} - nC_{2G\_p})$
$vd_{2G\_p}$ denotes Abbe number for a predetermined positive lens in the second lens unit,
$ng_{2G\_p}$, $nF_{2G\_p}$, and $nC_{2G\_p}$ denote refractive indices of the predetermined positive lens in the second lens unit, for a g-line, for an F-line, and for a C-line respectively, here the predetermined positive lens in the second lens unit is a lens for which Abbe number is the smallest, from among the positive lenses in the second lens unit, $vd_{1G\_max\_p}$ denotes a maximum Abbe number from among Abbe numbers for the positive lenses in the first lens unit, $nd_{2G\_max\_p}$ denotes a maximum refractive index from among refractive indices of the positive lenses in the second lens unit, $\Phi_{maxt}$ denotes a maximum diameter of an entrance pupil at a telephoto end, and is expressed by $\Phi_{maxt}=f_t/Fno_t$, here $f_t$ denotes a focal length of the overall zoom lens system at the telephoto end, and $Fno_t$ denotes a smallest F-number at the telephoto end, and $f_2$ denotes a focal length of the second lens unit.

Moreover, a zoom lens according to still another aspect of the present invention, comprises in order from an object side, a first lens unit having a positive refractive power,
a second lens unit having a negative refractive power,
a third lens unit having a positive refractive power,
a fourth lens unit having a negative refractive power, and
a fifth lens unit having a positive refractive power, wherein
the first lens unit includes a positive lens, and
the second lens unit includes a negative lens, and
the third lens unit includes a positive lens, and
the fourth lens unit includes a negative lens and a positive lens, and
the fifth lens unit includes a positive lens, and
the following conditional expressions (2), (7), (8), (9), and (10) are satisfied:

$$70.3 \leq vd_{1G\_max\_p} \quad (2),$$

$$54 \leq vd_{2G\_max\_n} \quad (7),$$

$$63 \leq vd_{3G\_max\_p} \quad (8),$$

$$1.0 \leq vd_{4G\_max\_n} - vd_{4G\_min\_p} \leq 50 \quad (9), \text{ and}$$

$$23 \leq vd_{5G\_min\_p} \quad (10)$$

where, $vd_{1G\_max\_p}$ denotes a maximum Abbe number from among Abbe numbers for the positive lenses in the first lens unit, $vd_{2G\_max\_n}$ denotes a maximum Abbe number from among Abbe numbers for the negative lenses in the second lens unit, $vd_{3G\_max\_p}$ denotes a maximum Abbe number from among Abbe numbers for the positive lenses in the third lens unit, $vd_{4G\_max\_n}$ denotes a maximum Abbe number from among Abbe numbers for the negative lenses in the fourth lens unit, $vd_{4G\_min\_p}$ denotes a minimum Abbe number from among Abbe numbers for the positive lenses in the fourth lens unit, and $vd_{5G\_min\_p}$ denotes a minimum Abbe number from among Abbe numbers for the positive lenses in the fifth lens unit.

Moreover, a zoom lens according to still another aspect of the present invention comprises in order from an object side, a first lens unit having a positive refractive power,
a second lens unit having a negative refractive power,
a third lens unit having a positive refractive power,
a fourth lens unit having a negative refractive power, and
a fifth lens unit having a positive refractive power, wherein
the first lens unit includes a positive lens, and
the second lens unit includes a negative lens, and
the third lens unit includes a positive lens, and
the second lens unit includes a negative lens having a concave surface directed toward an image side, which is positioned nearest to object, and
in the negative lens which is positioned nearest to object, an absolute value of a radius of curvature of an image-side surface is smaller as compared to an absolute value of a radius of curvature of an object-side surface, and
the following conditional expressions (2), (7'), (8'), (11), and (12) are satisfied:

$$70.3 \leq vd_{1G\_max\_p} \quad (2),$$

$$55 \leq vd_{2G\_max\_n} \quad (7'),$$

$$70.5 \leq vd_{3G\_max\_p} \quad (8'),$$

$$-0.012 \leq Tp_{2G\_max\_n} \leq 0.06 \quad (11), \text{ and}$$

$$1.78 \leq nd_{2G\_max\_n} \leq 2.3 \quad (12)$$

where, $vd_{1G\_max\_p}$ denotes a maximum Abbe number from among Abbe numbers for the positive lenses in the first lens unit, $vd_{2G\_max\_n}$ denotes a maximum Abbe number from among Abbe numbers for the negative lenses in the second lens unit, $vd_{3G\_max\_p}$ denotes a maximum Abbe number from among Abbe numbers for the positive lenses in the third lens unit, $Tp_{2G\_max\_n} = \theta gF_{2G\_n} - (-0.0016 \times vd_{2G\_n} + 0.6415)$,
$\theta gF_{2G\_n} = (ng_{2G\_n} - nF_{2G\_n})/(nF_{2G\_n} - nC_{2G\_n})$ $vd_{2G\_n}$ denotes Abbe number for a predetermined negative lens in the second lens unit, $ng_{2G\_n}$, $nF_{2G\_n}$, and $nC_{2G\_n}$ denote refractive indices of the predetermined negative lens in the second lens unit, for a g-line, for an F-line, and for a C-line respectively, here the predetermined negative lens in the second lens unit is a lens for which Abbe number is the largest, from among the negative lenses in the second lens unit, and $nd_{2G\_max\_n}$ denotes a maximum refractive index from among refractive indices of the negative lenses in the second lens unit.

Moreover, an image pickup apparatus according to the present invention comprises:

the zoom lens described above, and
an image pickup element which has an image pickup surface.

BRIEF DESCRIPTION OF THE DRAWINGS

FIG. 10A, FIG. 10B, and FIG. 100 are lens cross-sectional views of a zoom lens according to an example 10;

FIG. 12A, FIG. 12B, and FIG. 120 are lens cross-sectional views of a zoom lens according to an example 12;

FIG. 16A, FIG. 16B, FIG. 160, FIG. 16D, FIG. 16E, FIG. 16F, FIG. 16G, FIG. 16H, FIG. 16I, FIG. 16J, FIG. 16K, and FIG. 16L are aberration diagrams of the zoom lens according to the example 1;

FIG. 19A, FIG. 19B, FIG. 19C, FIG. 19D, FIG. 19E, FIG. 19F, FIG. 19G, FIG. 19H, FIG. 19I, FIG. 19J, FIG. 19K, and FIG. 19L are aberration diagrams of the zoom lens according to the example 4;

FIG. 22A, FIG. 22B, FIG. 22C, FIG. 22D, FIG. 22E, FIG. 22F, FIG. 22G, FIG. 223, FIG. 22I, FIG. 22J, FIG. 22K, and FIG. 22L are aberration diagrams of the zoom lens according to the example 7;

FIG. 24A, FIG. 24B, FIG. 24C, FIG. 240, FIG. 24E, FIG. 24F, FIG. 24G, FIG. 24H, FIG. 24I, FIG. 24J, FIG. 24K, and FIG. 24L are aberration diagrams of the zoom lens according to the example 9;

FIG. 29A, FIG. 29B, FIG. 29C, FIG. 29D, FIG. 29E, FIG. 29F, FIG. 29G, FIG. 29H, FIG. 29I, FIG. 29J, FIG. 29K, and FIG. 29L are aberration diagrams of the zoom lens according to the example 14;

FIG. 30A, FIG. 30B, FIG. 30C, FIG. 30D, FIG. 30E, FIG. 30F, FIG. 300, FIG. 30H, FIG. 30I, FIG. 30J, FIG. 30K, and FIG. 30L are aberration diagrams of the zoom lens according to the example 15;

DETAILED DESCRIPTION OF THE INVENTION

Figure 1A:
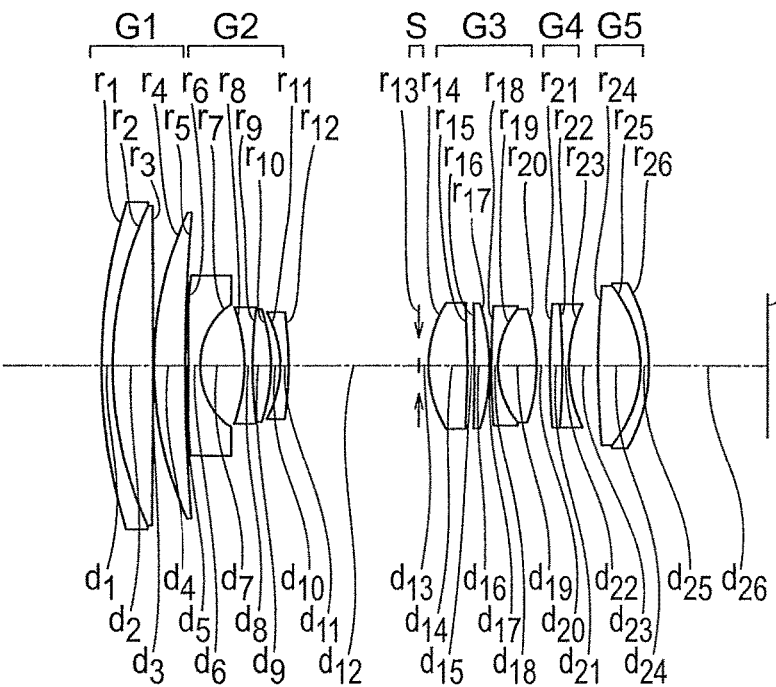
FIG. 1A, FIG. 1B, and FIG. 1C are lens cross-sectional views of a zoom lens according to an example 1.
Figure 1B:
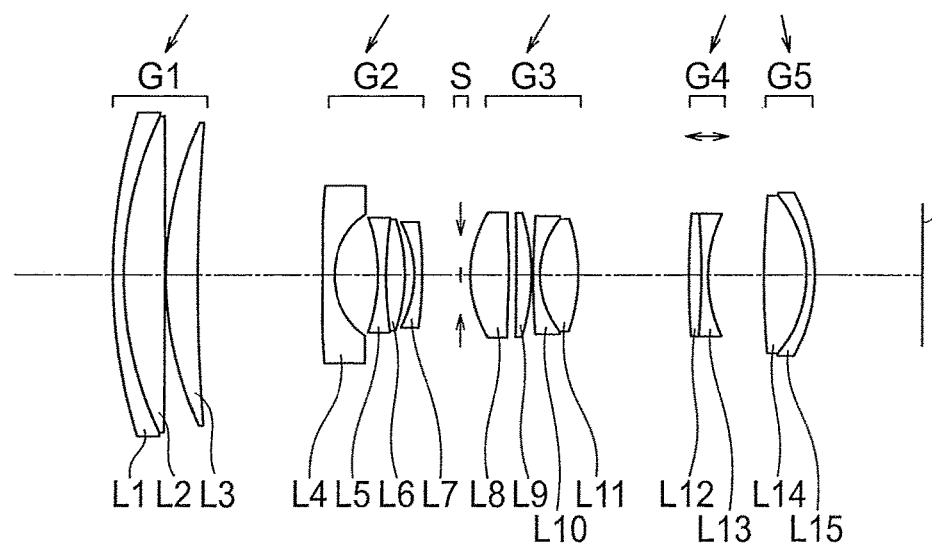
Figure 1C:
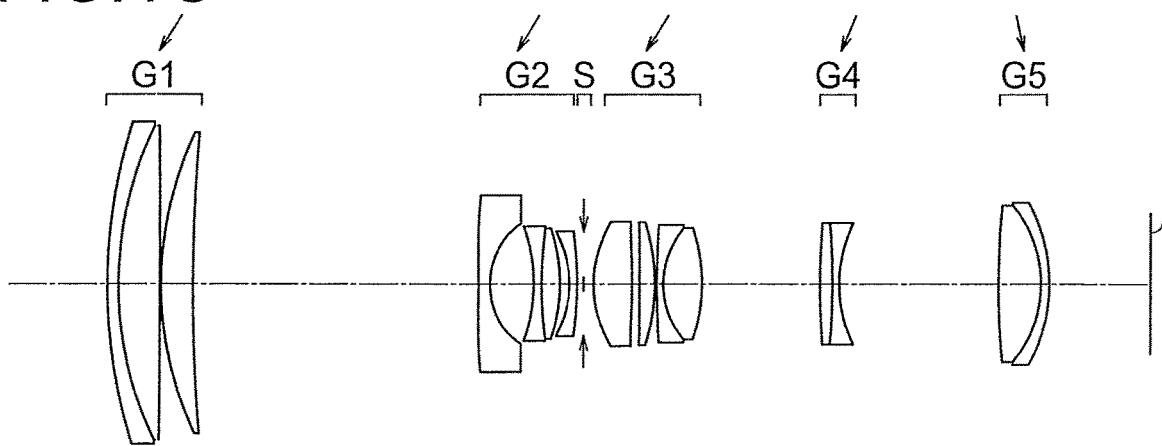
Figure 2A:
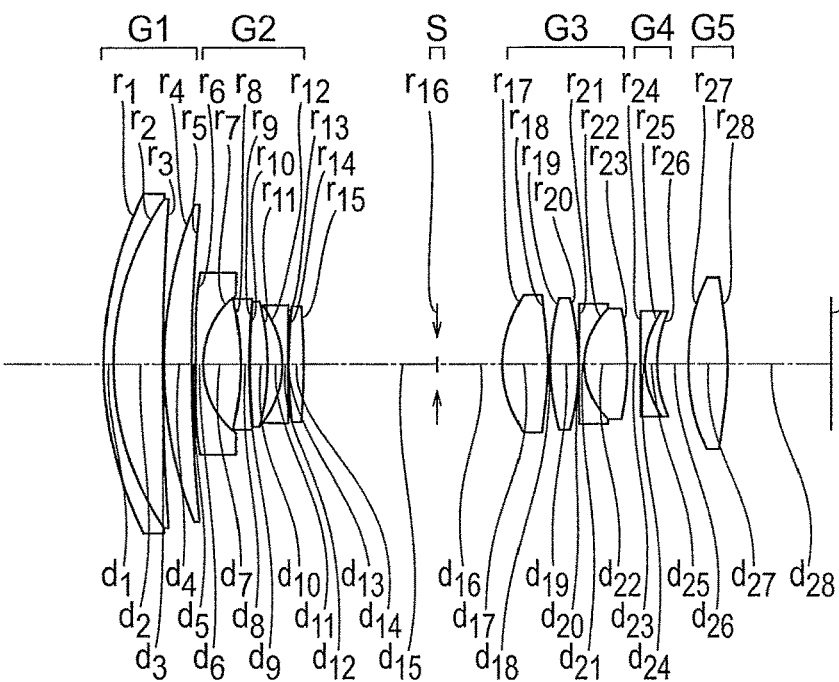
FIG. 2A, FIG. 2B, and FIG. 2C are lens cross-sectional views of a zoom lens according to an example 2.
Figure 2B:
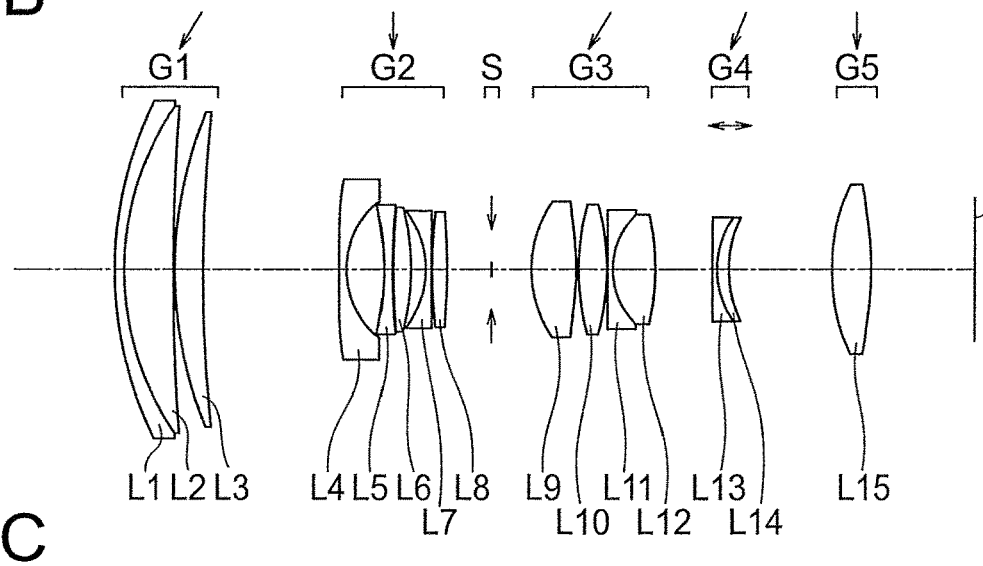
Figure 2C:
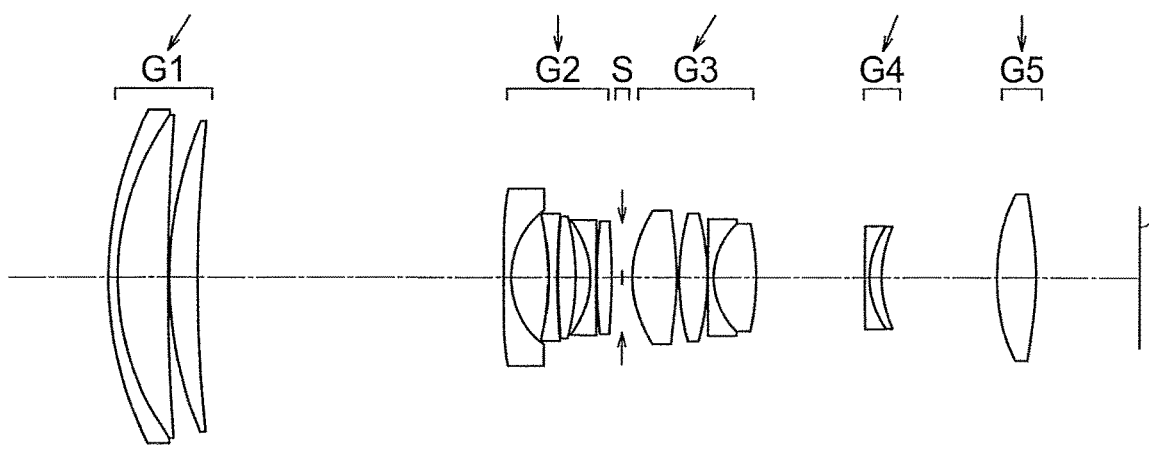
Figure 3A:
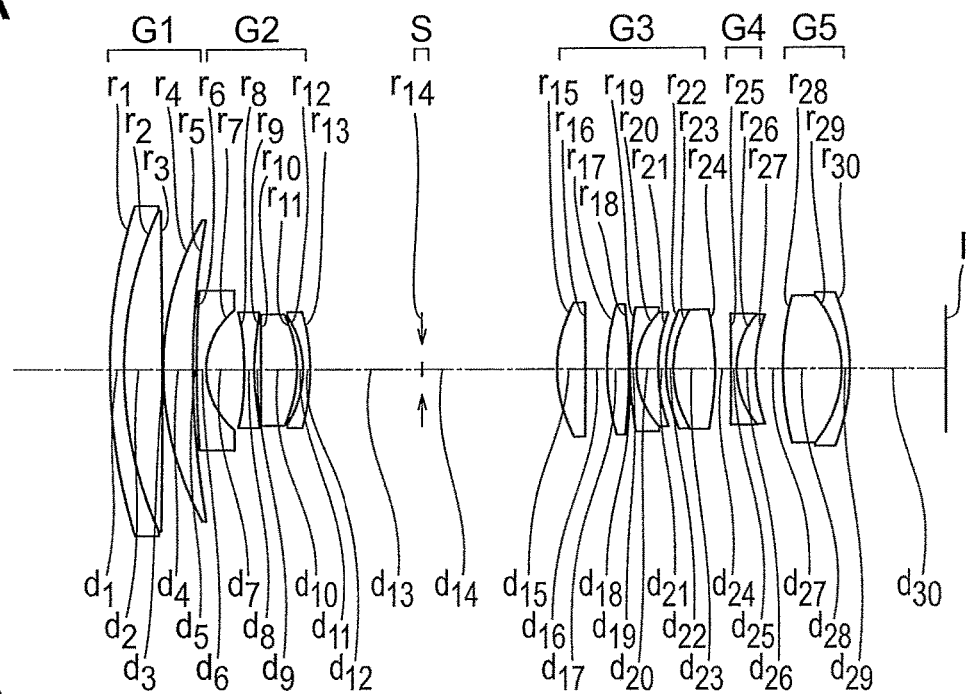
FIG. 3A, FIG. 3B, and FIG. 3C are lens cross-sectional views of a zoom lens according to an example 3.
Figure 3B:
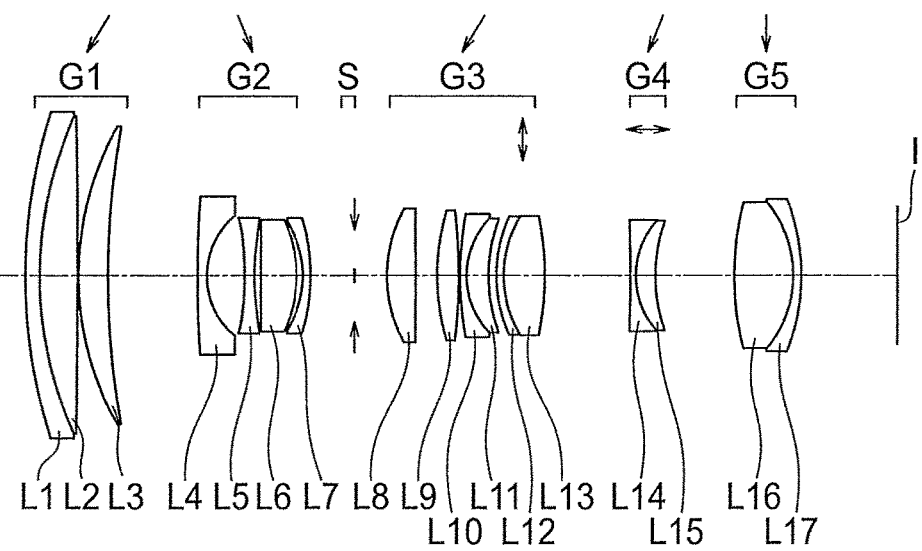
Figure 3C:
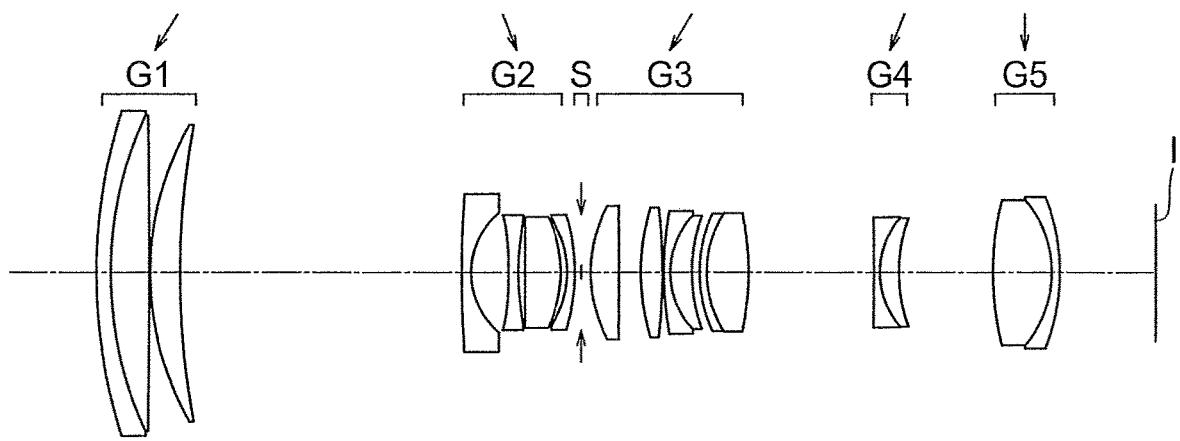
Figure 4A:
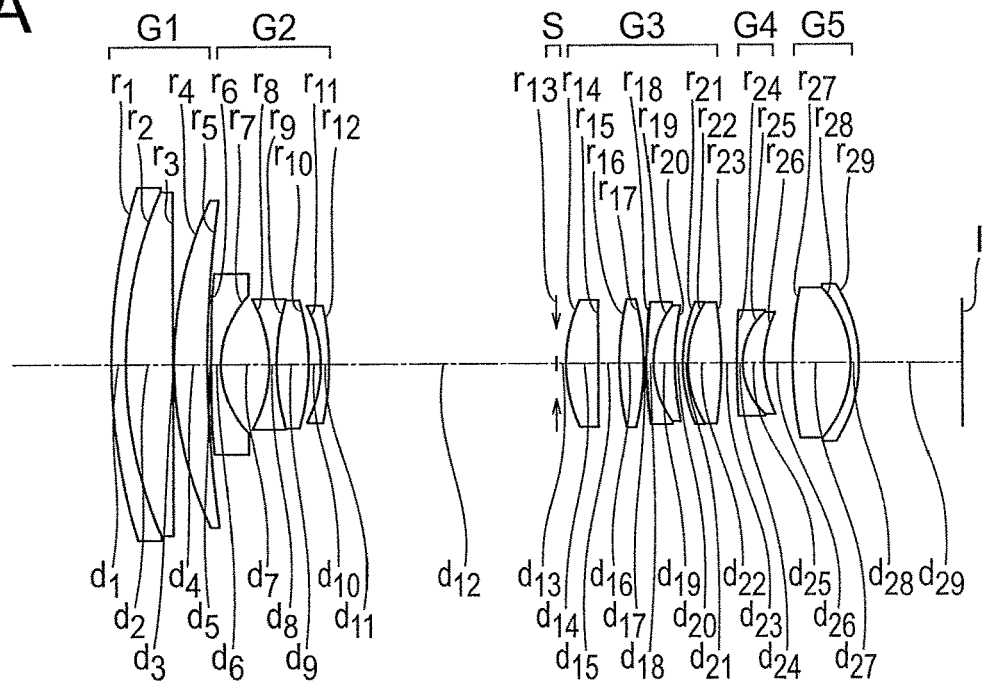
FIG. 4A, FIG. 4B, and FIG. 4C are lens cross-sectional views of a zoom lens according to an example 4.
Figure 4B:
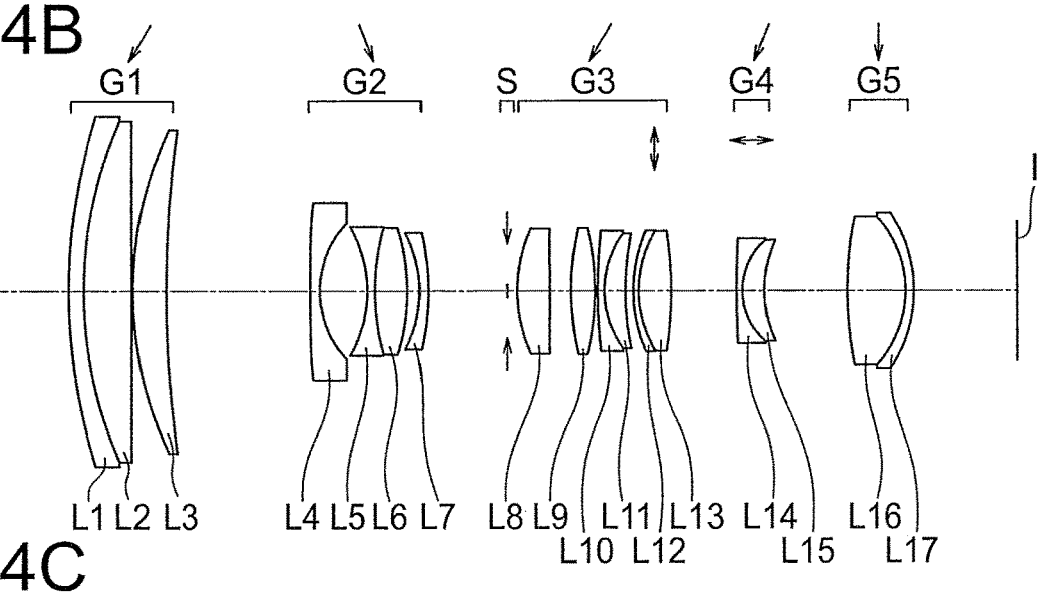
Figure 4C:
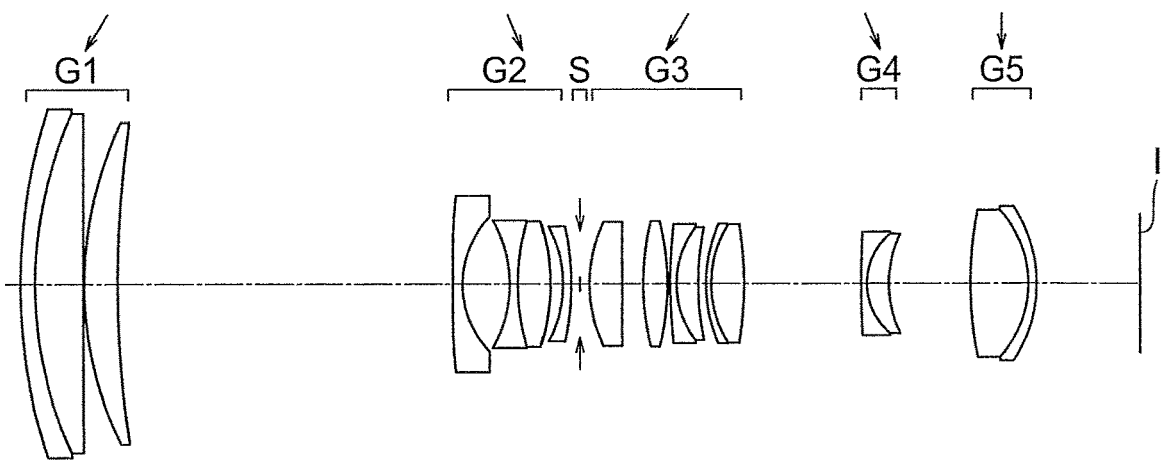
Figure 5A:
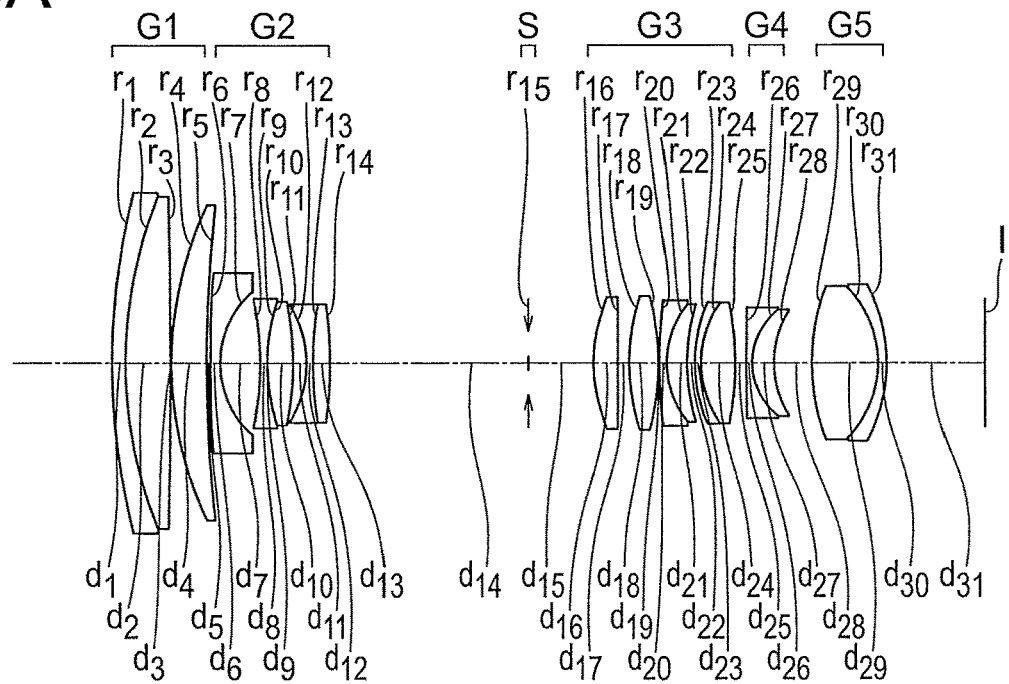
FIG. 5A, FIG. 5B, and FIG. 5C are lens cross-sectional views of a zoom lens according to an example 5.
Figure 5B:
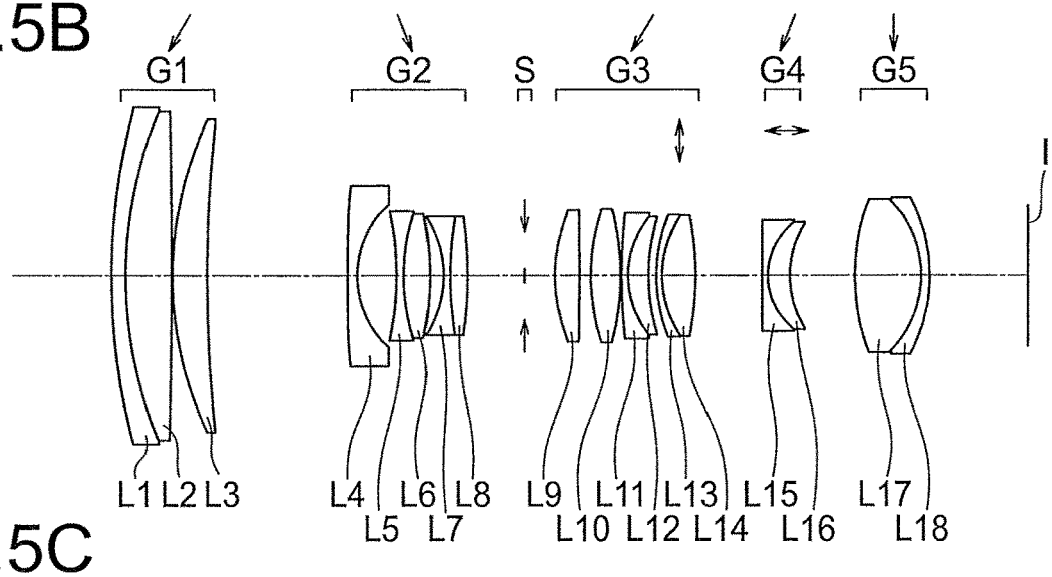
Figure 5C:
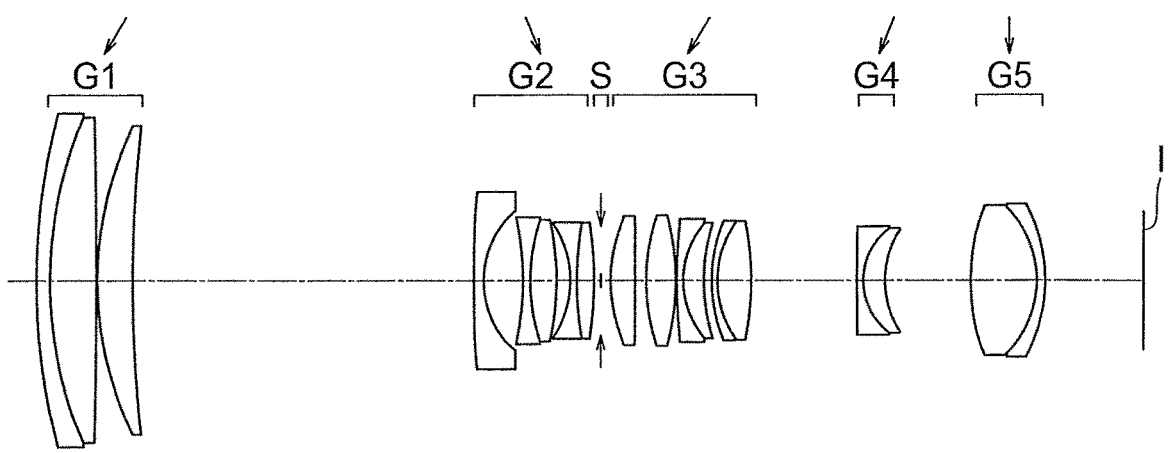
Figure 6A:
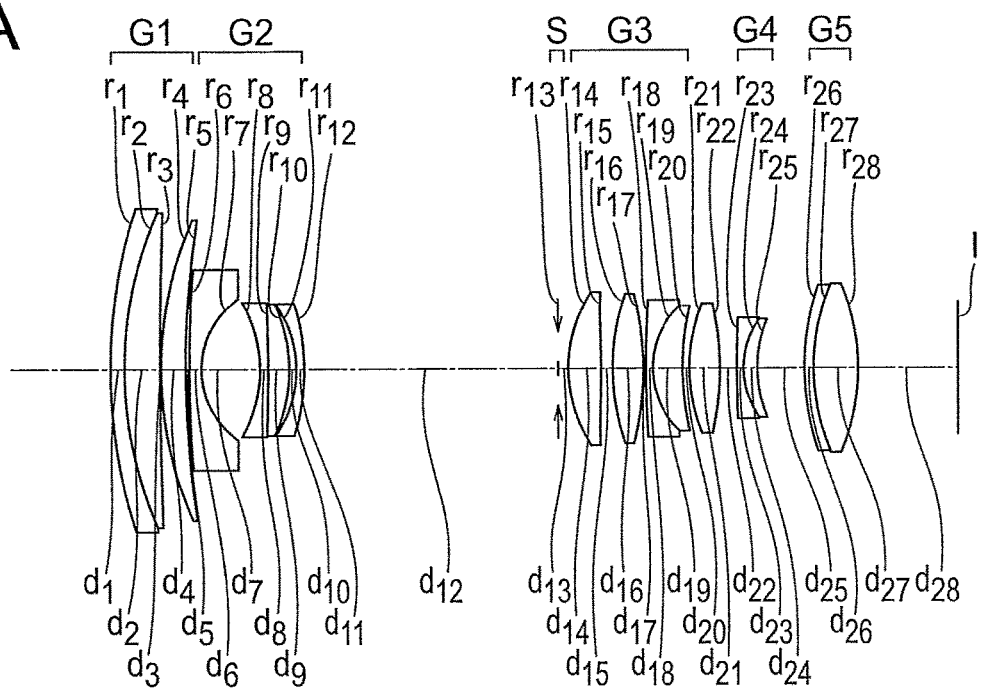
FIG. 6A, FIG. 6B, and FIG. 6C are lens cross-sectional views of a zoom lens according to an example 6.
Figure 6B:
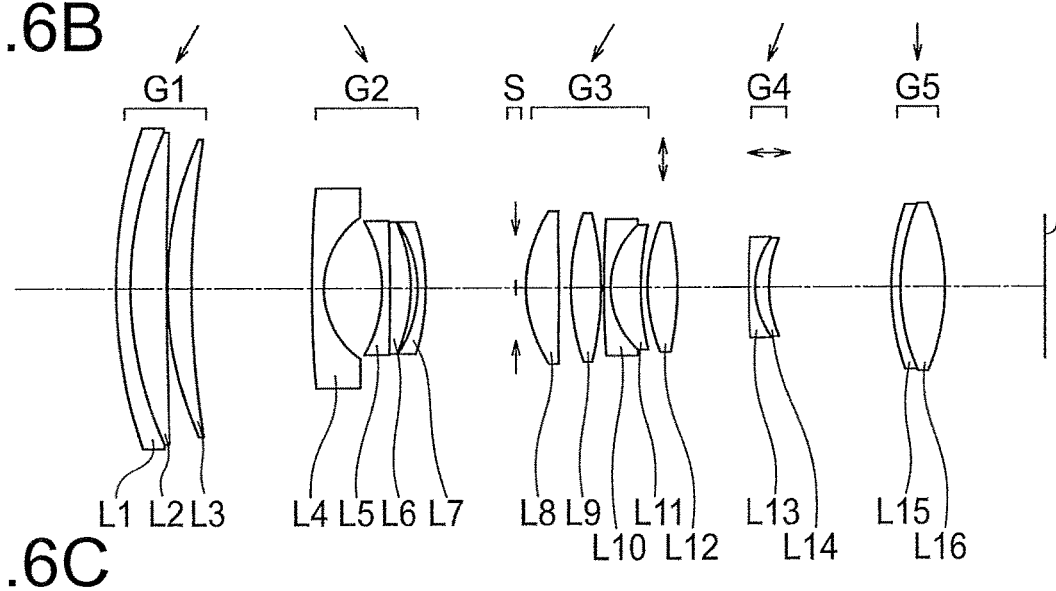
Figure 6C:
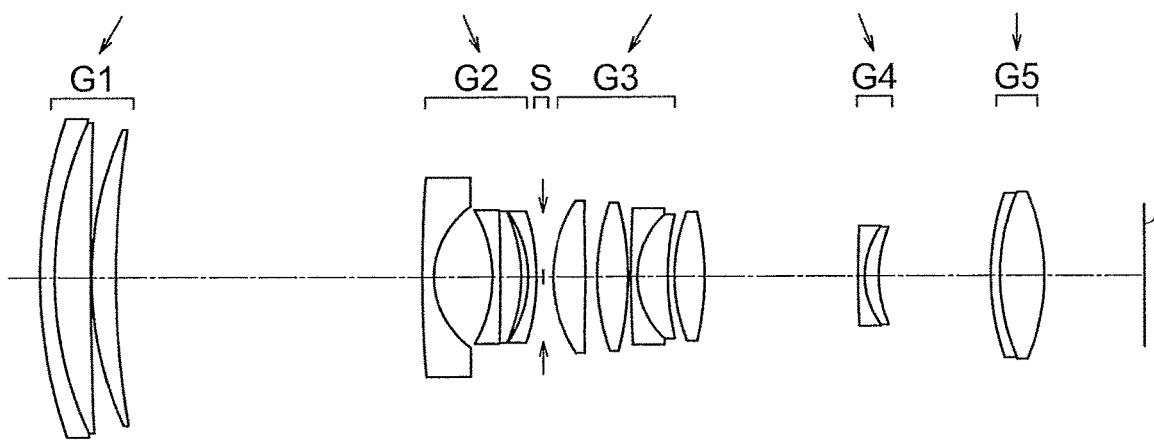
Figure 7A:
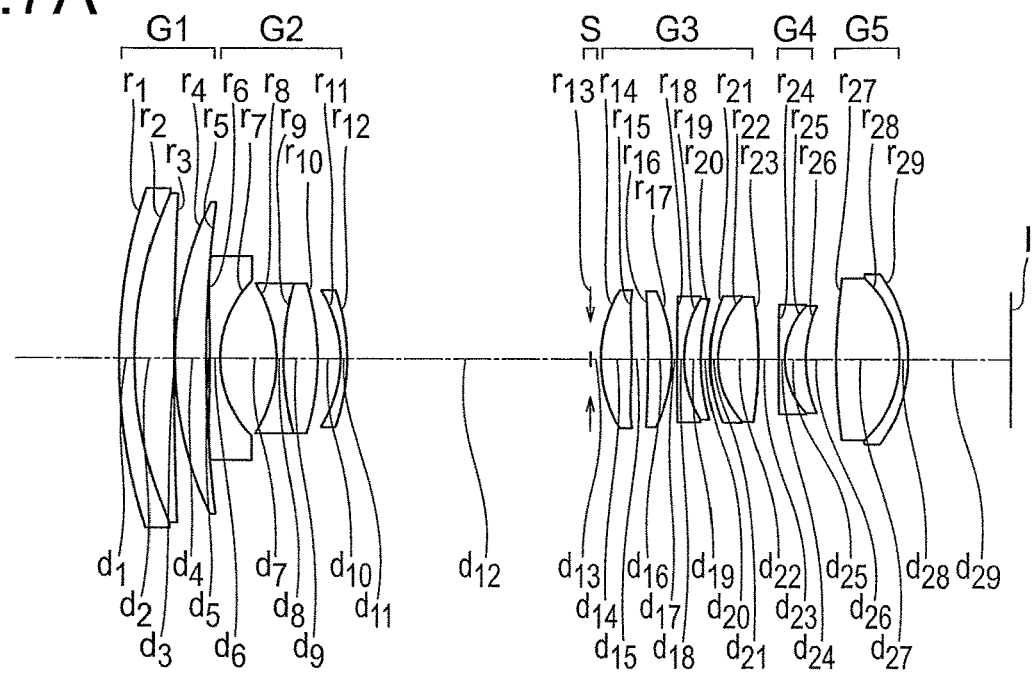
FIG. 7A, FIG. 7B, and FIG. 7C are lens cross-sectional views of a zoom lens according to an example 7.
Figure 7B:
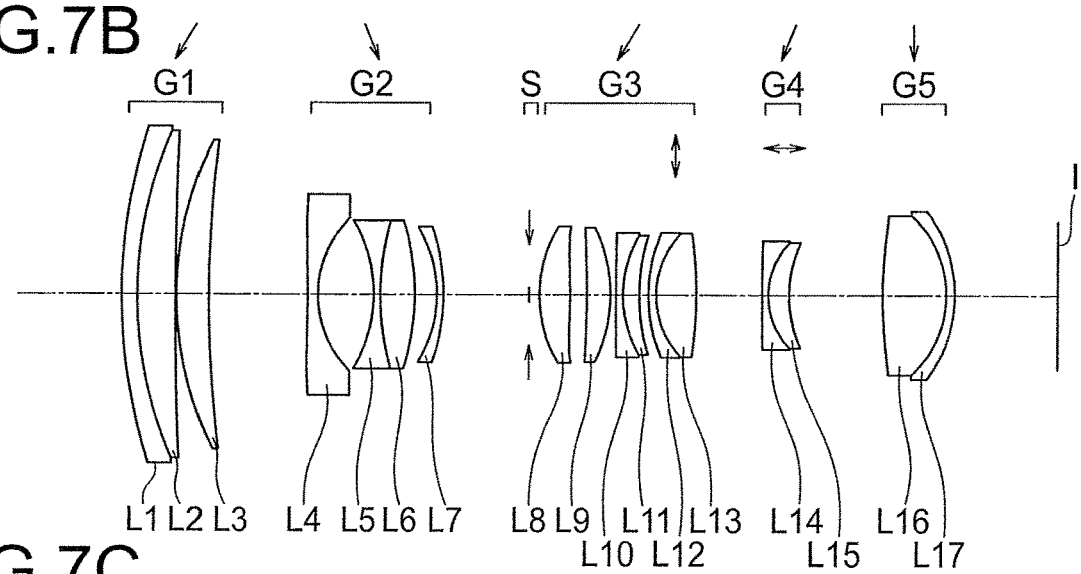
Figure 7C:
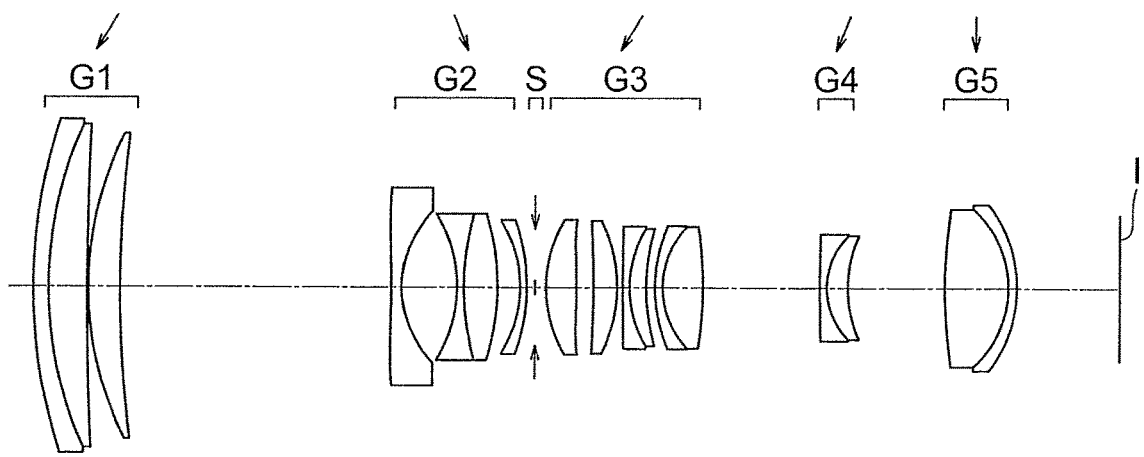
Figure 8A:
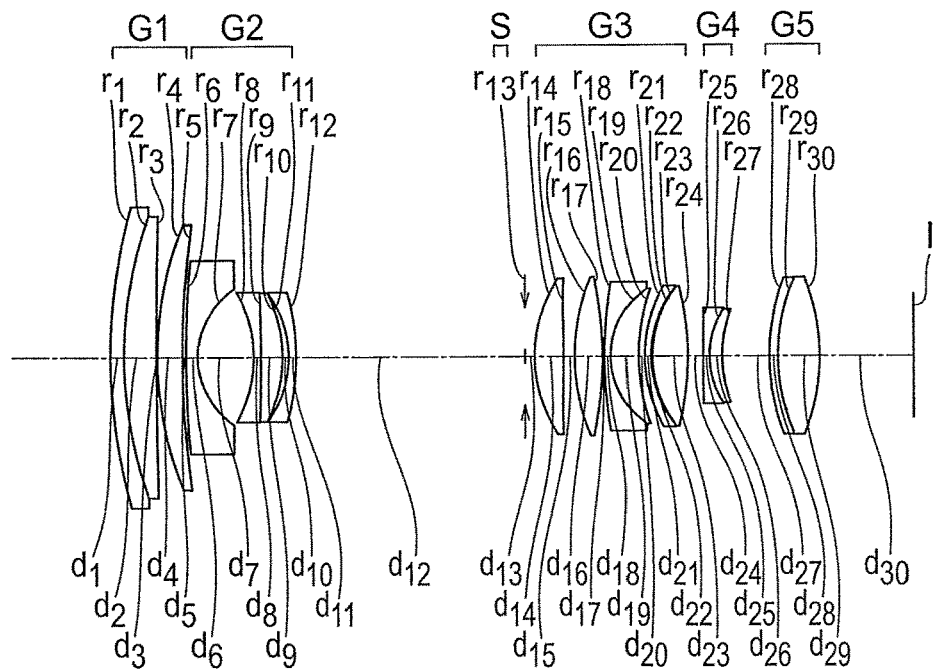
FIG. 8A, FIG. 8B, and FIG. 8C are lens cross-sectional views of a zoom lens according to an example 8.
Figure 8B:
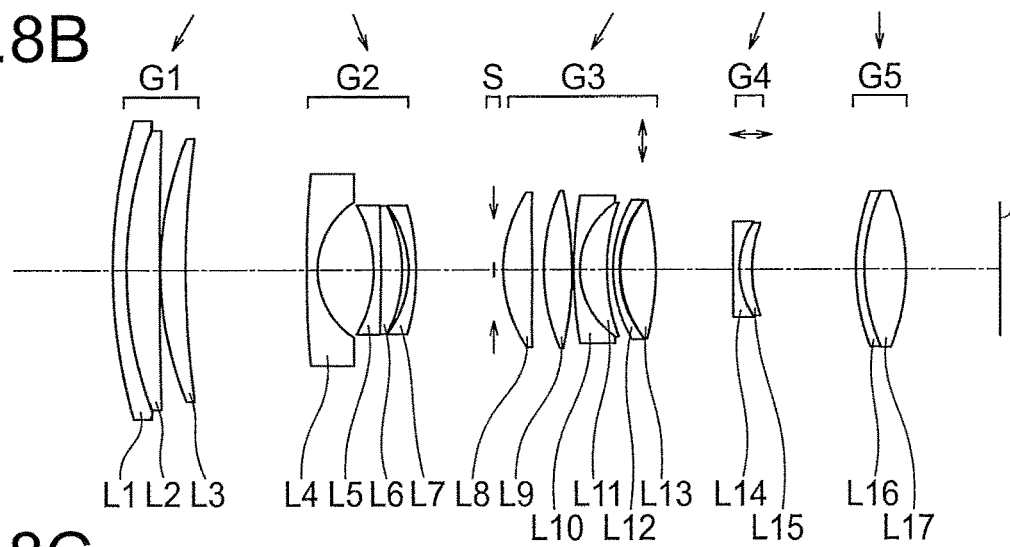
Figure 8C:
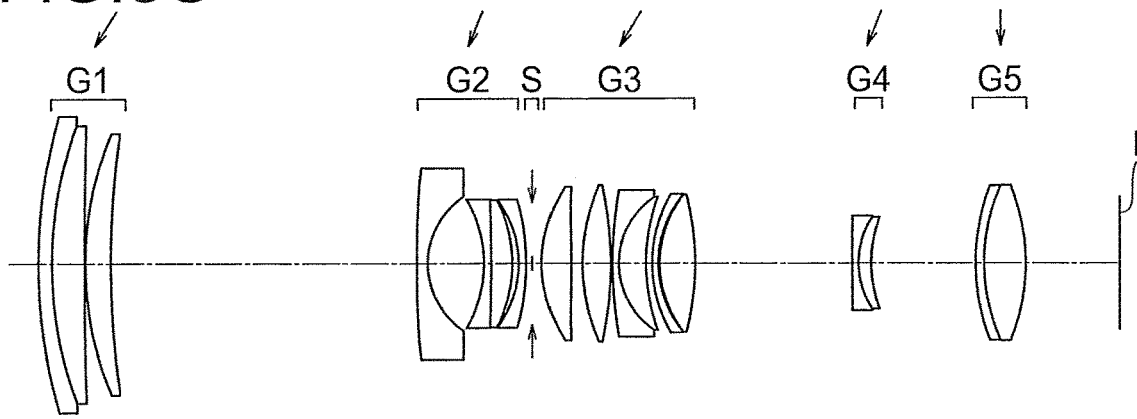
Figure 9A:
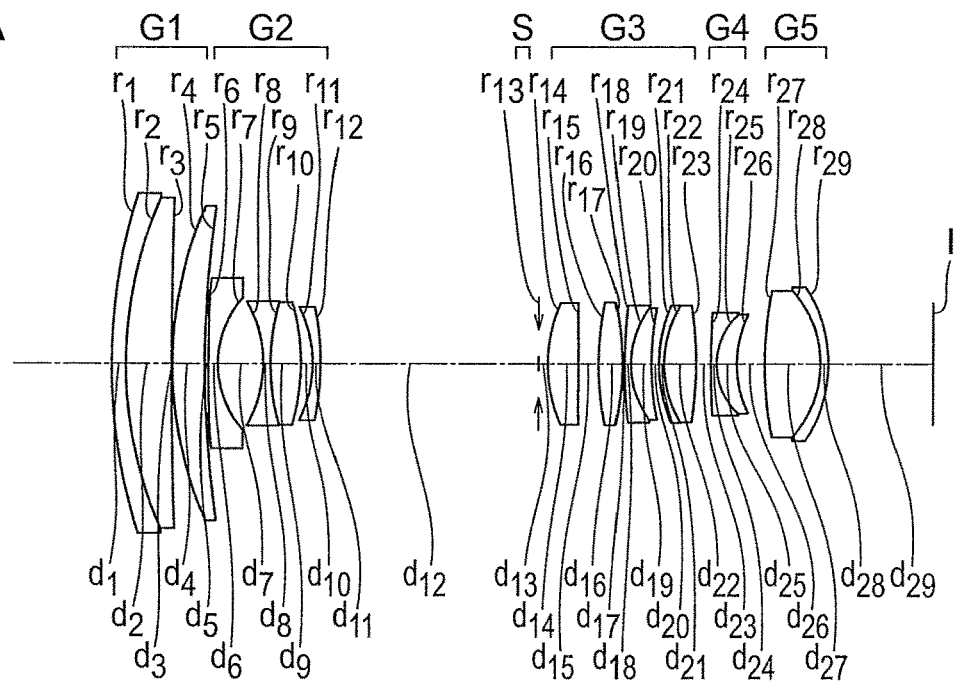
FIG. 9A, FIG. 9B, and FIG. 9C are lens cross-sectional views of a zoom lens according to an example 9.
Figure 9B:
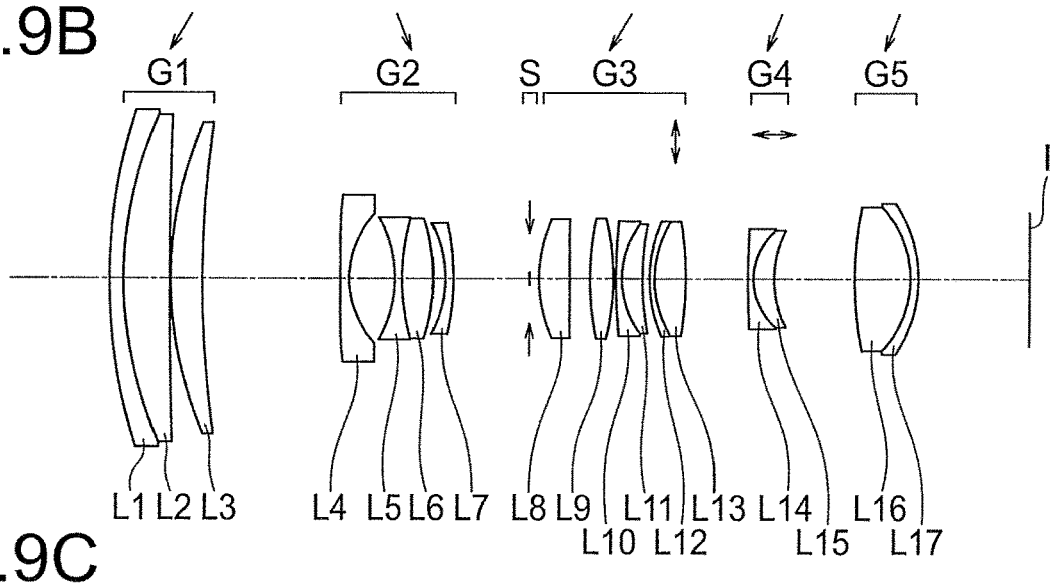
Figure 9C:
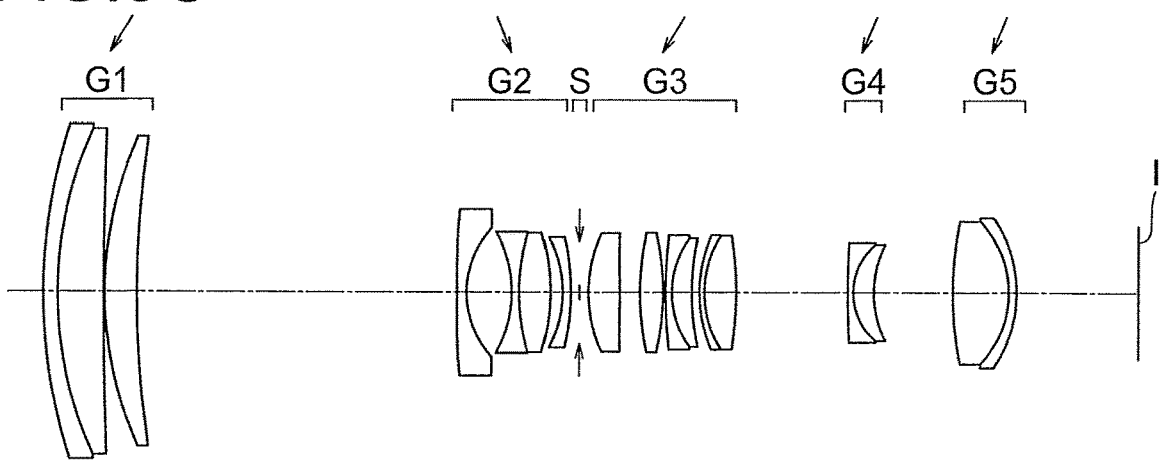
Figure 10A:
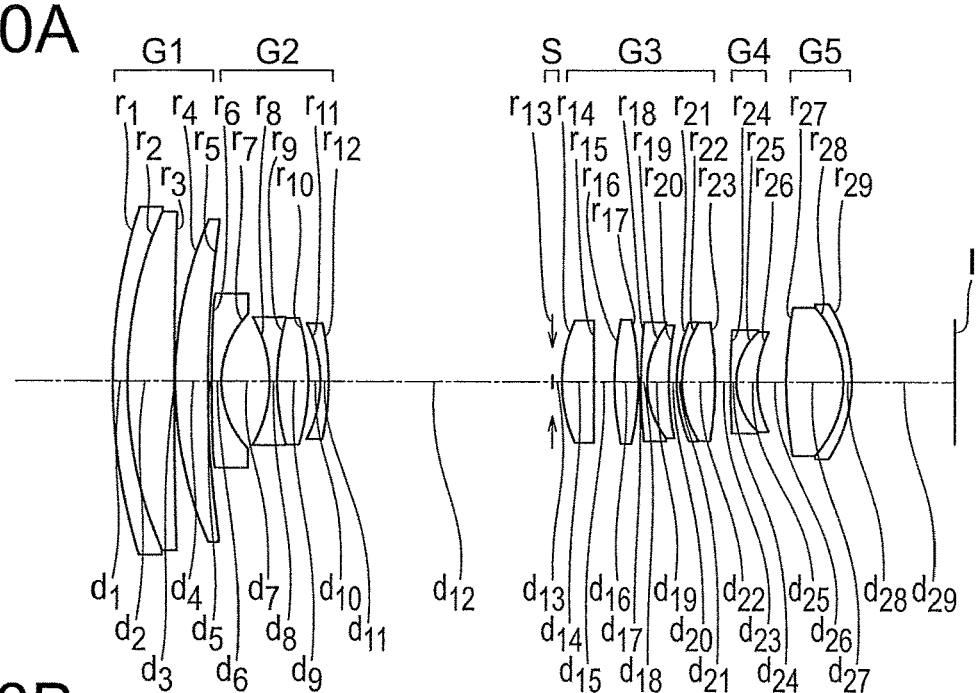
Figure 10B:
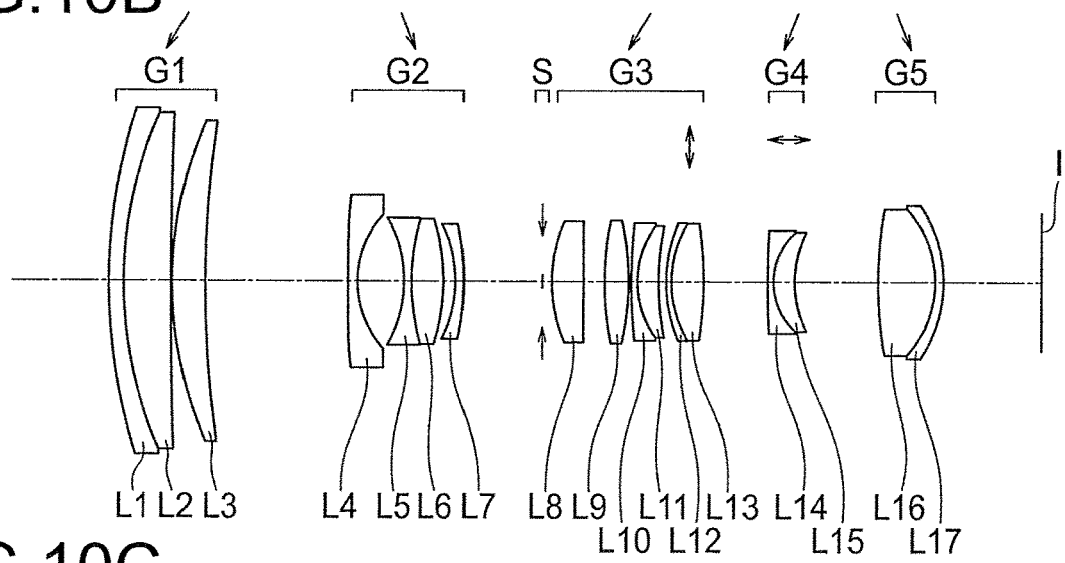
Figure 10C:
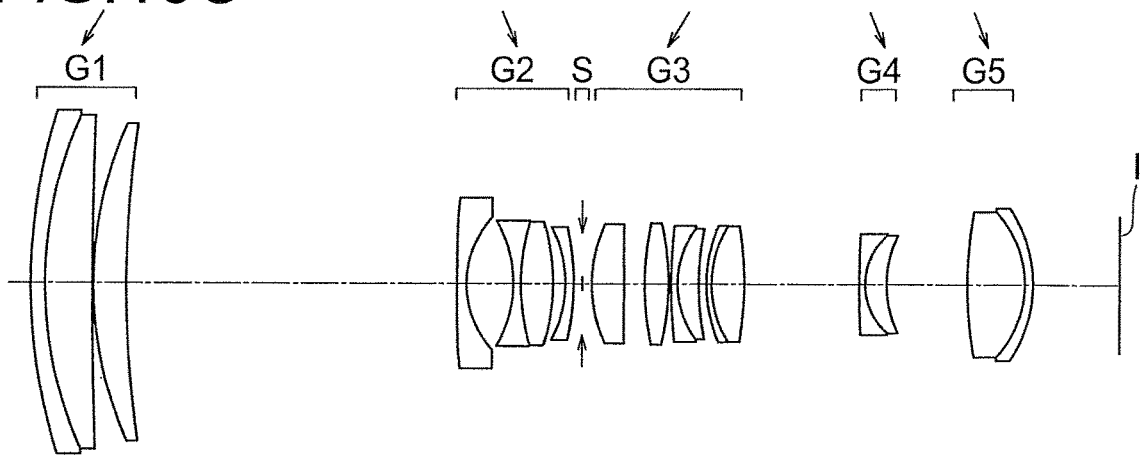
Figure 11A:
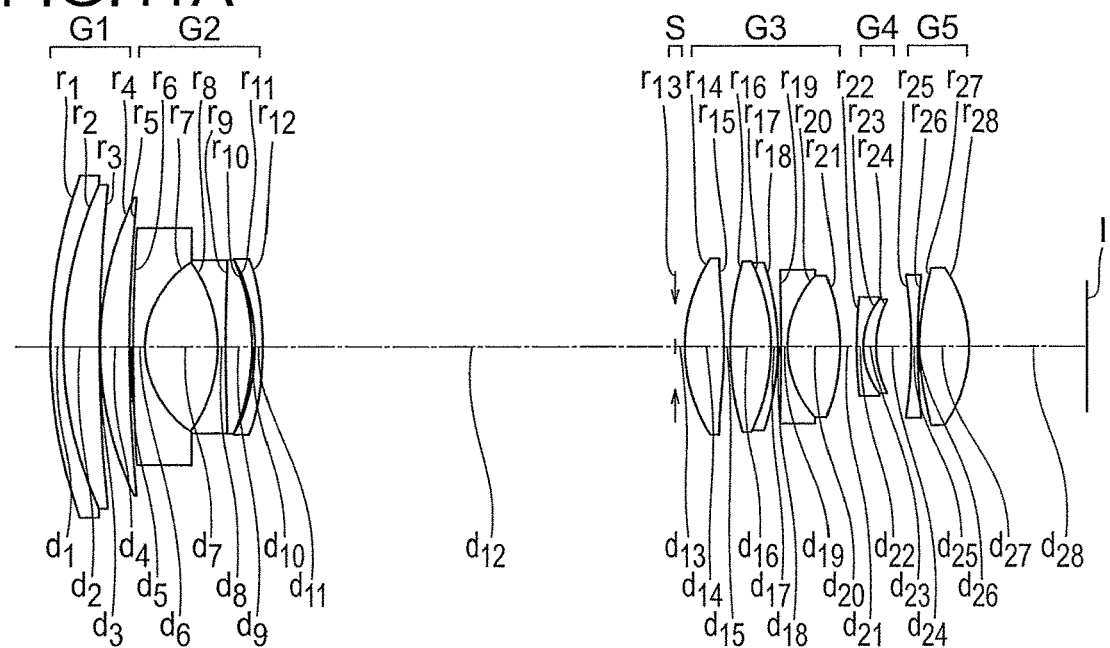
FIG. 11A, FIG. 11B, and FIG. 11C are lens cross-sectional views of a zoom lens according to an example 11.
Figure 11B:
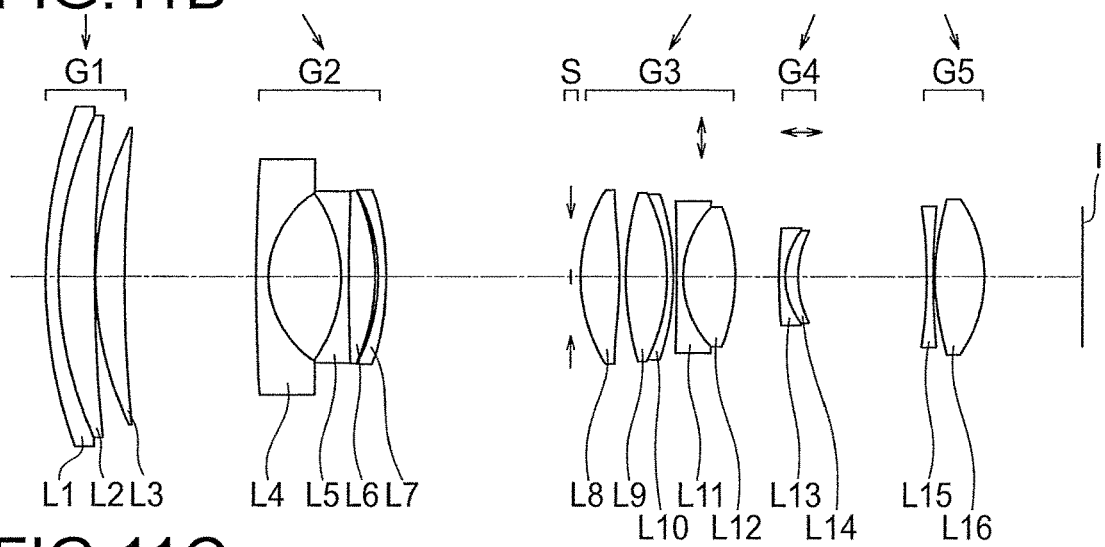
Figure 11C:
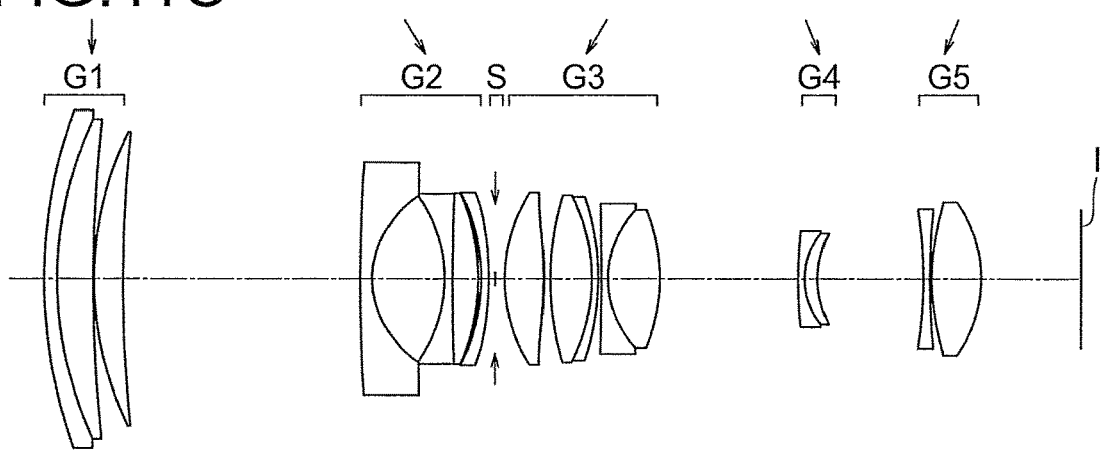
Figure 12A:
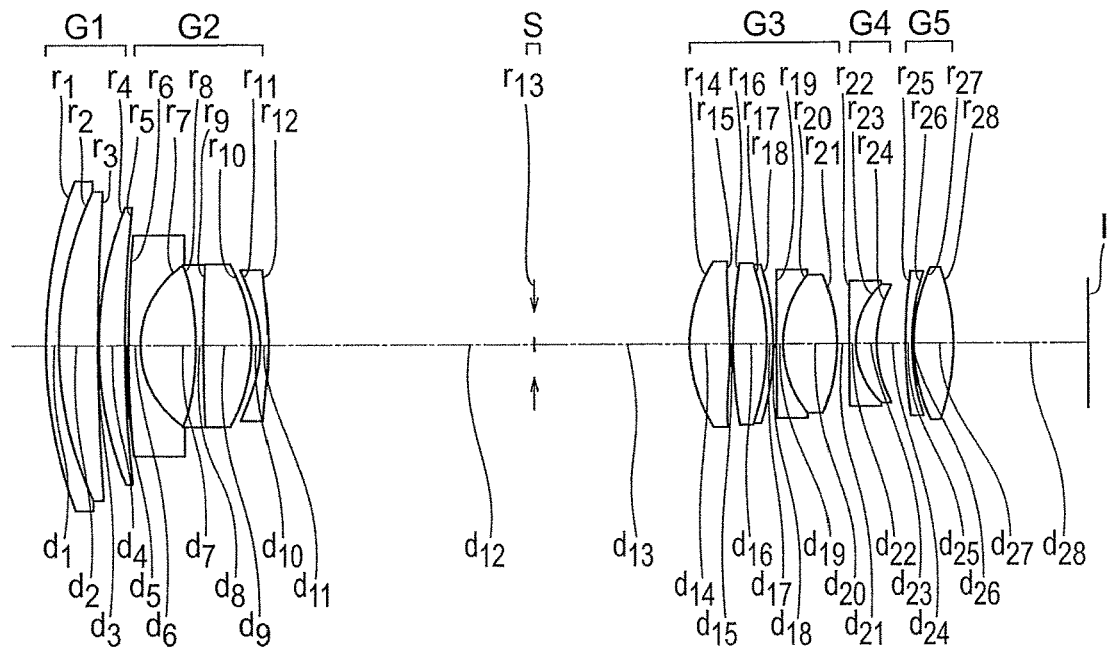
Figure 12B:
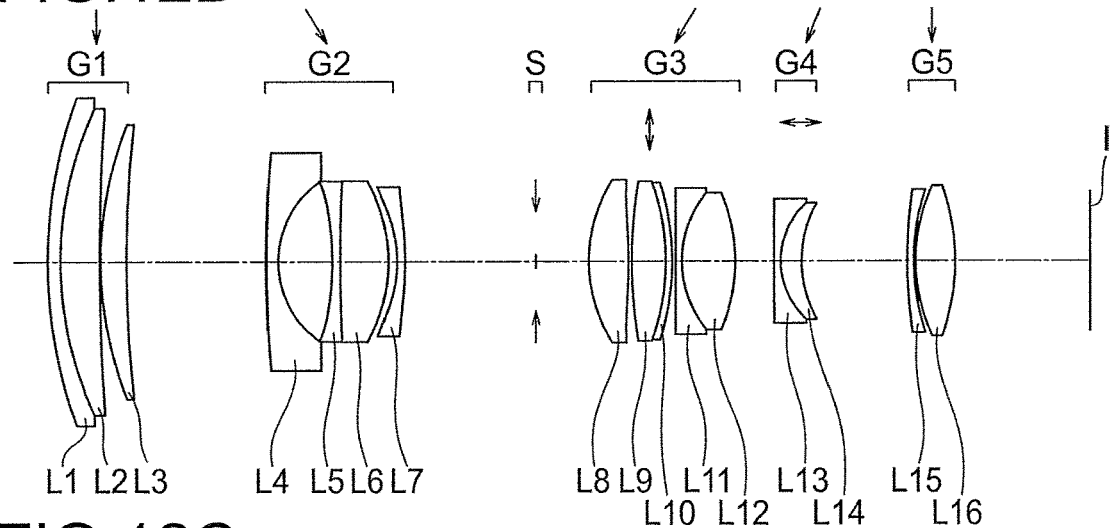
Figure 12C:
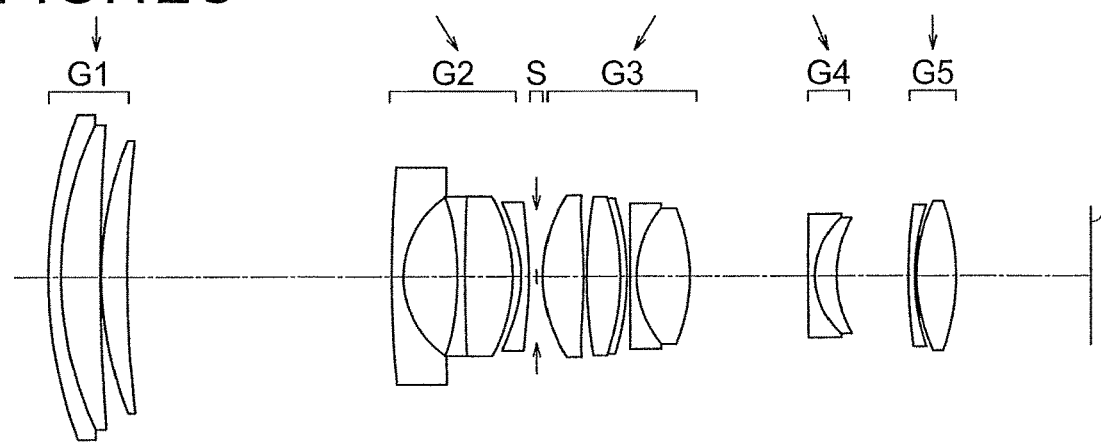
Figure 13A:
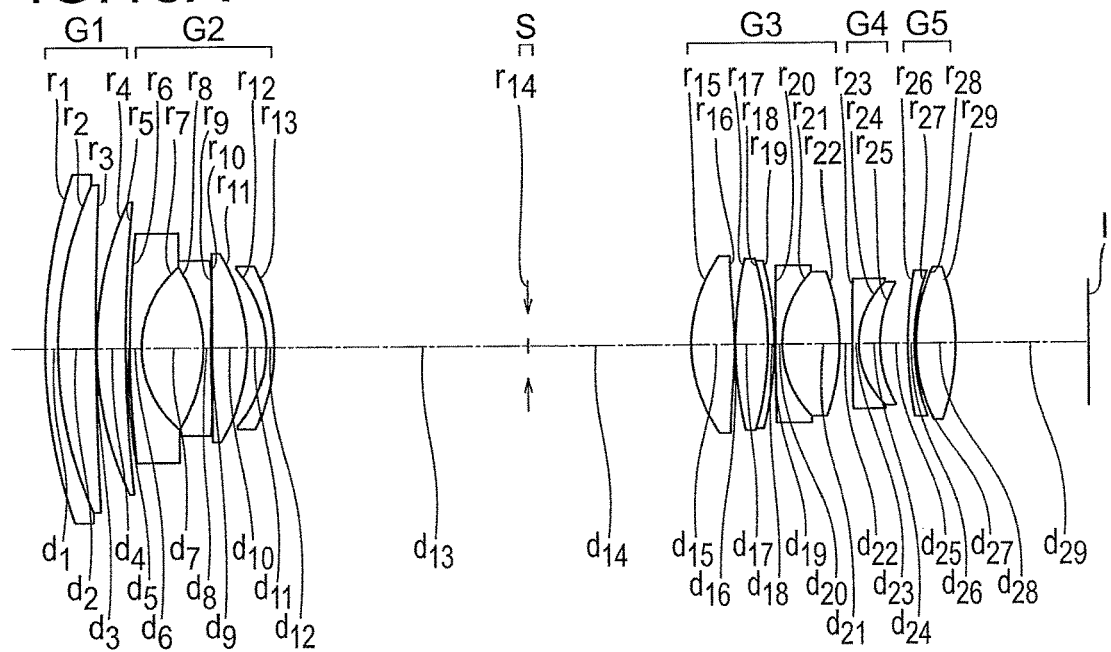
FIG. 13A, FIG. 13B, and FIG. 13C are lens cross-sectional views of a zoom lens according to an example 13.
Figure 13B:
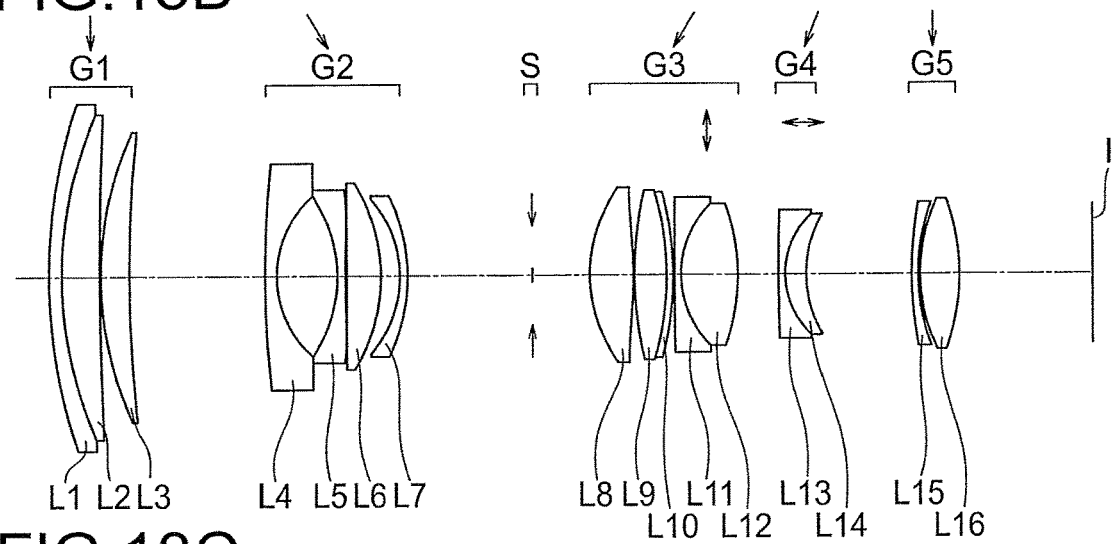
Figure 13C:
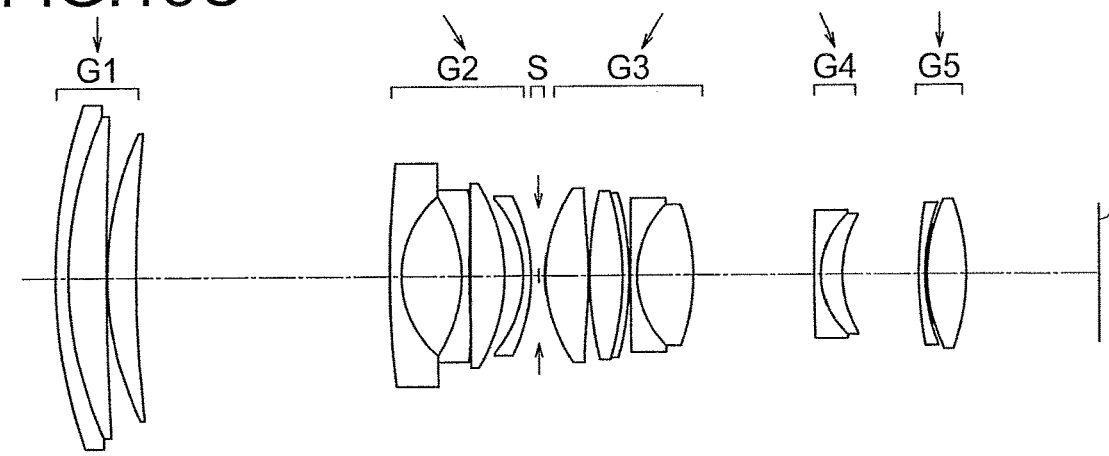
Figure 14A:
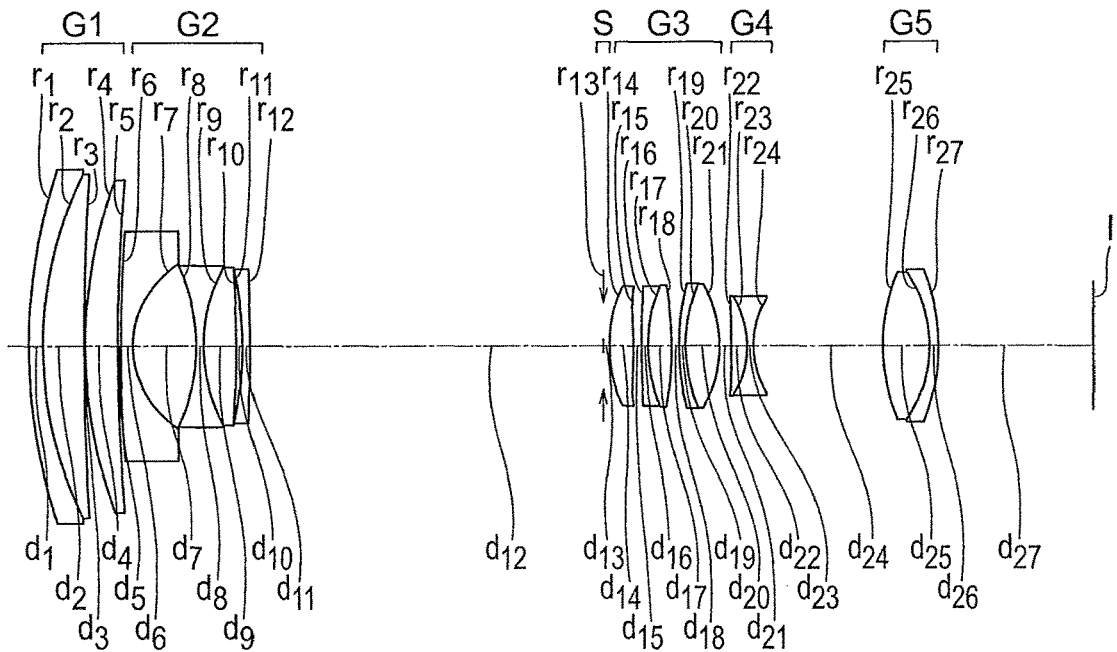
FIG. 14A, FIG. 14B, and FIG. 14C are lens cross-sectional views of a zoom lens according to an example 14.
Figure 14B:
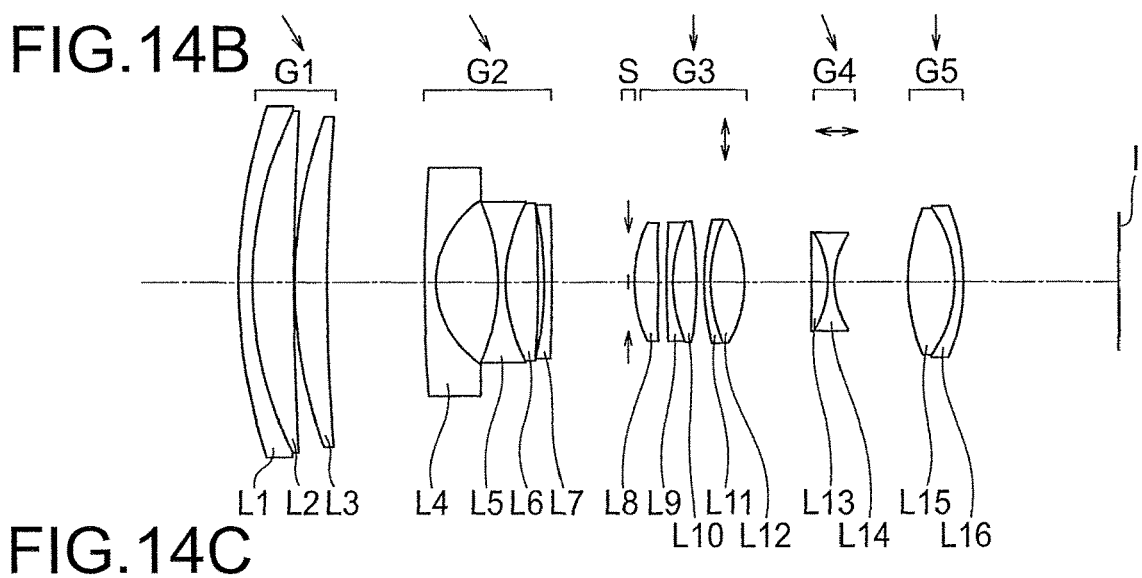
Figure 14C:
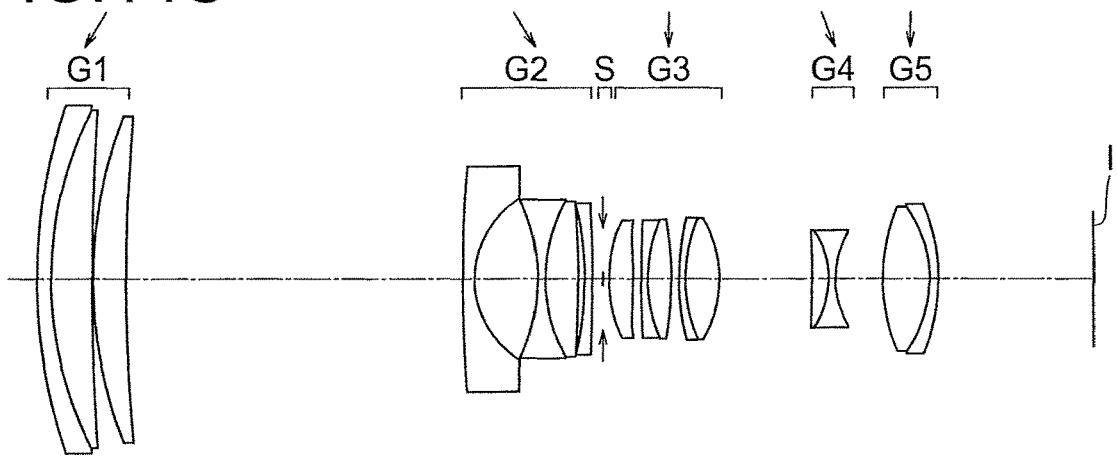
Figure 15A:
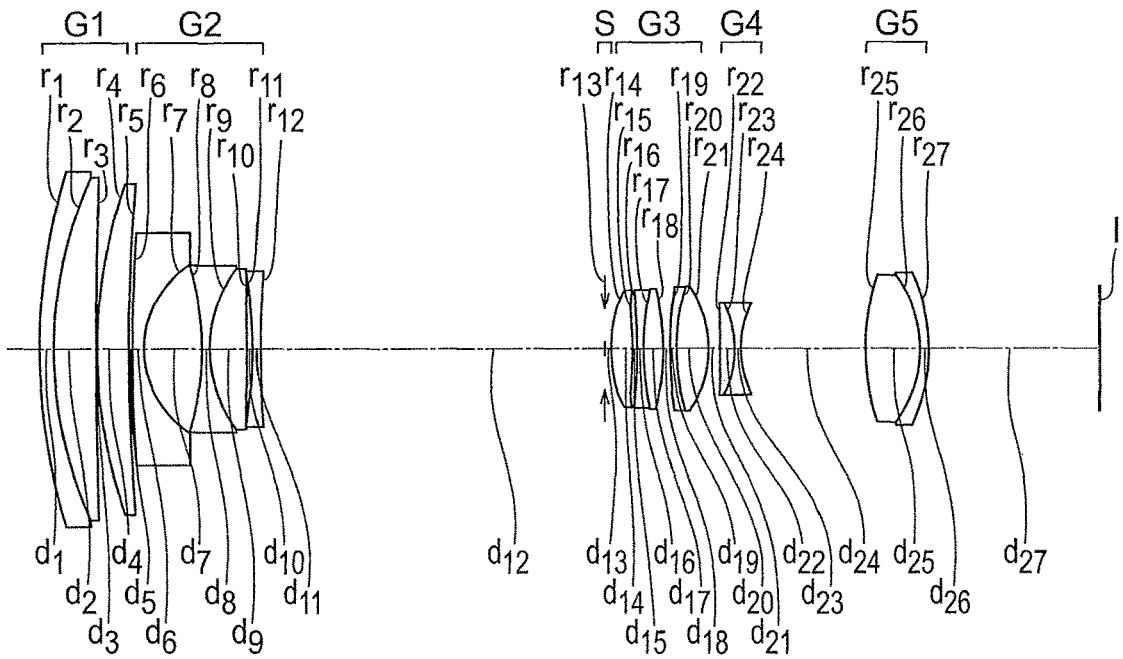
FIG. 15A, FIG. 15B, and FIG. 15C are lens cross-sectional views of a zoom lens according to an example 15.
Figure 15B:
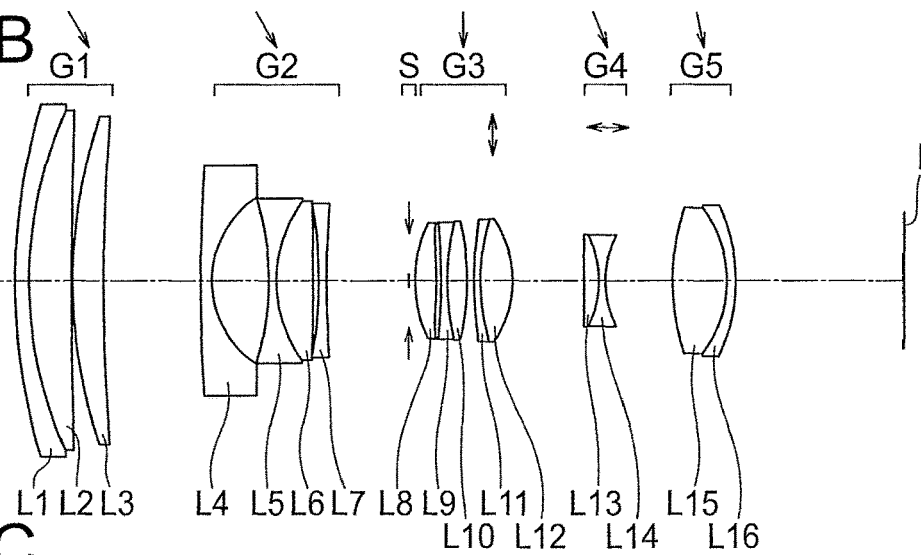
Figure 15C:
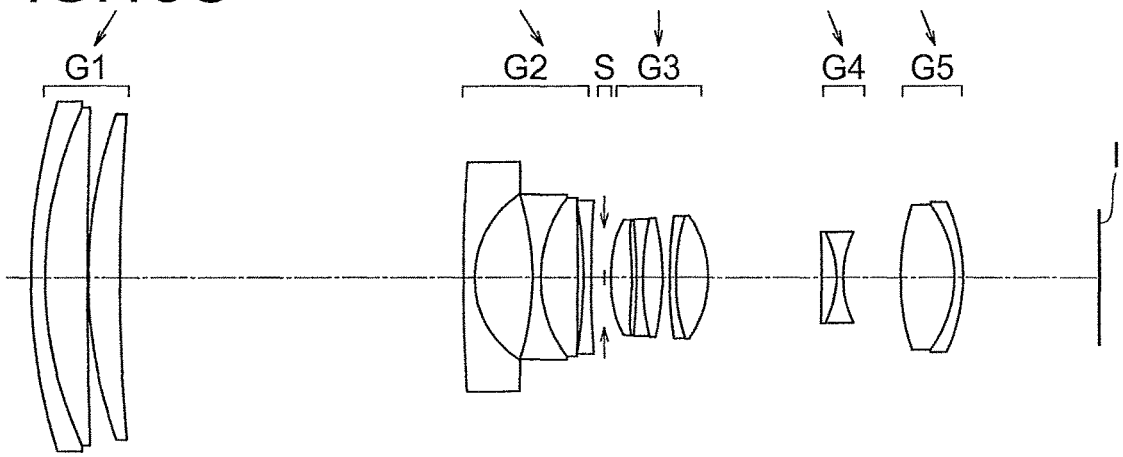
Figure 17A:
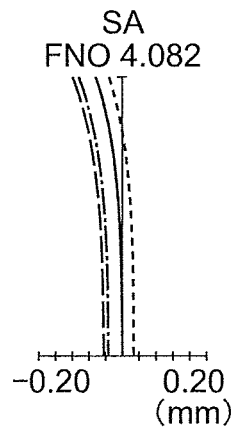
FIG. 17A, FIG. 17B, FIG. 17C, FIG. 17D, FIG. 17E, FIG. 17F, FIG. 17G, FIG. 17H, FIG. 17I, FIG. 17J, FIG. 17K, and FIG. 17L are aberration diagrams of the zoom lens according to the example 2.
Figure 17B:
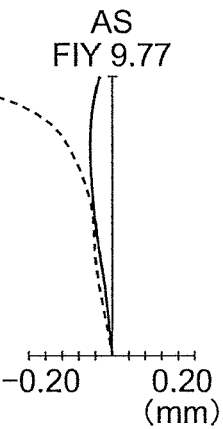
Figure 17C:
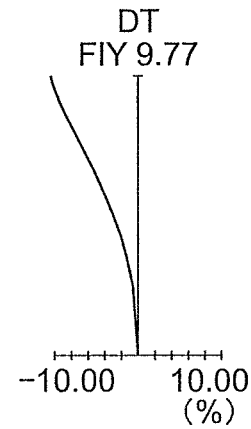
Figure 17D:
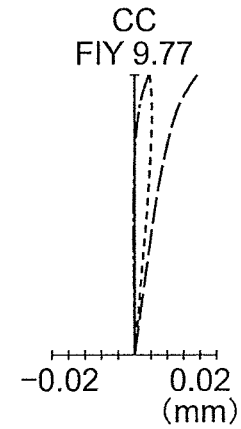
Figure 17E:
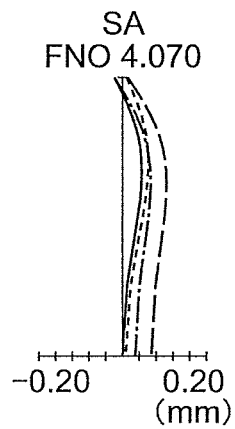
Figure 17F:
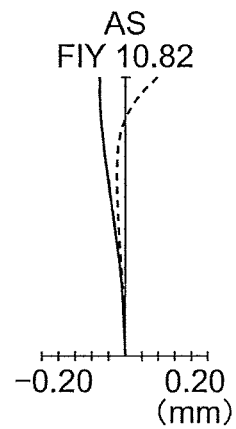
Figure 17G:
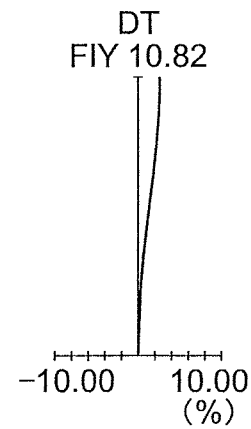
Figure 17H:
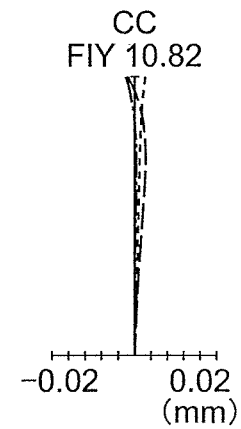
Figure 17I:
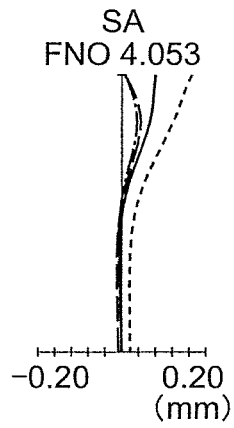
Figure 17J:
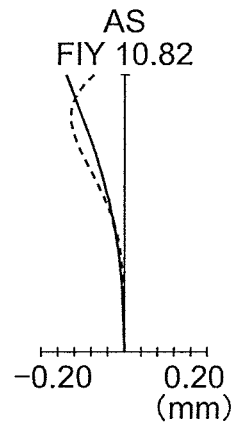
Figure 17K:
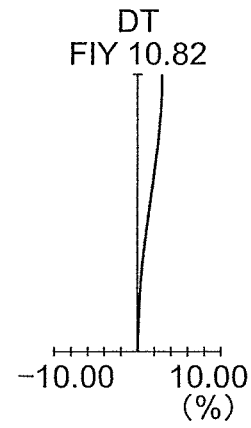
Figure 17L:
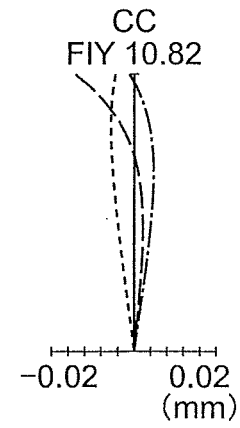
Figure 18A:
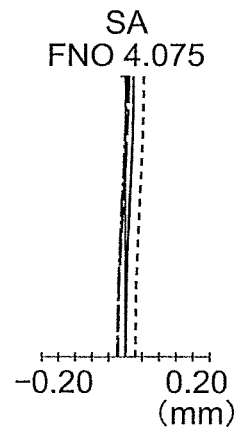
FIG. 18A, FIG. 18B, FIG. 18C, FIG. 18D, FIG. 18E, FIG. 18F, FIG. 18G, FIG. 18H, FIG. 18I, FIG. 18J, FIG. 18K, and FIG. 18L are aberration diagrams of the zoom lens according to the example 3.
Figure 18B:
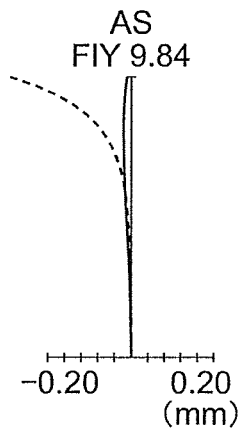
Figure 18C:
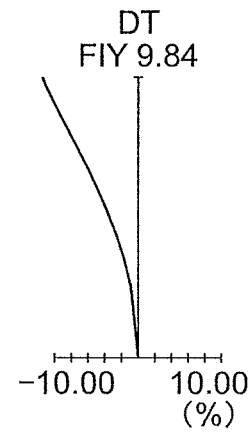
Figure 18D:
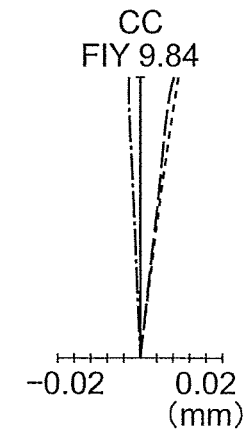
Figure 18E:
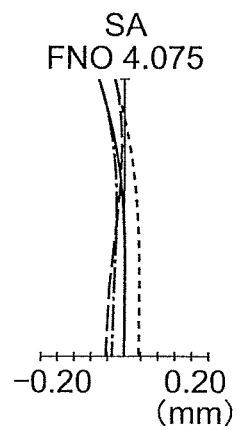
Figure 18F:
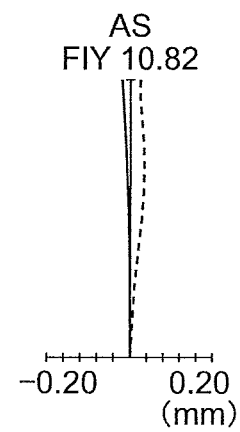
Figure 18G:
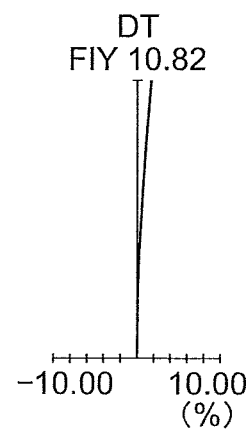
Figure 18H:
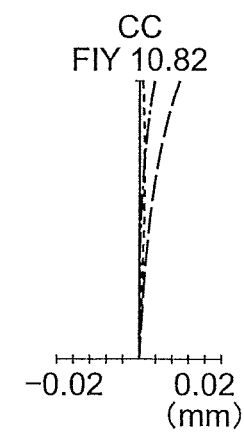
Figure 18I:
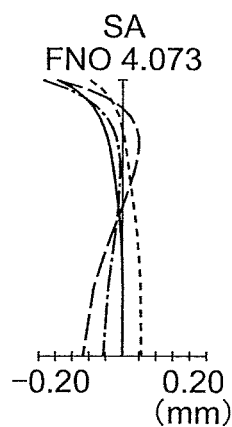
Figure 18J:
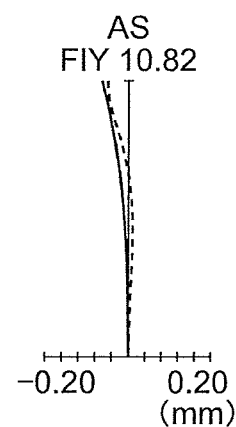
Figure 18K:
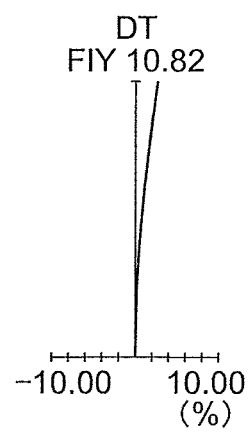
Figure 18L:
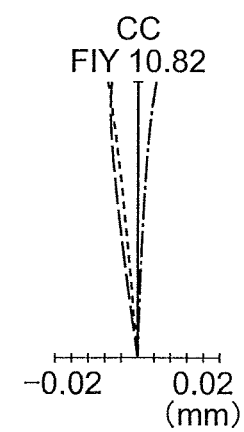
Figure 20A:
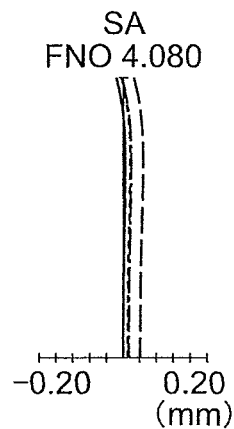
FIG. 20A, FIG. 20B, FIG. 20C, FIG. 20D, FIG. 20E, FIG. 20F, FIG. 20G, FIG. 20H, FIG. 20I, FIG. 20J, FIG. 20K, and FIG. 20L are aberration diagrams of the zoom lens according to the example 5.
Figure 20B:
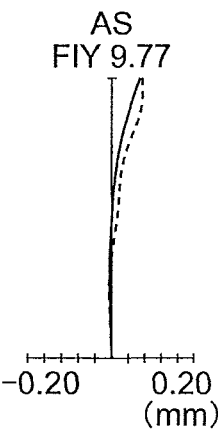
Figure 20C:
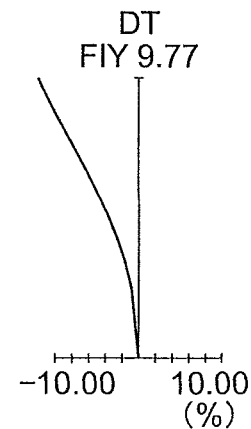
Figure 20D:
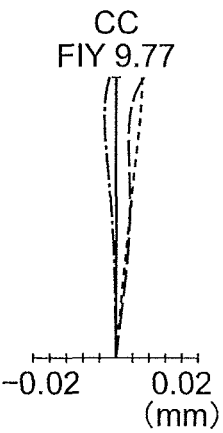
Figure 20E:
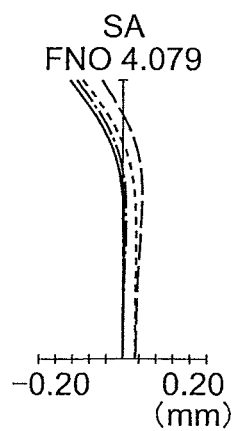
Figure 20F:
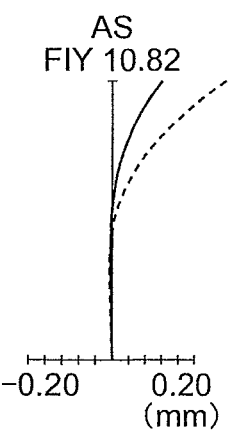
Figure 20G:
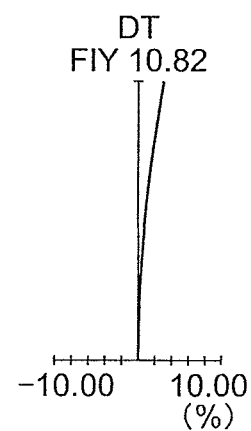
Figure 20H:
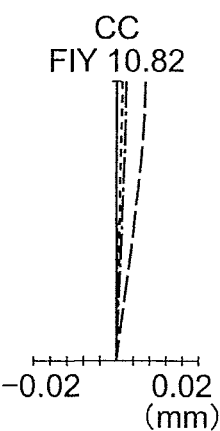
Figure 20I:
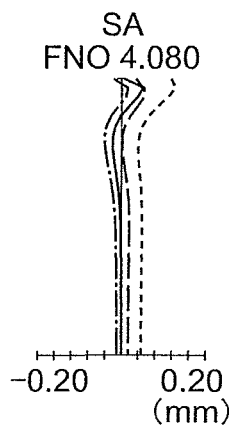
Figure 20J:
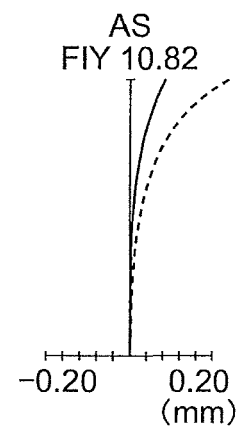
Figure 20K:
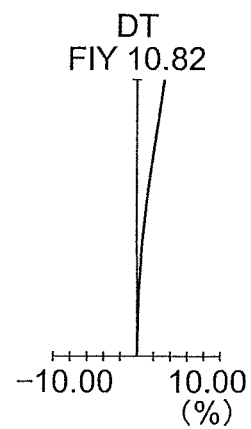
Figure 20L:
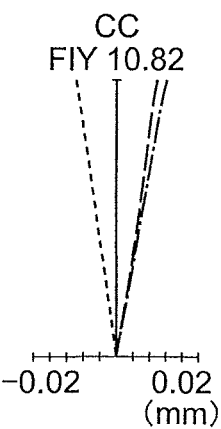
Figure 21A:
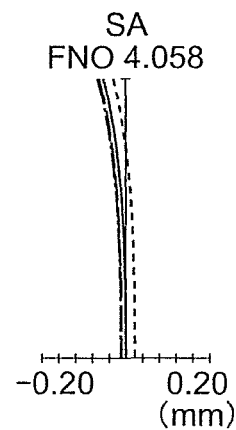
FIG. 21A, FIG. 21B, FIG. 21C, FIG. 21D, FIG. 21E, FIG. 21F, FIG. 21G, FIG. 21H, FIG. 21I, FIG. 21J, FIG. 21K, and FIG. 21L are aberration diagrams of the zoom lens according to the example 6.
Figure 21B:
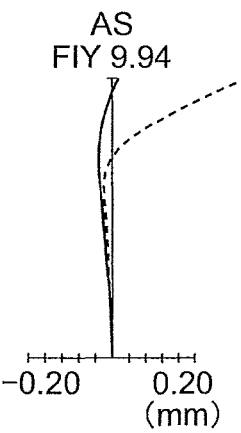
Figure 21C:
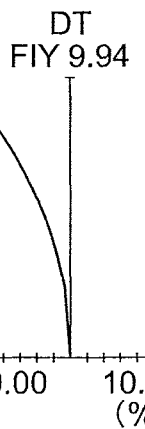
Figure 21D:
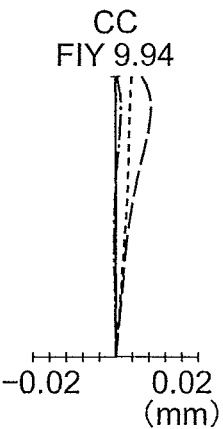
Figure 21E:
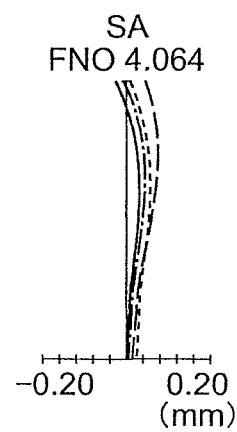
Figure 21F:
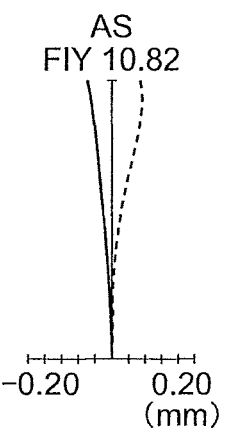
Figure 21G:
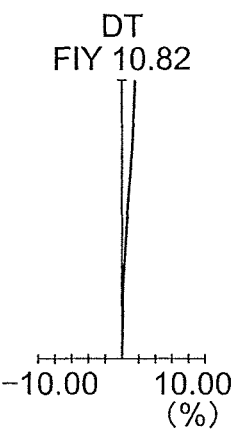
Figure 21H:
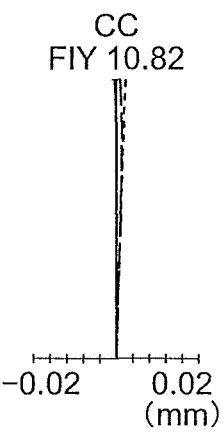
Figure 21I:
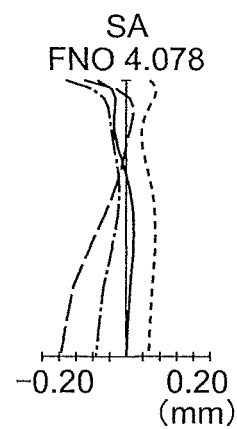
Figure 21J:
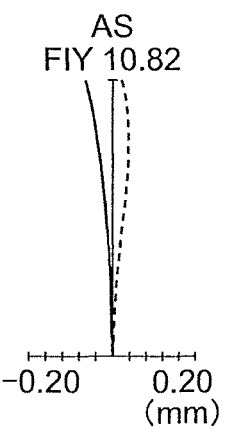
Figure 21K:
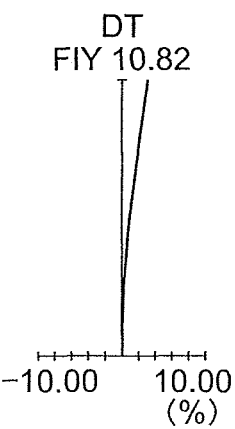
Figure 21L:
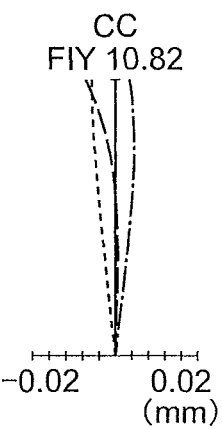
Figure 22A:
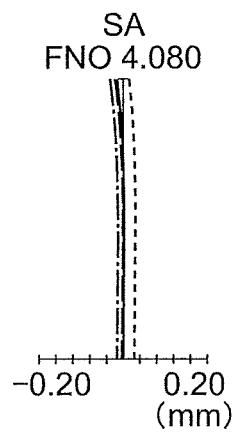
Figure 22B:
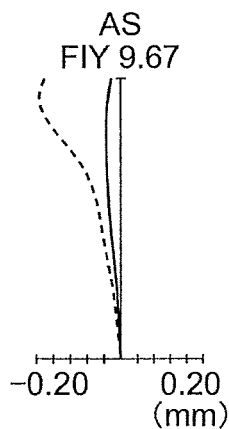
Figure 22C:
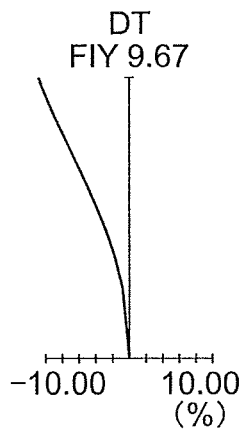
Figure 22D:
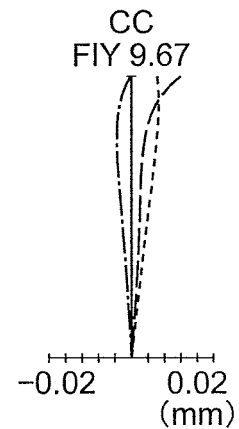
Figure 22E:
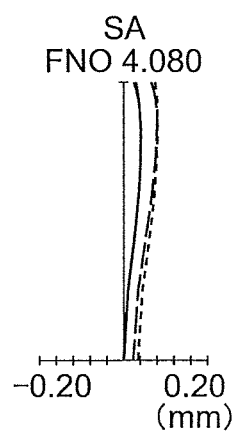
Figure 22F:
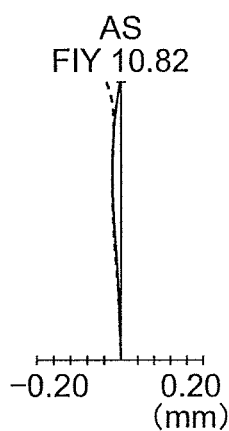
Figure 22G:
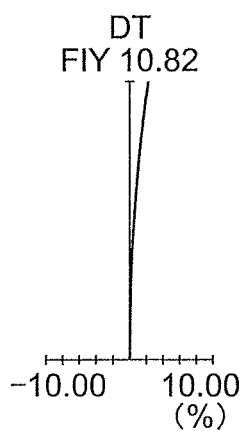
Figure 22H:
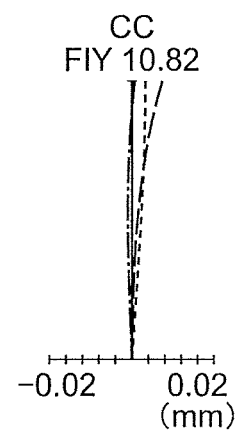
Figure 22I:
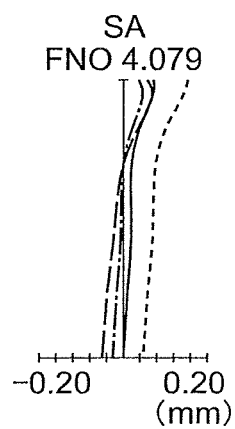
Figure 22J:
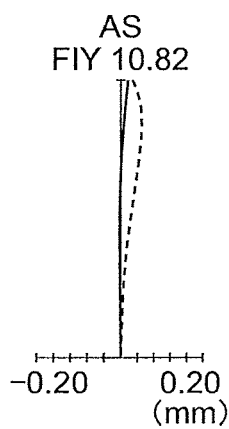
Figure 22K:
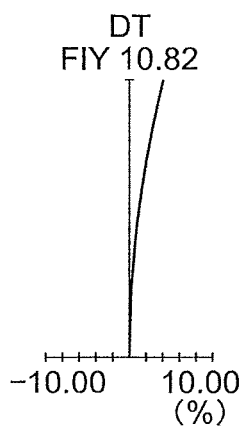
Figure 22L:
Figure 23A:
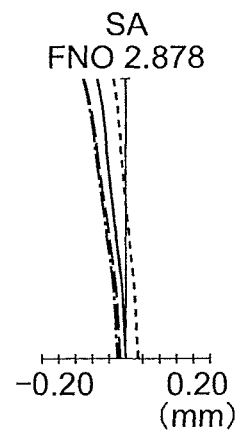
FIG. 23A, FIG. 23B, FIG. 23C, FIG. 23D, FIG. 23E, FIG. 23F, FIG. 23G, FIG. 23H, FIG. 23I, FIG. 23J, FIG. 23K, and FIG. 23L are aberration diagrams of the zoom lens according to the example 8.
Figure 23B:
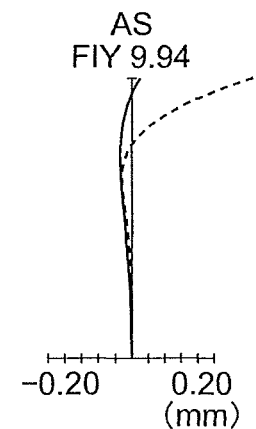
Figure 23C:
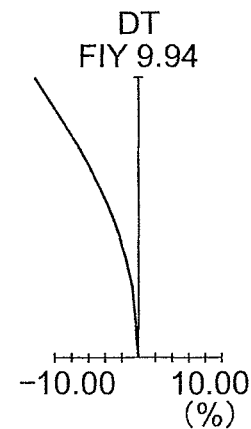
Figure 23D:
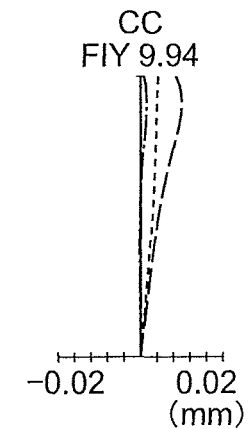
Figure 23E:
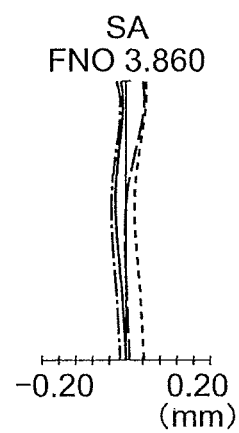
Figure 23F:
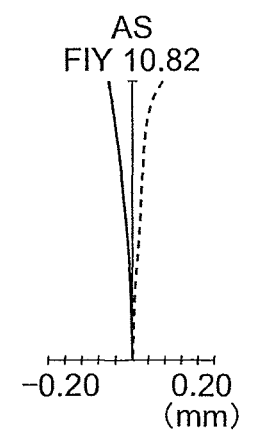
Figure 23G:
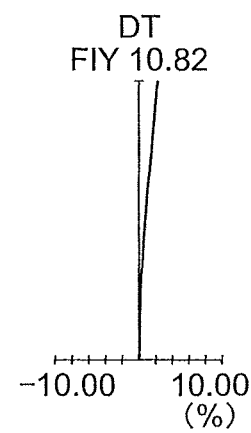
Figure 23H:
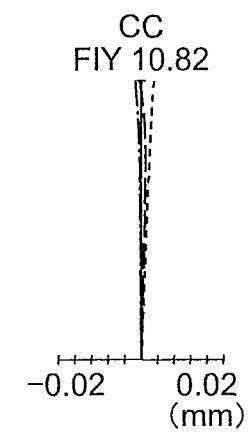
Figure 23I:
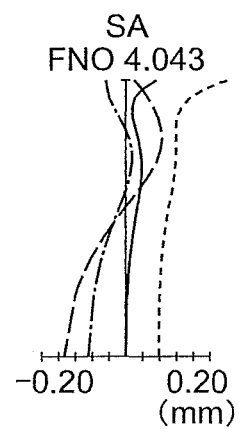
Figure 23J:
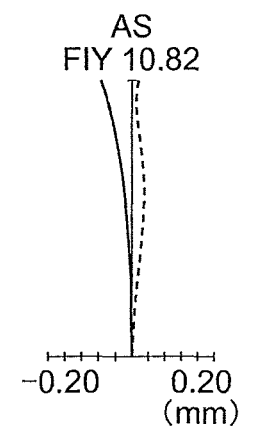
Figure 23K:
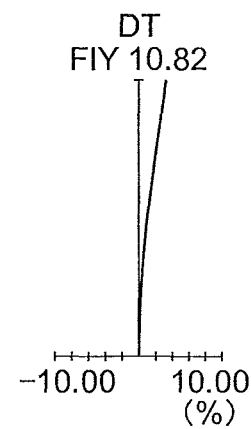
Figure 23L:
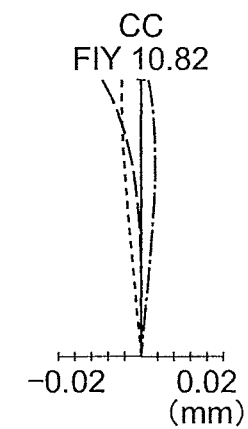
Figure 25A:
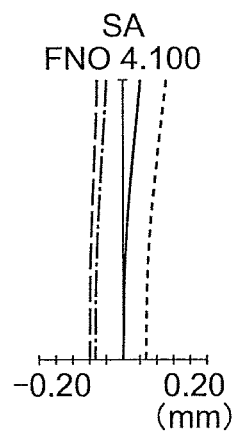
FIG. 25A, FIG. 25B, FIG. 25C, FIG. 25D, FIG. 25E, FIG. 25F, FIG. 25G, FIG. 25H, FIG. 25I, FIG. 25J, FIG. 25K, and FIG. 25L are aberration diagrams of the zoom lens according to the example 10.
Figure 25B:
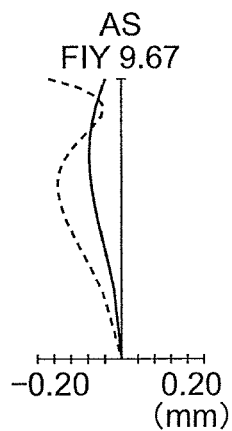
Figure 25C:
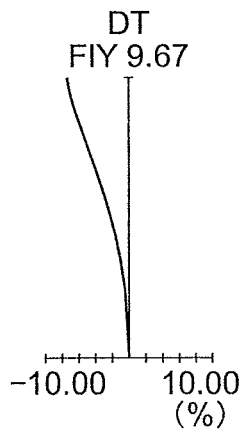
Figure 25D:
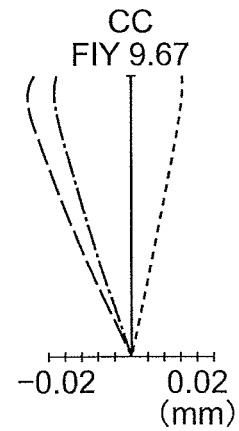
Figure 25E:
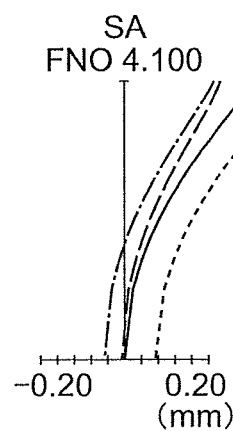
Figure 25F:
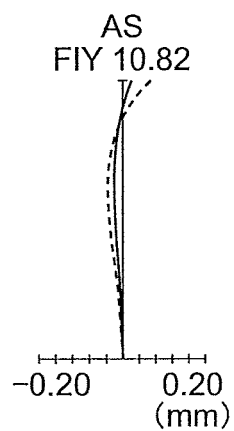
Figure 25G:
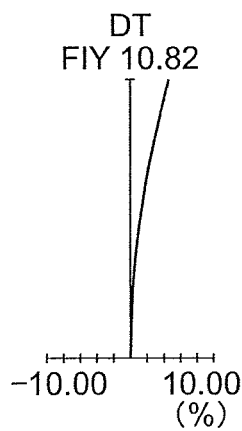
Figure 25H:
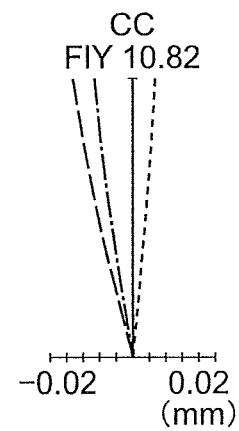
Figure 25I:
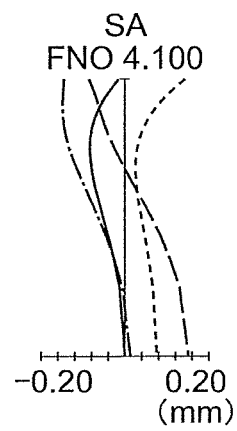
Figure 25J:
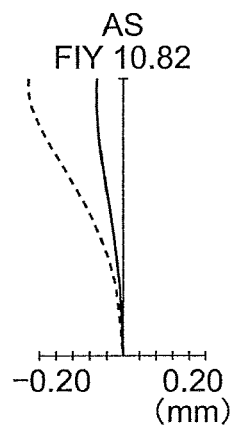
Figure 25K:
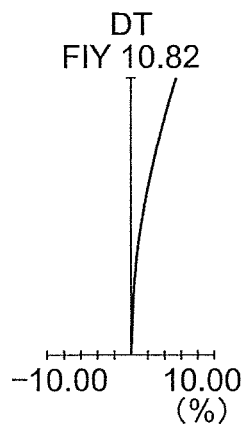
Figure 25L:
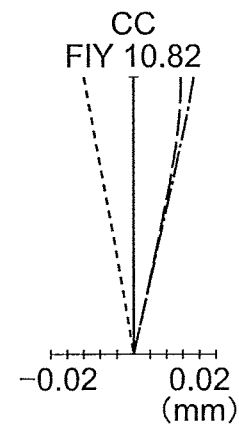
Figure 26A:
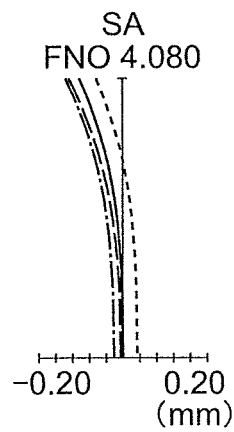
FIG. 26A, FIG. 26B, FIG. 26C, FIG. 26D, FIG. 26E, FIG. 26F, FIG. 26G, FIG. 26H, FIG. 26I, FIG. 26J, FIG. 26K, and FIG. 26L are aberration diagrams of the zoom lens according to the example 11.
Figure 26B:
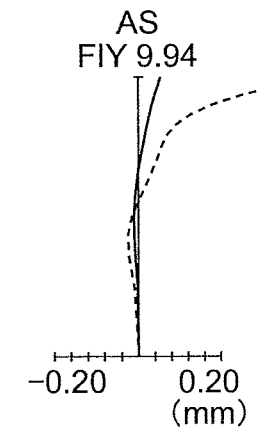
Figure 26C:
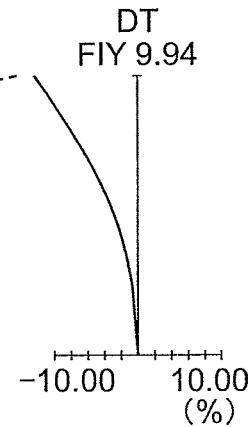
Figure 26D:
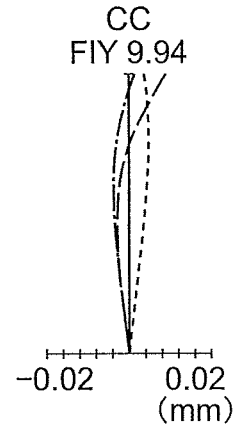
Figure 26E:
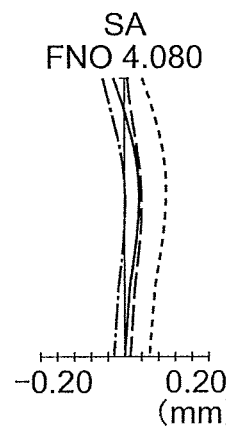
Figure 26F:
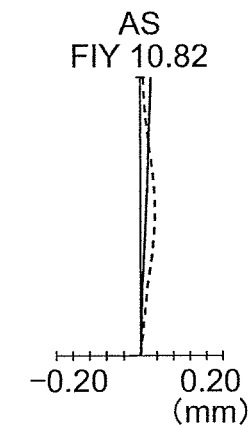
Figure 26G:
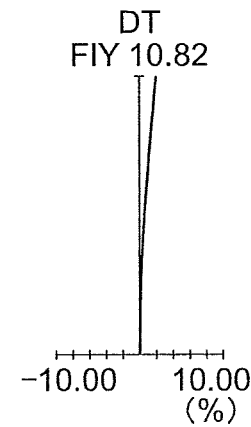
Figure 26H:
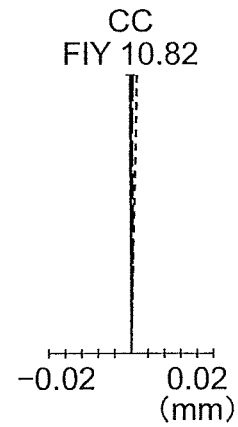
Figure 26I:
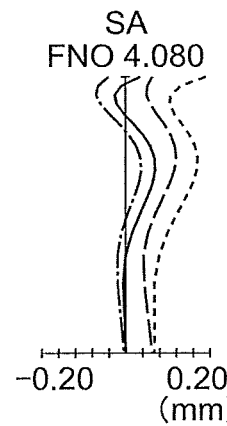
Figure 26J:
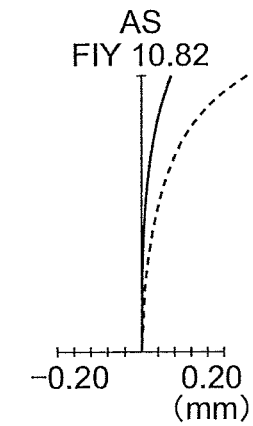
Figure 26K:
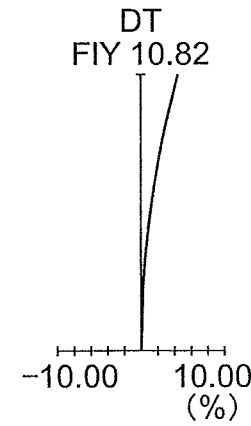
Figure 26L:
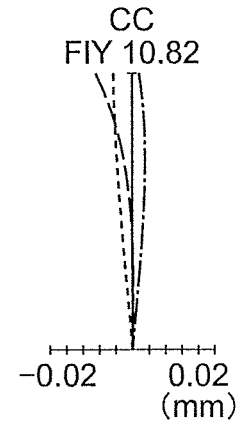
Figure 27A:
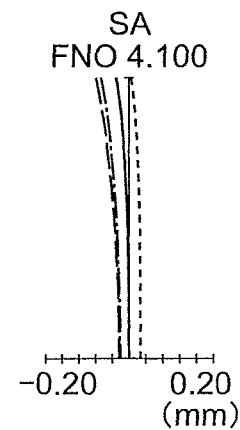
FIG. 27A, FIG. 27B, FIG. 27C, FIG. 27D, FIG. 27E, FIG. 27F, FIG. 27G, FIG. 27H, FIG. 27I, FIG. 27J, FIG. 27K, and FIG. 27L are aberration diagrams of the zoom lens according to the example 12.
Figure 27B:
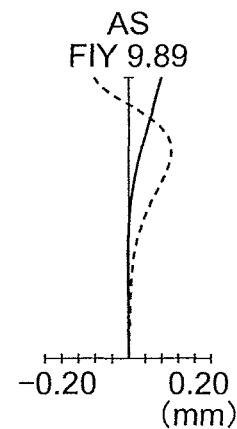
Figure 27C:
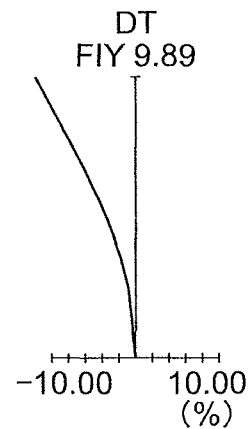
Figure 27D:
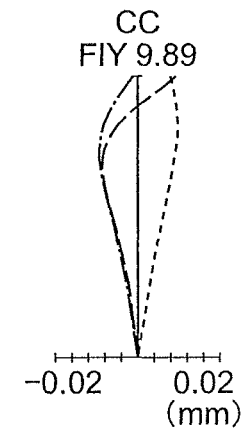
Figure 27E:
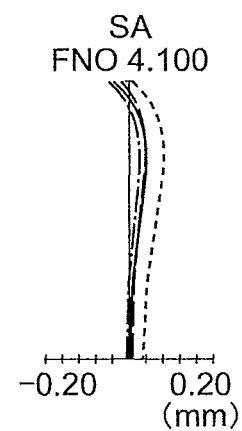
Figure 27F:
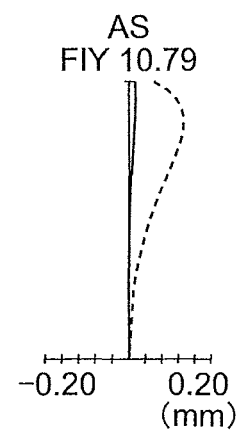
Figure 27G:
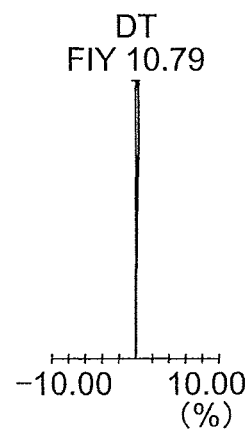
Figure 27H:
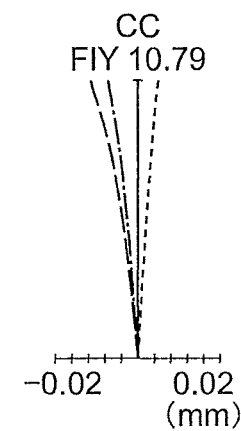
Figure 27I:
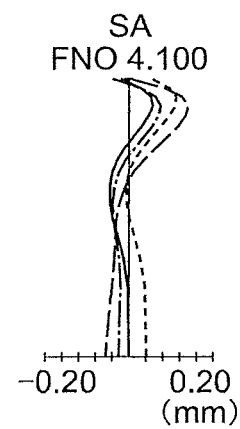
Figure 27J:
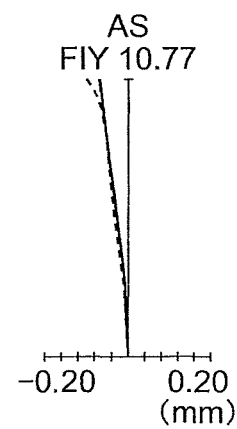
Figure 27K:
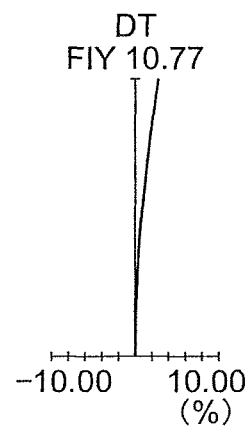
Figure 27L:
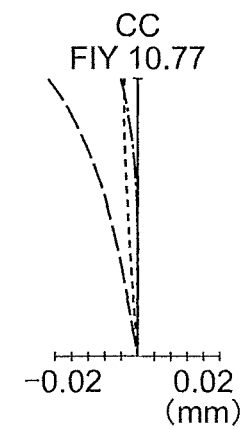
Figure 28A:
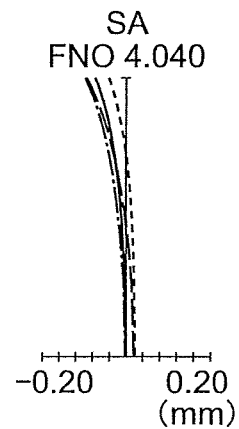
FIG. 28A, FIG. 28B, FIG. 28C, FIG. 28D, FIG. 28E, FIG. 28F, FIG. 28G, FIG. 28H, FIG. 28I, FIG. 29J, FIG. 28K, and FIG. 28L are aberration diagrams of the zoom lens according to the example 13.
Figure 28B:
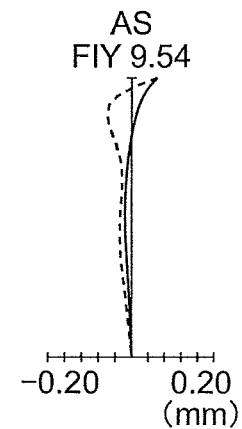
Figure 28C:
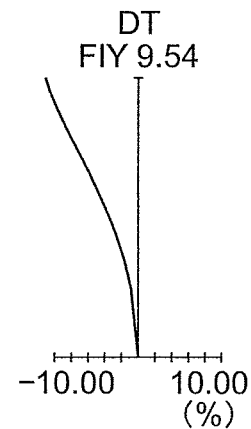
Figure 28D:
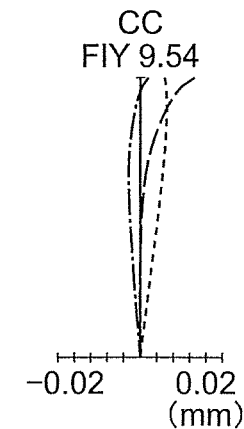
Figure 28E:
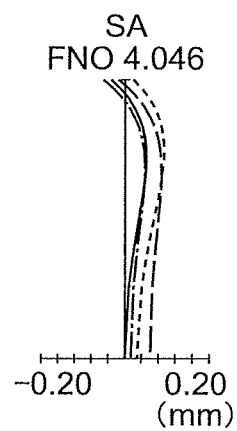
Figure 28F:
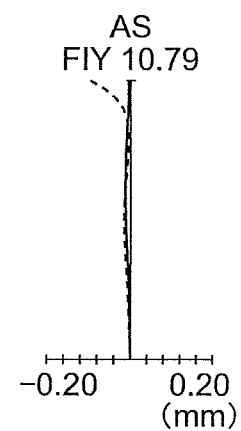
Figure 28G:
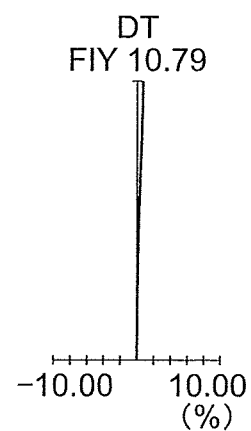
Figure 28H:
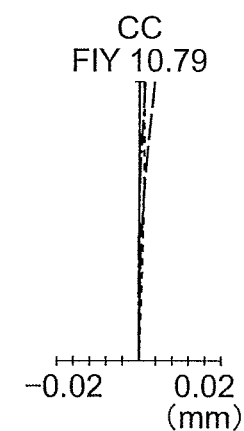
Figure 28I:
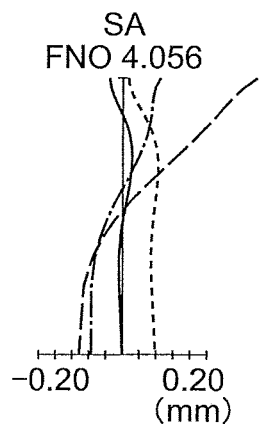
Figure 28J:
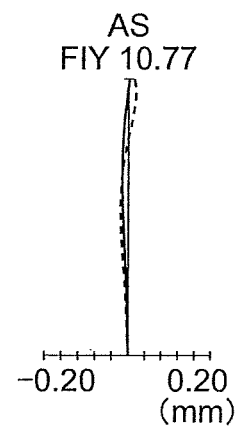
Figure 28K:
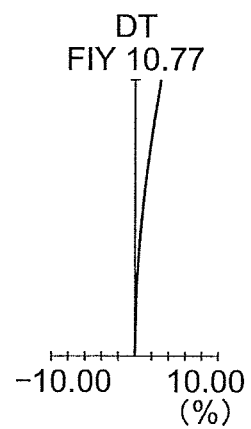
Figure 28L:
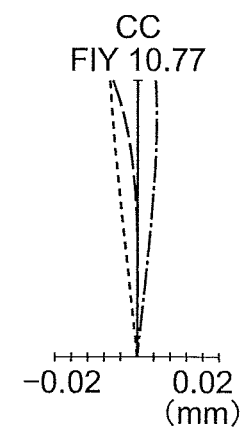
Figure 29A:
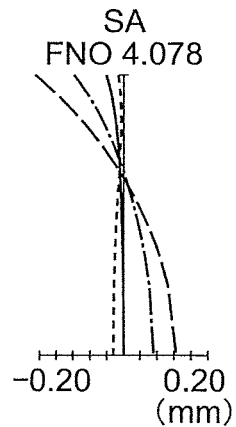
Figure 29B:
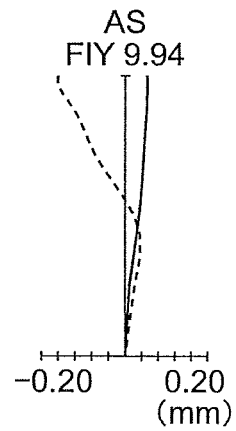
Figure 29C:
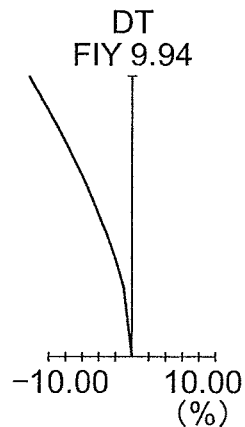
Figure 29D:
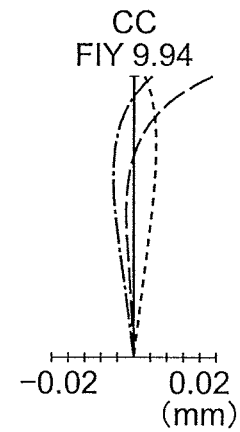
Figure 29E:
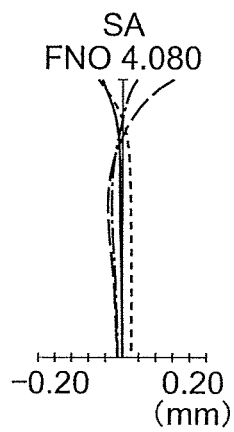
Figure 29F:
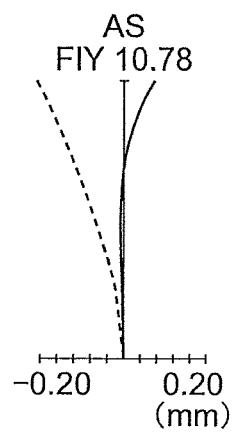
Figure 29G:
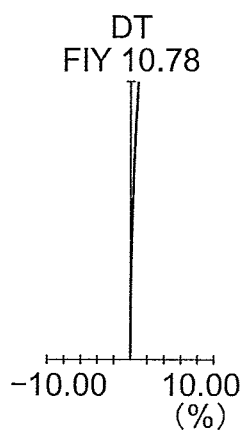
Figure 29H:
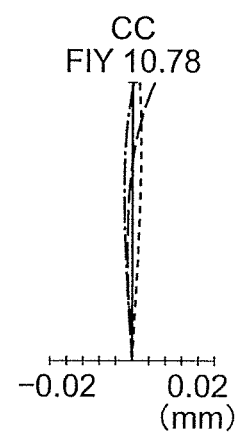
Figure 29I:
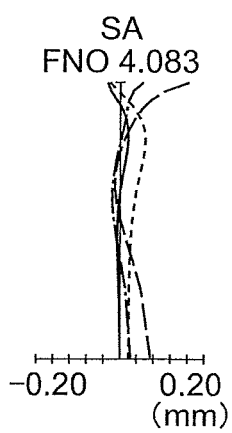
Figure 29J:
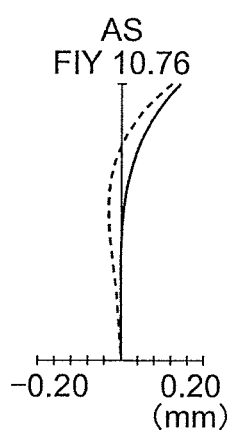
Figure 29K:
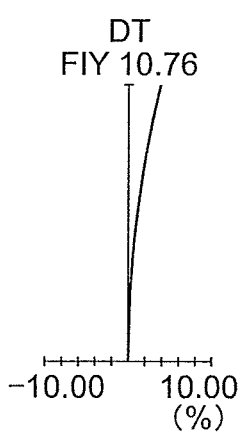
Figure 29L:
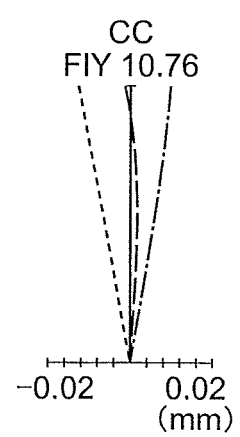
Figure 30A:
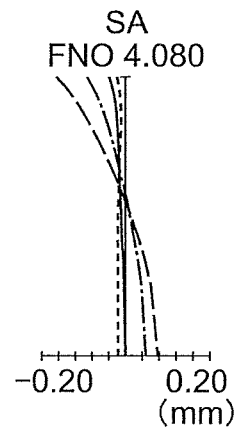
Figure 30B:
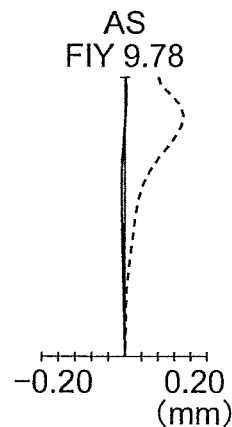
Figure 30C:
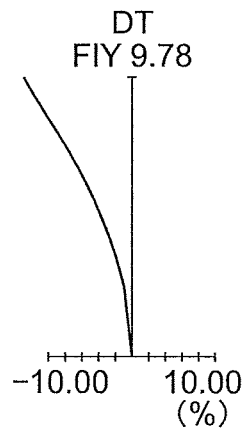
Figure 30D:
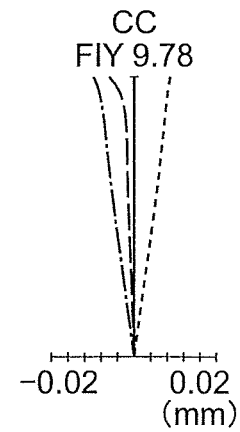
Figure 30E:
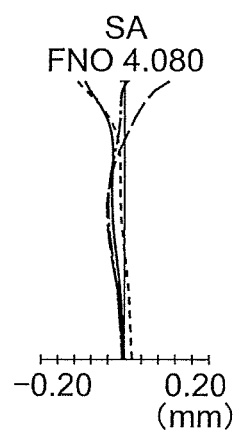
Figure 30F:
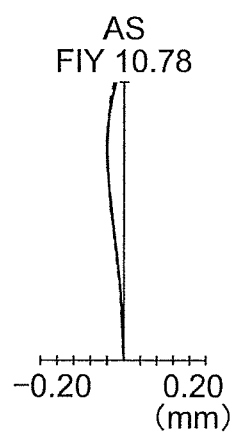
Figure 30G:
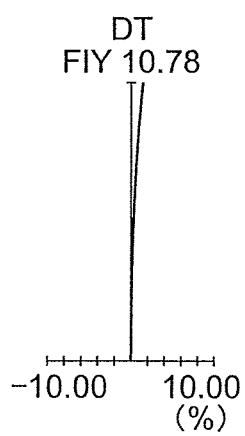
Figure 30H:
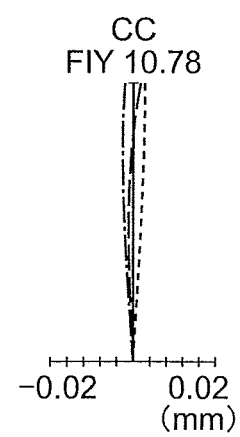
Figure 30I:
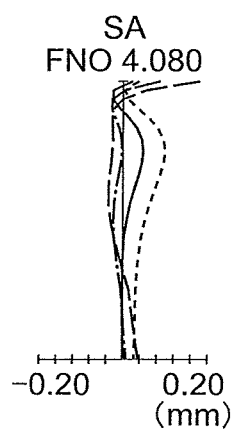
Figure 30J:
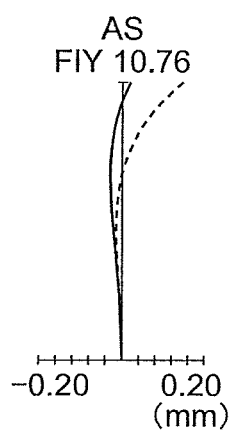
Figure 30K:
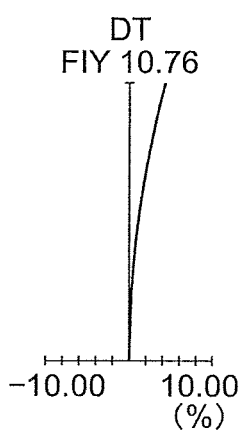
Figure 30L:
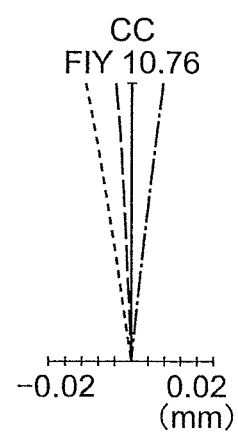

Prior to the explanation of examples, action and effect of embodiments according to certain aspects of the present invention will be described below. In the explanation of the action and effect of the embodiments concretely, the explanation will be made by citing concrete examples. However, similar to a case of the examples to be described later, aspects exemplified thereof are only some of the aspects included in the present invention, and there exists a large number of variations in these aspects. Consequently, the present invention is not restricted to the aspects that will be exemplified.

A basic arrangement of a zoom lens according to the present embodiment will be described below. There are two basic arrangements namely, a first basic arrangement and a second basic arrangement.

The first basic arrangement will be described below. In the first basic arrangement, a zoom lens includes in order from an object side, a first lens unit having a positive refractive power, a second lens unit having a negative refractive power, a third lens unit having a positive refractive power, a fourth lens unit having a negative refractive power, and a fifth lens unit having a positive refractive power, and the first lens unit includes a positive lens, and the second lens unit includes a positive lens, and the following conditional expression (1) is satisfied:

$$-0.015 \leq Tp_{2G\_min\_p} \leq 0.015 \quad (1)$$

where, $Tp_{2G\_min\_p} = \theta gF_{2G\_n} - (-0.0016 \times vd_{2G\_p} + 0.6415)$, $\theta gF_{2G\_p} = (ng_{2G\_p} - nF_{2G\_p})/(nF_{2G\_p} - nC_{2G\_p})$ $vd_{2G\_p}$ denotes Abbe number for a predetermined positive lens in the second lens unit, and $ng_{2G\_p}$, $nF_{2G\_p}$, and $nC_{2G\_p}$ denote refractive indices of the predetermined positive lens in the second lens unit, for a g-line, for an F-line, and for a C-line respectively, here the predetermined positive lens in the second lens unit is a lens for which Abbe number is the smallest, from among the positive lenses in the second lens unit.

It is preferable that the zoom lens have a wide angle of view at a wide angle end, and a high zoom ratio. The wide angle of view is an angle of view for which, a half angle of view is more than 38 degrees, or furthermore, more than 40 degrees. Such a wide angle of view, sometimes, is also called as a super-wide angle of view. Moreover, the high zoom ratio is a zoom ratio of more than six times for example. However, a value of the angle of view and a value of the zoom ratio are not restricted to these values.

For securing a wide angle of view at the wide angle end and shortening the overall length of an optical system, and furthermore, for achieving a high zoom ratio, from the wide angle end up to a telephoto end, it is necessary to make an arrangement of refractive power in the optical system to be an arrangement close to be more symmetrical. The arrangement of refractive power refers to an arrangement of a positive refractive power and a negative refractive power.

In the first basic arrangement, the zoom lens includes in order from the object side, the first lens unit having a positive refractive power, the second lens unit having a negative refractive power, the third lens unit having a positive refractive power, the fourth lens unit having a negative refractive power, and the fifth lens unit having a positive refractive power.

In this case, the arrangement of refractive power is a positive refractive power and a negative refractive power on the object side of the third lens unit, and a negative refractive power and a positive refractive power on the image side of the third lens unit. In other words, in the zoom lens having the first basic arrangement, the arrangement of refractive power on object side and the arrangement of refractive power on the image side are symmetrical across the third lens unit. As a result of this, throughout the entire zoom range, it is possible to shorten the overall length of the optical system, and to correct favorably mainly a curvature of field and a coma.

In the first basic arrangement, among the lens units, a diameter of the first lens unit becomes maximum. Here, since the fourth lens unit has a negative refractive power and the fifth lens unit has a positive refractive power, it is possible to form a magnifying optical system by the fourth lens unit and the fifth lens unit. For this reason, it is possible to make small a lens diameter in the first lens unit.

Thus, according to the first basic arrangement, in the zoom lens having a wide angle of view at the wide angle end, and a high zoom ratio, it is possible to make the optical system small-sized, and moreover, it is possible to secure a favorable imaging performance.

Moreover, in the first basic arrangement, mainly the second lens unit and the third lens unit are responsible for a zooming effect. Therefore, for improving the zoom ratio as well as shortening the overall length of the optical system, it is preferable to make large the refractive power of the second lens unit and the refractive power of the third lens unit.

In the second lens unit, mainly a chromatic aberration of magnification occurs near the wide angle end and a longitudinal chromatic aberration occurs near the telephoto end. For correcting a chromatic aberration of the second lens unit having a negative refractive power, it is necessary to let Abbe number for the positive lens used in the second lens unit to be on a high-dispersion side as much as possible. Letting Abbe number to be on the high-dispersion side refers to making Abbe number small or making the dispersion large.

However, when the refractive power of the second lens unit is made large in a state of Abbe number of the positive lens let to be on the high-dispersion side, due to this, sometimes a secondary spectrum occurs substantially. Therefore, for maintaining a state in which the chromatic aberration is suppressed favorably throughout the entire zoom range, it is effective to use a glass material having a characteristic that enables to reduce the occurrence of the secondary spectrum for the positive lens in the second lens unit.

For such reason, in the first basic arrangement, an arrangement is made such that the predetermined lens satisfies conditional expression (1). By the predetermined lens satisfying conditional expression (1), it is possible to suppress an increase in the secondary spectrum even when the refractive power of the second lens unit is made large.

By making so as not to fall below a lower limit value of conditional expression (1), it is possible to correct adequately the secondary spectrum that occurs in the second lens unit. In this case, since it is possible to suppress an increase of occurrence in the longitudinal chromatic aberration and the chromatic aberration of magnification, it is possible to achieve a favorable imaging performance. By making so as not to exceed an upper limit value of conditional expression (1), since it is possible to weaken the tendency of the correction of the secondary spectrum in the second lens unit becoming excessive, it is possible to correct the longitudinal chromatic aberration and the chromatic aberration of magnification in a balanced manner.

The second basic arrangement will be described below. In the second basic arrangement, a zoom lens includes in order from an object side, a first lens unit having a positive refractive power, a second lens unit having a negative refractive power, a third lens unit having a positive refractive power, a fourth lens unit having a negative refractive power, and a fifth lens unit having a positive refractive power, and the first lens unit includes a positive lens, and the second lens unit includes a negative lens, and the third lens unit includes a positive lens, and the following conditional expression (2) is satisfied:

$$70.3 \leq vd_{1G\_max\_p} \quad (2)$$

where, $vd_{1G\_max\_p}$ denotes a maximum Abbe number from among Abbe numbers for the positive lenses in the first lens unit.

In the second basic arrangement, the zoom lens includes in order from the object side, the first lens unit having a positive refractive power, the second lens unit having a negative refractive power, the third lens unit having a positive refractive power, the fourth lens unit having a negative refractive power, and the fifth lens unit having a positive refractive power. This arrangement has also been used in the first basic arrangement. Therefore, an action and an effect described in the first basic arrangement are achieved also in the second basic arrangement.

As described above, it is preferable that the zoom lens have a wide angle of view at the wide angle end, and a high zoom ratio. Particularly, in a zoom lens with a high zoom ratio such as a zoom lens having the zoom ratio of more than six times, sometimes, both an amount of occurrence of the chromatic aberration of magnification at the wide angle end and an amount of occurrence of the longitudinal chromatic aberration at the telephoto end increase. The chromatic aberration that occurs near the telephoto end in the first lens unit is enhanced substantially in a lens unit positioned on the image side of the first lens unit. Therefore, by satisfying conditional expression (2), it is possible to suppress the occurrence of the chromatic aberration.

By making so as not to fall below a lower limit value of conditional expression (2), it is possible to prevent the correction of the chromatic aberration of magnification in the first lens unit from being inadequate. Therefore, it is possible to suppress an increase of occurrence in the longitudinal chromatic aberration near the telephoto end. As a result, it is possible to achieve a favorable imaging performance.

Zoom lenses of embodiments from a first embodiment up to a fifth embodiment will be described below.

A zoom lens according to a first embodiment has the first basic arrangement, and the following conditional expressions (2), (3), and (4) are satisfied:

$$70.3 \le vd_{1G\_max\_p} \quad (2),$$

$$1.76 \le nd_{2G\_max\_p} \le 2.3 \quad (3), \text{ and}$$

$$0.3 \le |f_2/f_3| \le 0.9 \quad (4)$$

where, $vd_{1G\_max\_p}$ denotes the maximum Abbe number from among Abbe numbers for the positive lenses in the first lens unit, $ng_{2G\_max\_p}$ denotes a maximum refractive index from among refractive indices of the positive lenses in the second lens unit, $f_2$ denotes a focal length of the second lens unit, and
$f_3$ denotes a focal length of the third lens unit.

Since technical significance of conditional expression (2) has already been described, the description thereof is omitted here.

For small-sizing the optical system, it is preferable to make the refractive power of the second lens unit large. When the refractive power of the second lens unit is made large, mainly an astigmatism and a spherical aberration are deteriorated sometimes. For preventing deterioration of these aberrations, it is desirable to dispose a positive lens and a negative lens in the second lens unit, and to make a refractive index of each lens high. At this time, it is preferable to satisfy conditional expression (3).

By making so as not to fall below a lower limit value of conditional expression (3), it is possible to suppress both an increase in fluctuation of the curvature of field and an increase in fluctuation of the spherical aberration. As a result, it is possible to achieve a favorable imaging performance. By making so as not to exceed an upper limit value of conditional expression (3), since it is possible to weaken a tendency of Petzval surface to be inclined toward plus, it is possible to suppress an increase in the curvature of field.

Moreover, as described above, for achieving a high zoom ratio and shortening the overall length of the optical system, it is preferable to make both the refractive power of the second lens unit and the refractive power of the third lens unit large. However, when the negative refractive power of the second lens unit is made large, a refraction effect with respect to a light ray on an incidence-side surface of the second lens unit is enhanced. Therefore, a diameter of the first lens unit tends to increase.

For shortening the overall length of the optical system and making small a diameter of the optical system, it is preferable to balance the refractive power of the second lens unit and the refractive power of the third lens unit while making both larger. For this, it is preferable to satisfy conditional expression (4).

By making so as not to fall below a lower limit value of conditional expression (4), it becomes easy to make the diameter of the optical system small. Moreover, since the refractive power of the second lens unit does not become excessively large, it becomes easy to suppress the occurrence of the curvature of field. By making so as not to exceed an upper limit value of conditional expression (4), it becomes easy to shorten the overall length of the optical system. Moreover, since the refractive power of the third lens unit does not become excessively large, it becomes easy to suppress the occurrence of the spherical aberration from the wide angle end up to the telephoto end.

A zoom lens according to the second embodiment has the first basic arrangement, and the following conditional expressions (2'), (3'), and (5) are satisfied:

$$70.5 \le vd_{1G\_max\_p} \quad (2'),$$

$$1.7 \le nd_{2G\_max\_p} \le 2.3 \quad (3'), \text{ and}$$

$$2.0 \le f_1/f_3 \le 6.3 \quad (5)$$

where, $vd_{1G\_max\_p}$ denotes the maximum Abbe number from among Abbe numbers for the positive lenses in the first lens unit, $nd_{2G\_max\_p}$ denotes the maximum refractive index from among refractive indices of the positive lenses in the second lens unit, $f_1$ denotes a focal length of the first lens unit, and
$f_3$ denotes the focal length of the third lens unit.

Technical significance of conditional expression (2') is same as the technical significance of conditional expression (2). Moreover, technical significance of conditional expression (3') is same as the technical significance of conditional expression (3).

As mentioned above, in the first basic arrangement, mainly the second lens unit and the third lens unit are responsible for the zooming effect, but the first lens unit also contributes to enhancement of the zooming effect. For such reason, for achieving a high zoom ratio and shortening the overall length of the optical system, it is preferable to make large the refractive power of the first lens unit as well.

However, when the refractive power of the first lens unit is made large, since a position of an entrance pupil with respect to the first lens unit, moves further toward the image side and away from the first lens unit, a diameter of the first lens unit increases. Therefore, for shortening the overall length of the optical system and making small the diameter of the optical system, it is preferable to balance the refractive power of the first lens unit and the refractive power of the third lens unit while making them larger. For this, it is preferable to satisfy conditional expression (5).

By making so as not to fall below a lower limit value of conditional expression (5), it becomes easy either to make the diameter of the optical system small or to shorten the overall length of the optical system. Moreover, since the refractive power of the first lens unit does not become excessively large, an aberration is not susceptible to occur. By making so as not to exceed an upper limit value of conditional expression (5), it becomes easy either to shorten the overall length of the optical system or to secure an appropriate back focus. Moreover, since the refractive power of the third lens unit does not become excessively large, an aberration is not susceptible to occur.

A zoom lens according to a third embodiment has the first basic arrangement, and the following conditional expressions (2''), (3'), and (6) are satisfied:

$$64 \le vd_{1G\_max\_p} \quad (2''),$$

$$1.7 \le nd_{2G\_max\_p} \le 2.3 \quad (3'), \text{ and}$$

$$1.05 \le |\Phi_{max}/f_2| \le 3.0 \quad (6)$$

where, $vd_{1G\_max\_p}$ denotes the maximum Abbe number from among Abbe numbers for the positive lenses in the first lens unit, $nd_{2G\_max\_p}$ denotes the maximum refractive index from among refractive indices of the positive lenses in the second lens unit, $\Phi_{maxt}$ denotes a maximum diameter of an entrance pupil at a telephoto end, and is expressed by $\Phi_{maxt}=f_t/Fno_t$, here $f_t$ denotes a focal length of the overall zoom lens system at the telephoto end, and $Fno_t$ denotes a smallest F-number at the telephoto end, and $f_2$ denotes the focal length of the second lens unit.

Technical significance of conditional expression (2") is same as the technical significance of conditional expression (2). Moreover, technical significance of conditional expression (3') is same as the technical significance of conditional expression (3).

As mentioned above, for small-sizing of the optical system, it is necessary to make the refractive power of the second lens unit large. However, when the refractive power of the second lens unit is made large, mainly amounts of occurrence of the spherical aberration, the curvature of field, the chromatic aberration of magnification, and the longitudinal chromatic aberration become large. Therefore, for suppressing the occurrence of these aberrations and making the F-number small, it is preferable to satisfy conditional expression (6). By satisfying conditional expression (6), it is possible to realize an optical system with a small F-number.

By making so as not to fall below a lower limit value of conditional expression (6), it becomes easy to shorten the overall length of the optical system. By making so as not to exceed an upper limit value of conditional expression (6), it is possible to suppress an increase of aberrations in the second lens unit, or in other words, mainly an increase in an amounts of occurrence of the spherical aberration, the curvature of field, the chromatic aberration of magnification, and the longitudinal chromatic aberration. In this case, since it is not necessary to increase the number of lenses for aberration correction in the second lens unit, small-sizing of the optical system is facilitated.

A zoom lens according to a fourth embodiment has the second basic arrangement, and the following conditional expressions (7), (8), (9), and (10) are satisfied:

$$54 \leq vd_{2G\_max\_n} \quad (7),$$

$$63 \leq vd_{3G\_max\_p} \quad (8),$$

$$1.0 \leq vd_{4G\_max\_n} - vd_{4G\_min\_p} \leq 50 \quad (9), \text{ and}$$

$$23 \leq vd_{5G\_min\_p} \quad (10)$$

where, $vd_{2G\_max\_n}$ denotes a maximum Abbe number from among Abbe numbers for the negative lenses in the second lens unit, $vd_{3G\_max\_p}$ denotes a maximum Abbe number from among Abbe numbers for the positive lenses in the third lens unit, $vd_{4G\_max\_n}$ denotes a maximum Abbe number from among Abbe numbers for the negative lenses in the fourth lens unit, $vd_{4G\_min\_p}$ denotes a minimum Abbe number from among Abbe numbers for the positive lenses in the fourth lens unit, and $vd_{5G\_min\_p}$ denotes a minimum Abbe number from among Abbe numbers for the positive lenses in the fifth lens unit.

As described above, for shortening the overall length of the optical system, it is preferable to make the refractive power of the second lens unit large. However, when the refractive power of the second lens unit is made large, sometimes, mainly the chromatic aberration of magnification occurs near the wide angle end and the longitudinal chromatic aberration occurs near the telephoto end. For correcting the chromatic aberration of the second lens unit having a negative refractive power, it is preferable to let Abbe number for the positive lens to be used in the second lens unit to be on the high-dispersion side and to let Abbe number for the negative lens to be used in the second lens unit to be on a low-dispersion side. For this, it is preferable to satisfy conditional expression (7).

By making so as not to fall below a lower limit value of conditional expression (7), it is possible to correct adequately both the chromatic aberration of magnification near the wide angle end and the longitudinal chromatic aberration near the telephoto end. As a result, it is possible to achieve a favorable imaging performance.

Moreover, for shortening the overall length of the optical system, it is preferable to make the refractive power of the third lens unit large. However, when the refractive power of the third lens unit is made large, sometimes, mainly the longitudinal chromatic aberration occurs near the telephoto end. For correcting the chromatic aberration of the third lens unit having a positive refractive power, it is preferable to let Abbe number for the positive lens to be used in the third lens unit to be on the low-dispersion side and to let Abbe number for the negative lens to be used in the third lens unit to be on the high-dispersion side. For this, it is preferable to satisfy conditional expression (8).

By making so as not to fall below a lower limit value of conditional expression (8), it is possible to correct adequately the longitudinal chromatic aberration near the telephoto end. As a result, it is possible to achieve a favorable imaging performance. Or, since the refractive power of the third lens unit does not become excessively small, it becomes easy to shorten the overall length of the optical system.

Moreover, in the fourth lens unit having a negative refractive power, by a combination with the fifth lens unit having a positive refractive power, it is possible to enhance an effect of correcting mainly the curvature of field. Accordingly, it is possible to secure a favorable imaging performance throughout the entire zoom range.

Whereas, by an imaging magnification of the fourth lens unit becoming high, sometimes, mainly amounts of occurrence of the longitudinal chromatic aberration and the spherical aberration become large. For securing a favorable imaging performance throughout the entire zoom range, it is preferable to correct these aberrations. For this, it is preferable to satisfy conditional expression (9).

By making so as not to fall below a lower limit value of conditional expression (9), it is possible to correct the longitudinal chromatic aberration adequately. As a result, it is possible to achieve a favorable imaging performance. By making so as not to exceed an upper limit value of conditional expression (9), it becomes easy to correct both the chromatic aberration and the spherical aberration. As a result, it is possible to achieve a favorable imaging performance.

By making so as not to fall below a lower limit value of conditional expression (10), it is possible to suppress an increase in the chromatic aberration in the fifth lens unit. As a result, it is possible to achieve a favorable imaging performance. Moreover, since the increase in the chromatic aberration is suppressed, it is not necessary to make Abbe number for the negative lens to be smaller than Abbe number for the positive lens (it is not necessary to make the dispersion high). In this case, since a partial dispersion of the negative lens does not increase, correction of the chromatic aberration becomes easy.

A zoom lens according the fifth embodiment has the second basic arrangement, and the second lens unit includes a negative lens having a concave surface directed toward an image side, which is positioned nearest to object, and in the negative lens which is positioned nearest to object, an absolute value of a radius of curvature of an image-side surface is smaller as compared to an absolute value of a radius of curvature of an object-side surface, and the following conditional expressions (7'), (8'), (11), and (12) are satisfied:

$$55 \leq vd_{2G\_max\_n} \qquad (7'),$$

$$70.5 \leq vd_{3G\_max\_p} \qquad (8),$$

$$-0.012 \leq Tp_{2G\_max\_n} \leq 0.06 \qquad (11), \text{ and}$$

$$1.78 \leq nd_{2G\_max\_n} \leq 2.3 \qquad (12)$$

where, $vd_{2G\_max\_n}$ denotes the maximum Abbe number from among Abbe numbers for the negative lenses in the second lens unit, $vd_{3G\_max\_p}$ denotes the maximum Abbe number from among Abbe numbers for the positive lenses in the third lens unit, $Tp_{2G\_max\_n} = \theta gF_{2G\_n} - (-0.0016 \times vd_{2G\_n} + 0.6415)$,
$\theta gF_{2G\_n} = (ng_{2G\_n} - nF_{2G\_n})/(nF_{2G\_n} - nC_{2G\_n})$
$vd_{2G\_n}$ denotes Abbe number for a predetermined negative lens in the second lens unit, $ng_{2G\_n}$, $nF_{2G\_n}$, and $nC_{2G\_n}$ denote refractive indices of the predetermined negative lens in the second lens unit, for a g-line, for an F-line, and for a C-line respectively, here the predetermined negative lens in the second lens unit is a lens for which Abbe number is the largest, from among the negative lenses in the second lens unit, and $nd_{2G\_max\_n}$ denotes a maximum refractive index from among refractive indices of the negative lenses in the second lens unit.

Technical significance of conditional expression (7') is same as the technical significance of conditional expression (7). Moreover, technical significance of conditional expression (8') is same as the technical significance of conditional expression (8).

In the second lens unit, sometimes, mainly the chromatic aberration of magnification occurs near the wide angle end and the longitudinal chromatic aberration occurs near the telephoto end. For suppressing the chromatic aberration of the second lens unit having a negative refractive power, it is preferable to let Abbe number for the positive lens to be used in the second lens unit to be on the high-dispersion side as much as possible.

However, when the refractive power of the second lens unit is made large in a state of Abbe number for the positive lens let to be on the high-dispersion side, due to this, the tendency of the secondary spectrum occurring substantially becomes strong. Therefore, for maintaining a state in which the chromatic aberration has been suppressed favorably throughout the entire zoom range, it is effective to use a glass material having a characteristic of being capable of correcting the secondary spectrum for the negative lens in the second lens unit. For this, it is preferable to satisfy conditional expression (11).

By making so as not to fall below a lower limit value of conditional expression (11), it is possible to correct adequately the secondary spectrum that occurs in the second lens unit. In this case, since it is possible to suppress an increase of occurrence in the longitudinal chromatic aberration and the chromatic aberration of magnification, a favorable imaging performance is achieved. By making so as not to exceed an upper limit value of conditional expression (11), since it is possible to weaken the tendency of the correction of the secondary spectrum in the second lens unit becoming excessive, it is possible to correct the longitudinal chromatic aberration and the chromatic aberration of magnification in a balanced manner.

For making the F-number small as well as for facilitating high zooming ratio and shortening of the overall length of the optical system, it is necessary to make the refractive power of the second lens unit large. However, sometimes, a change in a light-ray height at the time of zooming becomes large at a position nearest to object of the second lens unit. When the change in the light-ray height is large, a change in an angle of refraction of a light ray at a lens nearest to object becomes large. For this reason, when the refractive power of the second lens unit is made large, due to this, mainly a fluctuation in the curvature of field at the time of zooming becomes large.

Therefore, it is preferable to dispose the negative lens having a concave surface directed toward the image side, nearest to object in the second lens unit. Moreover, it is preferable to let the absolute value of the radius of curvature of the image-side surface of the negative lens to be smaller as compared to the absolute value of the radius of curvature of the object-side surface. By making such arrangement, it is possible to ease the large change in the angle of refraction of a light ray at a lens surface at the time of zooming. As a result, it is possible to make small a fluctuation in the curvature of field at the time of zooming.

Moreover, by satisfying conditional expression (12), it is possible to further reduce the fluctuation in the curvature of field at the time of zooming. As a result, it is possible to make the F-number small throughout the entire zoom range as well as to achieve high zooming ratio, while maintaining a favorable imaging performance. The small F-number refers to an F-number of 5.0 or less for example, and the high zoom ratio refers to a zoom ratio of more than six times for example.

By making so as not to fall below a lower limit value of conditional expression (12), it is possible to achieve adequately an effect of correction of the curvature of field. By making so as not to exceed an upper limit value of conditional expression (12), it is possible to reduce the tendency of an overall image plane from being inclined toward a minus side. As a result, it is possible to achieve a favorable imaging performance.

Moreover, in the zoom lenses according to embodiments from the first embodiment to the fifth embodiment (hereinafter, referred to as 'the zoom lens according to the present embodiment'), it is preferable that the following conditional expression (4) be satisfied:

$$0.3 \leq |f_2/f_3| \leq 0.9 \qquad (4)$$

where, $f_2$ denotes the focal length of the second lens unit, and
$f_3$ denotes the focal length of the third lens unit.

Since the technical significance of conditional expression (4) has already been described, the description thereof is omitted here.

Moreover, in the zoom lens according to the present embodiment, it is preferable that the following conditional expression (5) be satisfied:

$$2.0 \leq f_1/f_3 \leq 6.3 \tag{5}$$

where, $f_1$ denotes the focal length of the first lens unit, and
$f_3$ denotes the focal length of the third lens unit.

Since the technical significance of conditional expression (5) has already been described, the description thereof is omitted here.

Moreover, in the zoom lens according to the present embodiment, it is preferable that the following conditional expression (6) be satisfied:

$$1.05 \leq |\Phi_{maxt}/f_2| \leq 3.0 \tag{6}$$

where, $\Phi_{maxt}$ denotes the maximum diameter of an entrance pupil at a telephoto end, and is expressed by $\Phi_{maxt}=f_t/Fno_t$, here $f_t$ denotes the focal length of the overall zoom lens system at the telephoto end, and $Fno_t$ denotes the smallest F-number at the telephoto end, and $f_2$ denotes the focal length of the second lens unit.

Since the technical significance of conditional expression (6) has already been described, the description thereof is omitted here.

Moreover, in the zoom lens according to the present embodiment, it is preferable that the second lens unit include at least a negative lens and a positive lens, and the following condition expression (7) be satisfied:

$$54 \leq vd_{2G\_max\_n} \tag{7}$$

where, $vd_{2G\_max\_n}$ denotes the maximum Abbe number from among Abbe numbers for the negative lenses in the second lens unit, Since the technical significance of conditional expression (7) has already been described, the description thereof is omitted here.

Moreover, in the zoom lens according to the present embodiment, it is preferable that the following conditional expression (11) be satisfied:

$$-0.012 \leq Tp_{2G\_max\_n} \leq 0.06 \tag{11}$$

where, $Tp_{2G\_max\_n} = \theta gF_{2G\_n} - (-0.0016 \times vd_{2G\_n} + 0.6415)$,
$\theta gF_{2G\_n} = (ng_{2G\_n} - nF_{2G\_n})/(nF_{2G\_n} - nC_{2G\_n})$ $vd_{2G\_n}$ denotes Abbe number for a predetermined negative lens in the second lens unit, and $ng_{2G\_n}$, $nF_{2G\_n}$, and $nC_{2G\_n}$ denote refractive indices of the predetermined negative lens in the second lens unit, for a g-line, for an F-line, and for a C-line respectively, here the predetermined negative lens in the second lens unit is a lens for which Abbe number is the largest, from among the negative lenses in the second lens unit.

Since the technical significance of conditional expression (11) has already been described, the description thereof is omitted here.

Moreover, in the zoom lens according to the present embodiment, it is preferable that the following conditional expression (8) be satisfied:

$$63 \leq vd_{3G\_max\_p} \tag{8}$$

where, $vd_{3G\_max\_p}$ denotes the maximum Abbe number from among Abbe numbers for the positive lenses in the third lens unit.

Since the technical significance of conditional expression (8) has already been described, the description thereof is omitted here.

Moreover, in the zoom lens according to the present embodiment, it is preferable that the following conditional expression (13) be satisfied:

$$0.005 \leq Tp_{3G\_max\_p} \leq 0.06 \tag{13}$$

where, $Tp_{3G\_max\_p} = \theta F_{3G\_p} - (-0.0016 \times vd_{3G\_p} + 0.6415)$,
$\theta gF_{3G\_p} = (ng_{3G\_p} - nF_{3G\_p})/(nF_{3G\_p} - nC_{3G\_p})$ $vd_{3G\_p}$ denotes Abbe number for a predetermined positive lens in the third lens unit, and $ng_{3G\_p}$, $nF_{3G\_p}$, and $nC_{3G\_p}$ denote refractive indices of the predetermined positive lens in the third lens unit, for a g-line, for an F-line, and for a C-line respectively, here the predetermined positive lens in the third lens unit is a lens for which Abbe number is the largest, from among the positive lenses in the third lens unit.

For shortening the overall length of the optical system, it is preferable to make the refractive power of the third lens unit large. However, when the refractive power of the third lens unit is made large, sometimes, mainly the longitudinal chromatic aberration occurs near the telephoto end. For correcting the chromatic aberration of the third lens unit having a positive refractive power, it is preferable to let Abbe number for the positive lens to be used in the third lens unit to be on the low-dispersion side and to let Abbe number for the negative lens to be used in the third lens unit to be on the high-dispersion side.

However, when the refractive power of the third lens unit is made large in such state, due to this, the tendency of the secondary spectrum and the spherical aberration occurring substantially becomes strong. Therefore, for maintaining a state in which the chromatic aberration is suppressed favorably throughout the entire zoom range, it is effective to use a glass material having a characteristic that enables to reduce the occurrence of the secondary spectrum and the spherical aberration for the positive lens in the third lens unit. For this, it is preferable to satisfy conditional expression (13).

By making so as not to fall below a lower limit value of conditional expression (13), it is possible to correct adequately the second spectrum that occurs in the third lens unit. In this case, since it is possible to suppress an increase of occurrence in the longitudinal chromatic aberration and the chromatic aberration of magnification, a favorable imaging performance is achieved. By making so as not to exceed an upper limit value of conditional expression (13), it is possible to weaken the tendency of the correction of the secondary spectrum in the third lens unit becoming excessive. As a result, it is possible to correct the secondary spectrum and the spherical aberration, with the lesser number of lenses.

Moreover, in the zoom lens according to the present embodiment, it is preferable that the following conditional expression (9) be satisfied:

$$1.0 \leq vd_{4G\_max\_n} - vd_{4G\_min\_p} \leq 50 \tag{9}$$

where, $vd_{4G\_max\_n}$ denotes the maximum Abbe number from among Abbe numbers for the negative lenses in the fourth lens unit, and $vd_{4G\_min\_p}$ denotes the minimum Abbe number from among Abbe numbers for the positive lenses in the fourth lens unit.

Since the technical significance of conditional expression (9) has already been described, the description thereof of is omitted here.

Moreover, in the zoom lens according to the present embodiment, it is preferable that the following conditional expression (14) is satisfied:

$$1.0 \leq LTL_t/f_t \leq 2.8 \quad (14)$$

where, $LTL_t$ denotes a total length of the overall zoom lens system at the telephoto end, and $f_t$ denotes the focal length of the overall zoom lens system at the telephoto end.

By making so as not to fall below a lower limit value of conditional expression (14), it is possible to achieve an adequate space for a movement of each lens unit at the time of zooming. As a result, it is possible to achieve a high zoom ratio such as a zoom ratio of more than six times. Moreover, since it is not necessary to make the refractive power of each lens unit large forcedly, it is possible to suppress deterioration of an aberration.

By making so as not to exceed an upper limit value of conditional expression (14), it is possible to suppress an increase in the diameter of the first lens unit at the telephoto end. As a result, it becomes easy to shorten the overall length of the optical system and to small-size the diameter of the optical system. Moreover, since it is possible to suppress an increase in an amount of movement of the first lens unit as well as to suppress an increase in the number of frames of the lens units which move, it becomes easy to make the diameter of the optical system small.

Moreover, in the zoom lens according to the present embodiment, it is preferable that the following conditional expression (15) be satisfied:

$$0.7 \leq LTL_w/f_t \leq 2.2 \quad (15)$$

where, $LTL_w$ denotes a total length of the overall zoom lens system at the wide angle end, and $f_t$ denotes the focal length of the overall zoom lens system at the telephoto end.

By making so as not to fall below a lower limit value of conditional expression (15), it is possible to achieve an adequate space for a movement of each lens unit at the time of zooming. As a result, it is possible to achieve a high zoom ratio such as a zoom ratio of more than six times. Moreover, since it is possible to suppress an increase in the amount of movement of the first lens unit as well as to suppress an increase in the number of frames of the lens units which move, it becomes easy to make the diameter of the optical system small. Moreover, since it is not necessary to make the refractive power of each lens unit large forcedly, it is possible to suppress deterioration of an aberration.

By making so as not to exceed an upper limit value of conditional expression (15), it is possible to suppress an increase in the diameter of the first lens unit at the wide angle end or to suppress an increase in the diameter of the second lens unit. As a result, it becomes easy to make the diameter of the optical system small.

Moreover, in the zoom lens according to the present embodiment, it is preferable that the following conditional expression (16) be satisfied:

$$0.7 \leq f_1/f_t \leq 1.6 \quad (16)$$

where, $f_1$ denotes the focal length of the first lens unit, and $f_t$ denotes the focal length of the overall zoom lens system at the telephoto end.

By making so as not to fall below a lower limit value of conditional expression (16), the refractive power of the first lens unit does not become excessively large. As a result, it becomes easy to make the diameter of the first lens unit small. Moreover, since the refractive power of the first lens unit does not become excessively large, it is possible to suppress an occurrence of the chromatic aberration. By making so as not to exceed an upper limit value of conditional expression (16), the refractive power of the first lens unit does not become excessively small. Consequently, it becomes easy to shorten the overall length of the optical system.

Moreover, in the zoom lens according to the present embodiment, it is preferable that the following conditional expression (17) be satisfied:

$$0.005 \leq Tp_{1G\_max\_p} \leq 0.06 \quad (17)$$

where, $Tp_{1G\_max\_p} = \theta gF_{1G\_p} - (-0.0016 \times vd_{1G\_p} + 0.6415)$, $\theta gF_{1G\_p} = (ng_{1G\_p} - nF_{1G\_p})/(nF_{1G\_p} - nC_{1G\_p})$ $vd_{1G\_p}$ denotes Abbe number for a predetermined positive lens in the first lens unit, and $ng_{1G\_p}$, $nF_{1G\_p}$, and $nC_{1G\_p}$ denote refractive indices of the predetermined positive lens in the first lens unit, for a g-line, for an F-line, and for a C-line respectively, and here the predetermined positive lens in the first lens unit is a lens for which Abbe number is the largest, from among the positive lenses in the first lens unit.

For shortening the overall length of the optical system, it is preferable to make the refractive power of the first lens unit large. However, when the refractive power of the first lens unit is made large, sometimes, mainly the longitudinal chromatic aberration occurs near the telephoto end. For correcting the chromatic aberration of the first lens unit having a positive refractive power, it is preferable to let Abbe number for the positive lens to be used in the first lens unit to be on the low-dispersion side and to let Abbe number for the negative lens to be used in the first lens unit to be on the high-dispersion side.

However, when the refractive power of the first lens unit is made large in such state, due to this, the tendency of the secondary spectrum and the spherical aberration occurring substantially becomes strong. Therefore, for maintaining a state in which the chromatic aberration is suppressed favorably throughout the entire zoom range, it is effective to use a glass material having a characteristic that enables to reduce the occurrence of the secondary spectrum and the spherical aberration for the positive lens in the first lens unit. For this, it is preferable to satisfy conditional expression (17).

By making so as not to fall below a lower limit value of conditional expression (17), it is possible to correct adequately the secondary spectrum that occurs in the first lens unit. In this case, since it is possible to suppress an increase of occurrence in the longitudinal chromatic aberration and the chromatic aberration of magnification, a favorable imaging performance is achieved. By making so as not to exceed an upper limit value of conditional expression (17), it is possible to weaken the tendency of the correction of the secondary spectrum in the first lens unit becoming excessive. As a result, it is possible to secure appropriately a balance of correction of the secondary spectrum and correction of the spherical aberration, with the lesser number of lenses.

Moreover, in the zoom lens according to the present embodiment, it is preferable that the fourth lens unit be a focusing lens unit.

A diameter of a light beam incident on the fourth lens unit is small due to the positive refractive power of the third lens unit. Therefore, it is possible to make the fourth lens unit small-sized and light-weight. For this, when the fourth lens unit is let to be the focusing lens unit, since it is possible to move the lens unit at a high speed, it is possible to carry out focusing at a high speed.

Particularly, in a case in which conditional expression (9) is satisfied, even when the focusing is carried out by the fourth lens unit, it is possible to make small the fluctuation in the spherical aberration and the longitudinal chromatic aberration. Consequently, a favorable imaging performance is achieved even when focused to an object positioned at a close distance.

Moreover, it is preferable to make both the refractive power of the third lens unit and the refractive power of the fourth lens unit large. By making such arrangement, it is possible to improve a focusing sensitivity at the fourth lens unit and to make a diameter of the fourth lens unit small. As a result, it is possible to realize a small-sized and light-weight focusing unit.

Moreover, in the zoom lens according to the present embodiment, it is preferable that the second lens unit include at least two negative lenses and one positive lens.

By making the refractive power of the second lens unit large, a fluctuation mainly in the curvature of field and the spherical aberration due to zooming becomes large. Therefore, by letting the negative refractive power to be shared by a plurality of negative lenses in the second lens unit, it is possible to reduce fluctuation in these aberrations. It is preferable that the number of negative lenses sharing the negative refractive power be two.

In a case of letting the negative refractive power to be shared by two negative lenses, it is preferable to dispose two negative lenses on the object side. By making such arrangement, it is possible to correct the curvature of field more easily.

Moreover, in the zoom lens according to the present embodiment, it is preferable that the following conditional expression (12') be satisfied:

$$1.73 \leq nd_{2G\_max\_n} \leq 2.3 \tag{12'}$$

where, $nd_{2G\_max\_n}$ denotes the maximum refractive index from among refractive indices of the negative lenses in the second lens unit.

Technical significance of conditional expression (12°) is same as the technical significance of conditional expression (12). By satisfying conditional expression (12'), it is possible to improve capability of correcting the curvature of field and the spherical aberration. Satisfying conditional expression (12') is even more effective for widening the angle of view at the wide angle end, and for high zooming ratio.

Moreover, in the zoom lens according to the present embodiment, it is preferable that the second lens unit include a negative lens having a concave surface directed toward an image side, which is positioned nearest to object, and in the negative lens which is positioned nearest to object, an absolute value of a radius of curvature of an image-side surface be smaller as compared to an absolute value of a radius of curvature of an object-side surface, and the following conditional expression (18) be satisfied:

$$1.73 \leq nd_{2G\_n1} \leq 2.3 \tag{18}$$

where, $nd_{2G\_n1}$ denotes a refractive index of the negative lens nearest to object in the second lens unit.

Technical significance of conditional expression (18) is same as the technical significance of conditional expression (12).

Moreover, in the zoom lens according to the present embodiment, it is preferable that the third lens unit include a positive lens for image stabilization, and correction of an image shift due to camera shake be carried out by shifting the positive lens for image stabilization in a direction perpendicular to an optical axis.

Since the third lens unit is positioned nearest to an aperture stop, a diameter of a light beam passing through the third lens unit is small. Therefore, it is possible to make a lens of the third lens unit small-sized. For this, a lens in the third lens unit is used as a lens for image stabilization. By making such arrangement, it is possible to form an image stabilizing unit having a small diameter and light weight.

It is preferable that the lens for image stabilization include one lens. However, the lens for image stabilization may include a plurality of lenses. A single lens or a cemented lens can be used for the lens for image stabilization.

Moreover, it is preferable that the refractive power of the lens for image stabilization be made a positive refractive power. By making such arrangement, it is possible to make large the positive refractive power of the third lens unit efficiently. Moreover, it is possible to realize a high-speed of image stabilization.

Moreover, in the zoom lens according to the present embodiment, it is preferable that the third lens unit include a negative lens for image stabilization, and the following conditional expression (19) be satisfied:

$$6 \leq vd_{G3\_IS\_p} - vd_{G3\_IS\_n} \leq 65 \tag{19}$$

where, $vd_{G3\_IS\_p}$ denotes a maximum Abbe number from among Abbe numbers for the positive lens for image stabilization, and $vd_{G3\_IS\_n}$ denotes a minimum Abbe number from among Abbe numbers for the negative lens for image stabilization.

By satisfying conditional expression (19), it is possible reduce an occurrence of the chromatic aberration in a state in which the image stabilization is carried out. As a result, a favorable imaging performance is achieved even in the state in which the image stabilization is being carried out.

Moreover, in the zoom lens according to the present embodiment, it is preferable that the second lens unit include at least a negative lens and a positive lens, and the following conditional expression (20) be satisfied:

$$15 \leq vd_{G2\_min\_p} \leq 32 \tag{20}$$

where, $vd_{G2\_min\_p}$ denotes a minimum Abbe number from among Abbe numbers for the positive lenses in the second lens unit.

By making the negative refractive power of the second lens unit large, it is possible to make the zoom ratio high. Moreover, due to this, since it is possible to shorten the overall length of the optical system and to make a diameter of the second lens unit small, it is possible to make the optical system small-sized.

However, in the second lens unit, sometimes, mainly the chromatic aberration of magnification occurs near the wide angle end and the longitudinal chromatic aberration occurs near the telephoto end. In the second lens unit, a height of a marginal ray becomes high at the wide angle end than at the telephoto end. For such reason, for correcting these chromatic aberrations favorably at the wide angle end and the telephoto end, it is preferable to let Abbe number for the positive lens in the second lens unit to be on the high-dispersion side as much as possible. For this, it is preferable to satisfy conditional expression (20).

By making so as not to fall below a lower limit value of conditional expression (20), it is possible to suppress the correction of chromatic aberration from being excessive. By making so as not to exceed an upper limit value of conditional expression (20), it is possible to prevent the correction of the chromatic aberration from being inadequate. As a result, it is possible to achieve a favorable imaging performance.

Moreover, in the zoom lens according to the present embodiment, it is preferable that the first lens unit include at least one negative lens and two positive lenses.

When the F-number is made small as well as high zooming ratio and shortening of the overall length of the optical system are facilitated, the diameter of the first lens unit becomes large, and also the refractive power of the first lens unit becomes large. When the diameter of the first lens unit becomes large and the refractive power of the first lens unit becomes large, in the first lens unit, mainly the spherical aberration occurs near the telephoto end. Therefore, even when the diameter of the first lens unit becomes large and the refractive power of the first lens unit becomes large, it is preferable to maintain a state in which the spherical aberration is corrected favorably.

For this, in the first lens unit, it is preferable to let the positive refractive power to be shared by at least two positive lenses. It is preferable that the number of positive lenses which are let to share the positive refractive power be two.

Furthermore, it is preferable to dispose a negative lens in the first lens unit. By making such arrangement, it is possible to correct favorably the chromatic aberration.

Moreover, it is preferable to let Abbe number for the negative lens to be smaller than Abbe number for the positive lens. By disposing such negative lens in the first lens unit, mainly, since both the chromatic aberration of magnification near the wide angle end and the longitudinal chromatic aberration near the telephoto end are corrected favorably, it is possible to reduce an occurrence of the chromatic aberration in the first lens unit. As a result, a favorable optical performance is achieved throughout the entire zoom range.

Moreover, in the zoom lens according to the present embodiment, it is preferable that the second lens unit include in order from the object side to the image side, a negative lens having a concave surface directed toward the image side, a negative lens, and a positive lens having a convex surface directed toward the image side, and in the negative lens having the concave surface directed toward the image side, an absolute value of a radius of curvature of an image-side surface be smaller as compared to an absolute value of a radius of curvature of an object-side surface.

For making the F-number small as well as for facilitating high zooming ratio and shortening of the overall length of the optical system, it is preferable to make the refractive power of the second lens unit large. However, an increase in the refractive power of the second lens unit causes an aberration fluctuation in the second lens unit at the time of zooming. Specifically, from the wide angle end to the telephoto end, mainly the curvature of field and the spherical aberration fluctuate.

Therefore, by making the abovementioned arrangement for the second lens unit, it is possible to prevent an angle of refraction of a light ray at a lens surface from changing largely at the time of zooming. As a result, it is possible to maintain a state in which both the curvature of field and the spherical aberration are corrected favorably throughout the entire zoom range.

In such manner, according to the zoom lens of the present embodiment, it is possible to make the F-number small throughout the entire zoom range as well as to carry out high zooming ratio, while maintaining a favorable imaging performance. The small F-number refers to an F-number of 5.0 or less for example, and the high zoom ratio refers to a zoom ratio of more than six times for example.

Moreover, in the zoom lens according to the present embodiment, it is preferable that the first lens unit move to be positioned on the object side at the telephoto end than at the wide angle end.

When the first lens unit is moved in such manner, the first lens unit, at the telephoto end, is drawn out toward the object side, than at the wide angle end. Therefore, it is possible to improve zooming effect by the first lens unit and the second lens unit. As a result, it becomes easy to achieve high zooming ratio.

Moreover, by the first lens unit being positioned on the object side at the telephoto end, than at the wide angle end, a wide space is formed on the image side of the first lens unit. Therefore, it becomes easy to secure a space for moving lens units between the wide angle end and the telephoto end. As a result, it is possible to shorten the overall length of the optical system near the wide angle end.

Moreover, in the zoom lens according to the present embodiment, it is preferable that an aperture stop be disposed between the second lens unit and the third lens unit.

By making such arrangement, it becomes easy to make small the diameter of the first lens unit and the diameter of the second lens unit.

Moreover, in the zoom lens according to the present embodiment, it is preferable that the third lens unit includes at least two lens units having a positive refractive power.

By making the refractive power of the third lens unit large, it is possible to improve the zooming effect in the third lens unit. However, when the refractive power of the third lens unit is made large, sometimes the spherical aberration occurs in the third lens unit. Therefore, in the third lens unit, by letting the positive refractive power to be shared by a plurality of lens units having a positive refractive power, it is possible to reduce an amount of the spherical aberration that occurs. The lens unit is preferably a lens component. The lens component is a single lens, a cemented lens, or a compound lens.

Moreover, it is preferable that the lens units be disposed at positions mutually separated apart. It is possible to correct the spherical aberration favorably by providing an air space between the adjacent lens units.

Moreover, in the zoom lens according to the present embodiment, it is preferable that the following conditional expression (21) be satisfied:

$$-2.5 \leq f_t/\exp_t \leq 0.6 \quad (21)$$

where, $f_t$ denotes the focal length of the overall zoom lens system at the telephoto end, and $\exp_t$ denotes a distance from a paraxial image forming surface up to an exit pupil of the zoom lens at the telephoto end.

By making so as not to fall below a lower limit value of conditional expression (21), it is possible to suppress an increase in a positive distortion near the telephoto end. By making so as not to exceed an upper limit value of conditional expression (21), it is possible to suppress an increase in a diameter of a lens in the rearmost lens unit. As a result, small-sizing of the optical system becomes easy.

Moreover, in the zoom lens according to the present embodiment, it is preferable that the following conditional expression (3') be satisfied:

$$1.7 \leq nd_{2G\_max\_p} \leq 2.3 \quad (3')$$

where, $nd_{2G\_max\_p}$ denotes the maximum refractive index from among refractive indices of the positive lenses in the second lens unit.

Since the technical significance of conditional expression (3') has already been described, the description thereof is omitted here.

Moreover, in the zoom lens according to the present embodiment, it is preferable that the following conditional expression (1) be satisfied:

$$-0.015 \leq Tp_{2G\_min\_p} \leq 0.015 \quad (1)$$

where, $Tp_{2G\_min\_p} = \theta gF_{2G\_p} - (-0.0016 \times vd_{2G\_p} + 0.6415)$,
$\theta gF_{2G\_p} = (ng_{2G\_p} - nF_{2G\_p})/(nF_{2G\_p} - nC_{2G\_p})$
$vd_{2G\_p}$ denotes Abbe number for a predetermined positive lens in the second lens unit, $ng_{2G\_p}$, $nF_{2G\_p}$, and $nC_{2G\_p}$ denote refractive indices of the predetermined positive lens in the second lens unit, for a g-line, for an F-line, and for a C-line respectively, here the predetermined positive lens in the second lens unit is a lens for which Abbe number is the smallest, from among the positive lenses in the second lens unit.

Since the technical significance of conditional expression (1) has already been described, the description thereof is omitted here.

Moreover, in the zoom lens according to the present embodiment, it is preferable that the following conditional expression (2") be satisfied:

$$64 \leq vd_{1G\_max\_p} \quad (2")$$

where, $vd_{1G\_max\_p}$ denotes the maximum Abbe number from among Abbe numbers for the positive lenses in the first lens unit.

Technical significance of conditional expression (2") is same as the technical significance of conditional expression (2).

Moreover, in the zoom lens according to the present embodiment, it is preferable that the following conditional expression (10) be satisfied:

$$23 \leq vd_{5G\_min\_p} \quad (10)$$

where, $vd_{5G\_min\_p}$ denotes the minimum Abbe number from among Abbe numbers for the positive lenses in the fifth lens unit.

Since the technical significance of conditional expression (10) has already been described, the description thereof is omitted here.

Moreover, in the zoom lens according to the present embodiment, it is preferable that a distance between the first lens unit and the second lens unit be wider at the telephoto end than that at the wide angle end.

Since it is possible to improve the zooming effect in the second lens unit, it becomes easy to achieve high zooming ratio.

Moreover, in the zoom lens according to the present embodiment, it is preferable that a distance between the second lens unit and the third lens unit be narrower at the telephoto end than that at the wide angle end.

Since it is possible to improve the zooming effect by the second lens unit and the third lens unit, it becomes easy to achieve high zooming ratio.

Moreover, in the zoom lens according to the present embodiment, it is preferable that a distance between the fourth lens unit and the fifth lens unit be wider at the telephoto end than that at the wide angle end.

Since it is possible to improve the zooming effect in the fourth lens unit, it becomes easy to achieve high zooming ratio.

Moreover, in the zoom lens according to the present embodiment, it is preferable to dispose an aperture stop on the image side of the second lens unit and object side of the fourth lens unit.

By making such arrangement, it is possible to arrange symmetrically the refractive power in the optical system about the third lens unit as a center. Therefore, it is possible to shorten the overall length of the optical system and to correct favorably various aberrations such as the curvature of field and coma, throughout the entire zoom range.

Moreover, in the zoom lens according to the present embodiment, it is preferable that the first lens unit include at least a negative lens.

It is possible to carry out correction of both the chromatic aberration and the spherical aberration favorably. As a result, a favorable imaging performance is achieved.

Moreover, in the zoom lens according to the present embodiment, it is preferable that the second lens unit include at least a negative lens.

Moreover, in the zoom lens according to the present embodiment, it is preferable that the following conditional expression (22) be satisfied:

$$4 < |f_1/f_2| < 10 \quad (22)$$

where, $f_1$ denotes the focal length of the first lens unit, and
$f_2$ denotes the focal length of the second lens unit.

By making so as not to fall below a lower limit value of conditional expression (22), it is possible suppress mainly an increase in the spherical aberration in the first lens unit. By making so as not to exceed an upper limit value of conditional expression (22), it is possible to suppress mainly an increase in the curvature of field in the second lens unit. As a result, a favorable imaging performance is achieved.

Moreover, in the zoom lens according to the present embodiment, it is preferable that the following conditional expression (23) be satisfied:

$$0.2 < |f_3/f_4| < 1.3 \quad (23)$$

where, $f_3$ denotes the focal length of the third lens unit, and
$f_4$ denotes a focal length of the fourth lens unit.

By making so as not to fall below a lower limit value of conditional expression (23), it is possible to suppress mainly an increase in the spherical aberration and an increase in the coma in the third lens unit. By making so as not to exceed an upper limit value of conditional expression (23), it is possible to suppress mainly an increase in the spherical aberration and an increase in the coma in the fourth lens unit. As a result, it becomes easy to secure adequately an imaging performance near the telephoto end.

Moreover, in the zoom lens according to the present embodiment, it is preferable that the following conditional expression (24) be satisfied:

$$0.3 < |f_4/f_5| < 1.2 \qquad (24)$$

where, $f_4$ denotes the focal length of the fourth lens unit, and $f_5$ denotes a focal length of the fifth lens unit.

By making so as not to fall below a lower limit value of conditional expression (24), it is possible to suppress an increase in a negative distortion in the fifth lens unit. By making so as not to exceed an upper limit value of conditional expression (24), it is possible to suppress an increase in a height of a light ray on the image side of the fourth lens unit. As a result, it becomes easy to make the diameter of the optical system small.

Moreover, in the zoom lens according to the present embodiment, it is preferable that the following conditional expression (25) be satisfied:

$$4.9 < f_t/f_w < 10 \qquad (25)$$

where, $f_t$ denotes the focal length of the overall zoom lens system at the telephoto end, and $f_w$ denotes a focal length of the overall zoom lens system at the wide angle end.

By making so as not to fall below a lower limit value of conditional expression (25), it is possible to prevent the zoom ratio from being lowered. Accordingly, it is possible to improve merchantability of the optical system and an image pickup apparatus. By making so as not to exceed an upper limit value of conditional expression (25), small-sizing of the optical system becomes easy.

Moreover, in the zoom lens according to the present embodiment, it is preferable that the following conditional expression (26) be satisfied:

$$3 < Fno_t < 5.7 \qquad (26)$$

where, $Fno_t$ denotes the smallest F-number at the telephoto end.

By making so as not to fall below a lower limit value of conditional expression (26), it is possible to suppress an increase in the spherical aberration, the coma, and the curvature of field as well as to prevent an increase in diameter of each lens unit. Accordingly, since it becomes easy to make the diameter of the optical system small, it becomes easy to secure adequately mobility of the optical system and the image pickup apparatus. By making so as not to exceed an upper limit value of conditional expression (26), since it is possible to prevent reduction in a shutter speed even while capturing a dark scene at night etc., it is possible to prevent occurrence of a camera shake and motion blur. Moreover, since an adequate amount of light is achieved, a quality of an image captured is not degraded.

Moreover, in the zoom lens according to the present embodiment, it is preferable that the first lens unit include in order from the object side to the image side, a cemented lens including a positive lens and a negative lens, and a positive lens.

By making such arrangement, it is possible to carry out favorably both the correction of the chromatic aberration and correction of the spherical aberration. As a result, a favorable imaging performance is achieved. Moreover, by cementing two lenses, since an error at the time of mounting the lenses on frame members decreases, a stable imaging performance is achieved.

Moreover, in the zoom lens according to the present embodiment, it is preferable that a lens nearest to object in the first lens unit be a negative meniscus lens having a convex surface directed toward the object side.

By making such arrangement, it is possible to prevent large bending of a marginal light ray passing through the first lens unit, and particularly, large bending of a marginal light ray near the wide angle end. As a result, it is possible to correct the astigmatism favorably.

Moreover, in the zoom lens according to the present embodiment, it is preferable that a lens nearest to image in the first lens unit be a positive meniscus lens having a convex surface directed toward the object side.

By making such arrangement, it is possible to prevent large bending of a marginal light ray passing through the first lens unit, and particularly, large bending of a marginal light ray near the wide angle end. As a result, it is possible to correct the astigmatism favorably.

Moreover, in the zoom lens according to the present embodiment, it is preferable that the second lens unit include in order from the object side to the image side, a negative lens of which an image-side surface is a concave surface directed toward the image side, a negative lens of which an object-side surface is a concave surface directed toward the object side, a positive lens of which an image-side surface is a convex surface directed toward the image side, and a negative lens of which an object-side surface is a concave surface directed toward the object side.

As mentioned above, a change in a light-ray height at the time of zooming becomes substantial at a position nearest to object in the second lens unit. When the change in the light-ray height is substantial, a change in an angle of refraction at a lens nearest to object also becomes large. Therefore, the negative lens having the concave surface directed toward the image side is disposed nearest to object in the second lens unit. By making such arrangement, it is possible to ease the large change in the angle of refraction of a light ray at a lens surface at the time of zooming. As a result, it is possible to reduce the fluctuation in the curvature of field at the time of zooming.

Moreover, by disposing the negative lens having the concave surface directed toward the object side, on the image side of the negative lens nearest to object, it is possible to make large the negative refractive power of the second lens unit as a whole.

Moreover, the positive lens having the convex surface directed toward the image side is disposed on the image side of this negative lens. The spherical aberration and the curvature of field are susceptible to occur in the two negative lenses positioned on the object side of this positive lens. Therefore, in this positive lens, it is possible to correct favorably the spherical aberration and the curvature of field which occur in the two negative lenses. Moreover, it is possible to correct the chromatic aberration favorably.

Moreover, in the zoom lens according to the present embodiment, it is preferable that the negative lens of which the object-side surface is the concave surface directed toward the object side and the positive lens of which the image-side surface is the convex surface directed toward the image side in the second lens unit, be cemented.

As described above, the second lens unit includes the negative lens of which the object-side surface is the concave surface directed toward the object side and the positive lens of which the image-side surface is the convex surface directed toward the image side. When both the refractive power of the negative lens and the refractive power of the positive lens are made large, mainly a spherical aberration of high order occurs. By cementing these two lenses, it is possible to suppress the occurrence of the spherical aberration of high order even when both the refractive power of the negative lens and the refractive power of the positive lens are made large.

Moreover, in the zoom lens according to the present embodiment, it is preferable that the third lens unit include in order from the object side to the image side, a biconvex positive lens, a positive lens having a convex surface directed toward the image side, a cemented lens, a negative meniscus lens having a convex surface directed toward the object side, and a biconvex positive lens, and the cemented lens include a negative meniscus lens having a convex surface directed toward the object side and a positive meniscus lens having a convex surface directed toward the object side.

By letting the positive refractive power of the third lens unit to be shared by the plurality of positive lenses, it is possible to make the refractive power of the third lens unit large as well as to improve an effect of correcting the chromatic aberration. Accordingly, even when the refractive power of the third lens unit is made large, it is possible to reduce an amount of occurrence of the spherical aberration and the coma. As a result, a favorable imaging performance is achieved throughout the entire zoom range.

Moreover, in the zoom lens according to the present embodiment, it is preferable that the fourth lens unit include a cemented lens of a negative lens and a positive lens.

By making such arrangement, it is possible to correct the chromatic aberration favorably. As a result, it is possible to reduce an amount of occurrence of the chromatic aberration, throughout the entire zoom range.

Moreover, in the zoom lens according to the present embodiment, it is preferable that the fourth lens unit include a negative lens of which an image-side surface is a concave surface directed toward the image side and a positive meniscus lens having a convex surface directed toward the object side.

Moreover, in the zoom lens according to the present embodiment, it is preferable that the fifth lens unit include a cemented lens of a negative lens and a positive lens.

By making such arrangement, it is possible to suppress the occurrence of the chromatic aberration. As a result, a favorable imaging performance is achieved throughout the entire zoom range.

Moreover, in the zoom lens according to the present embodiment, it is preferable that the fifth lens unit include a biconvex positive lens and a negative meniscus lens having a convex surface directed toward the image side.

Moreover, in the zoom lens according to the present embodiment, it is preferable that the fifth lens unit include a negative lens of which an image-side surface is a concave surface directed toward the image side, and a biconvex positive lens.

Moreover, in the zoom lens according to the present invention, it is preferable that the fifth lens unit be fixed at the time of zooming.

The fifth lens unit is positioned nearest to image. Therefore, by letting the fifth lens unit to be fixed, it is possible to prevent dust and moisture from entering an interior portion of the optical system. In other words, it is possible to improve a dust-proofing effect and a water-proofing effect easily. Moreover, since a sound generated by a movement at an interior of a lens barrel is not susceptible to be leaked to exterior, it is possible to improve a noise-reduction effect.

Moreover, an image pickup apparatus according to the present embodiment includes one of the zoom lenses described above, and an image pickup element which has an image pickup surface.

By making such arrangement, it is possible to provide an image pickup apparatus for which an angle of view at a wide angle end and a range of angle of view that can be captured are wide, and in which an image with lesser noise can be achieved.

For each conditional expression, it is preferable to restrict either or both of a lower limit value and an upper limit value, as it enables that function more assuredly. Moreover, for each conditional expression, only an upper limit value or a lower limit value of a numerical range of a further restricted conditional expression may be restricted.

Preferable lower limit value and an upper limit value for conditional expression (1) are as follows.
lower limit value: −0.010, −0.005, 0.000
upper limit value: 0.014, 0.013
Preferable lower limit value and upper limit value for conditional expressions (2), (2'), and (2") are as follows.
lower limit value: 66.7, 69.4, 70.3, 70.5, 72.0, 74.0
upper limit value: 98.0, 93.9, 89.8, 85.7, 80.0
Preferable lower limit value and upper limit value for conditional expressions (3) and (3') are as follows.
lower limit value: 1.74, 1.76, 1.78, 1.79, 1.82, 1.84
upper limit value: 2.23, 2.2. 2.15, 2.08
Preferable lower limit value and upper limit value for conditional expressions (4) and (4') are as follows.
lower limit value: 0.37, 0.40, 0.44, 0.50
upper limit value: 0.89, 0.86, 0.85, 0.81, 0.80, 0.77
Preferable lower limit value and upper limit value for conditional expression (5) are as follows.
lower limit value: 2.4, 2.9, 3.0, 3.2, 3.3
upper limit value: 6.1, 6.0, 5.8, 5.6
Preferable lower limit value and upper limit value for conditional expression (6) are as follows.
lower limit value: 1.1, 1.2, 1.3, 1.5
upper limit value: 2.8, 2.6, 2.5, 2.3
Preferable lower limit value and upper limit value for conditional expressions (7) and (7') are as follows.
lower limit value: 55.0, 56.4, 58.0, 58.7, 60.0, 61.1
upper limit value: 98.0, 93.9, 89.8, 85.7, 80.0, 76.0, 70.5
Preferable lower limit value and upper limit value for conditional expressions (8) and (8') are as follows.
lower limit value: 64.8, 66.6, 68.4, 70.5, 74.0
upper limit value: 98.0, 93.9, 89.8, 85.7, 80.0
Preferable lower limit value and upper limit value for conditional expression (9) are as follows.
lower limit value: 5.1, 6.0, 8.0, 9.2, 12.0, 13.2, 15.0
upper limit value: 46.0, 45.0, 43.0, 42.0, 38.0
Preferable lower limit value and upper limit value for conditional expression (10) are as follows.
lower limit value: 34.0, 40.0, 45.0, 50.0, 56.0, 60.0, 65.0
upper limit value: 98.0, 93.9, 89.8, 85.7
Preferable lower limit value and upper limit value for conditional expression (11) are as follows.
lower limit value: −0.009, −0.006, −0.005, −0.003, 0.0002, 0.01
upper limit value: 0.055, 0.052, 0.05, 0.044, 0.036
Preferable lower limit value and upper limit value for conditional expressions (12) and (12') are as follows.
lower limit value: 1.73, 1.74, 1.78, 1.79, 1.85
upper limit value: 2.23, 2.20, 2.15, 2.08
Preferable lower limit value and upper limit value for conditional expression (13) are as follows.
lower limit value: 0.007, 0.015
upper limit value: 0.055, 0.052, 0.05, 0.044, 0.036

Preferable lower limit value and upper limit value for conditional expression (14) are as follows.
lower limit value: 1.1, 1.15, 1.2, 1.3, 1.4
upper limit value: 2.6, 2.4, 2.3, 2.2
Preferable lower limit value and upper limit value for conditional expression (15) are as follows.
lower limit value: 0.8, 0.85, 0.9, 1.0
upper limit value: 2.1, 2.0, 1.9, 1.8
Preferable lower limit value and upper limit value for conditional expression (16) are as follows.
lower limit value: 0.8, 0.85, 0.9
upper limit value: 1.5, 1.4, 1.3
Preferable lower limit value and upper limit value for conditional expression (17) are as follows.
lower limit value: 0.008, 0.01, 0.011, 0.014, 0.015
upper limit value: 0.055, 0.052, 0.05, 0.044, 0.036
Preferable lower limit value and upper limit value for conditional expression (18) are as follows.
lower limit value: 1.73, 1.74, 1.78, 1.79, 1.85
upper limit value: 2.23, 2.2, 2.15, 2.08
Preferable lower limit value and upper limit value for conditional expression (19) are as follows.
lower limit value: 10, 10.1, 14.2, 18.3, 20
upper limit value: 62.2, 60, 59.4, 56.6
Preferable lower limit value and upper limit value for conditional expression (20) are as follows.
lower limit value: 16, 17, 19, 22
upper limit value: 31, 30, 27
Preferable lower limit value and upper limit value for conditional expression (21) are as follows.
lower limit value: −2.2, −1.9, −1.7, −1.6, −0.7
upper limit value: 0.5, 0.3, 0.2, 0.0
Preferable lower limit value and upper limit value for conditional expression (22) are as follows.
lower limit value: 4.4, 4.8, 5.2
upper limit value: 9.5, 9.0, 8.5
Preferable lower limit value and upper limit value for conditional expression (23) are as follows.
lower limit value: 0.3
upper limit value: 1.2
Preferable lower limit value and upper limit value for conditional expression (24) are as follows.
lower limit value: 0.4
upper limit value: 1.1
Preferable lower limit value and upper limit value for conditional expression (25) are as follows.
lower limit value: 5.3, 5.7, 6.0
upper limit value: 9.6, 9.1, 8.7
Preferable lower limit value and upper limit value for conditional expression (26) are as follows.
lower limit value: 3.3, 3.5, 3.8
upper limit value: 5.3, 4.9, 4.5

Examples of zoom lenses according to certain aspects will be described below by referring to the accompanying diagrams. However, the present invention is not restricted to the examples described below. As to whether the refractive power is positive or negative depends on a paraxial radius of curvature.

Lens cross-sectional views of each example will be described below. Each lens cross-sectional view is a lens cross-sectional view at the time of focusing to an object at infinity.

FIG. 1A, FIG. 2A, FIG. 3A, FIG. 4A, FIG. 5A, FIG. 6A, FIG. 7A, FIG. 8A, FIG. 9A, FIG. 10A, FIG. 11A, FIG. 12A, FIG. 13A, FIG. 14A, and FIG. 15A are lens cross-sectional views at a wide angle end.

FIG. 1B, FIG. 2B, FIG. 3B, FIG. 4B, FIG. 5B, FIG. 6B, FIG. 7B, FIG. 8B, FIG. 9B, FIG. 10B, FIG. 11B, FIG. 12B, FIG. 13B, FIG. 14B, and FIG. 15B are lens cross-sectional views in an intermediate focal length state.

FIG. 1C, FIG. 2C, FIG. 3C, FIG. 4C, FIG. 5C, FIG. 6C, FIG. 7C, FIG. 8C, FIG. 9C, FIG. 10C, FIG. 11C, FIG. 12C, FIG. 13C, FIG. 14C, and FIG. 15C are lens cross-sectional views at a telephoto end.

Examples 1 to 15 of the zoom lens will be described below.

Moreover, a first lens unit is denotes by G1, a second lens unit is denoted by G2, a third lens unit is denoted by G3, a fourth lens unit is denoted by G4, a fifth lens unit is denoted by G5, an aperture stop is denoted by S, and an image plane (image pickup surface) is denoted by I. Moreover, a lens unit which moves at the time of focusing is indicated by an arrow mark in a horizontal direction and a lens which moves at the time of image stabilization is indicated by an arrow mark in a vertical direction.

A cover glass of an electronic image pickup element and a plane parallel plate forming a low-pass filter may be disposed between a lens unit positioned nearest to image and the image plane I. In this case, a wavelength-region restricting coating which restricts infra-red light may be applied to a surface of the plane parallel plate. Moreover, a multi-layered film for restricting wavelength region may be applied to a surface of the cover glass. Furthermore, an arrangement may be made such that the cover glass is imparted with a low-pass filter function.

A zoom lens according to an example 1 includes in order from an object side, a first lens unit G1 having a positive refractive power, a second lens unit G2 having a negative refractive power, a third lens unit G3 having a positive refractive power, a fourth lens unit G4 having a negative refractive power, and a fifth lens unit G5 having a positive refractive power. An aperture stop S is disposed between the second lens unit G2 and the third lens unit G3.

The first lens unit G1 includes a negative meniscus lens L1 having a convex surface directed toward the object side, a biconvex positive lens L2, and a positive meniscus lens L3 having a convex surface directed toward the object side. Here, the negative meniscus lens L1 and the biconvex positive lens L2 are cemented.

The second lens unit G2 includes a biconcave negative lens L4, a biconcave negative lens L5, a biconvex positive lens L6, and a negative meniscus lens L7 having a convex surface directed toward an image side. Here, the biconcave negative lens L5 and the biconvex positive lens L6 are cemented.

The third lens unit G3 includes a biconvex positive lens L8, a positive meniscus lens L9 having a convex surface directed toward the image side, a negative meniscus lens L10 having a convex surface directed toward the object side, and a biconvex positive lens L11. Here, the negative meniscus lens L10 and the biconvex positive lens L11 are cemented.

The fourth lens unit G4 includes a biconvex positive lens L12 and a biconcave negative lens L13. Here, the biconvex positive lens L12 and the biconcave negative lens L13 are cemented.

The fifth lens unit G5 includes a biconvex positive lens L14 and a negative meniscus lens L15 having a convex surface directed toward the image side. Here, the biconvex positive lens L14 and the negative meniscus lens L15 are cemented.

At the time of zooming from a wide angle end to a telephoto end, the first lens unit G1 moves toward the object side, the second lens unit G2 moves toward the object side, the third lens unit G3 moves toward the object side, the fourth lens unit G4 moves toward the object side, and the fifth lens unit G5 moves toward the image side. The aperture stop S moves together with the third lens unit G3.

At the time of focusing, the fourth lens unit G4 moves along an optical axis. More elaborately, at the time of focusing from an object at infinity to an object at a close distance, the fourth lens unit G4 moves toward the image side.

An aspheric surface is provided to a total of eight surfaces namely, both surfaces of the biconcave negative lens L4, both surfaces of the negative meniscus lens L7, both surfaces of the biconvex positive lens L8, an image-side surface of the biconvex positive lens L11, and an image-side surface of the biconcave negative lens L13.

A zoom lens according to an example 2 includes in order from an object side, a first lens unit G1 having a positive refractive power, a second lens unit G2 having a negative refractive power, a third lens unit G3 having a positive refractive power, a fourth lens unit G4 having a negative refractive power, and a fifth lens unit G5 having a positive refractive power. An aperture stop S is disposed between the second lens unit G2 and the third lens unit G3.

The first lens unit G1 includes a negative meniscus lens L1 having a convex surface directed toward the object side, a positive meniscus lens L2 having a convex surface directed toward the object side, and a positive meniscus lens L3 having a convex surface directed toward the object side. Here, the negative meniscus lens L1 and the positive meniscus lens L2 are cemented.

The second lens unit G2 includes a negative meniscus lens L4 having a convex surface directed toward the object side, a biconcave negative lens L5, a biconvex positive lens L6, a biconcave negative lens L7, and a biconvex positive lens L8.

The third lens unit G3 includes a biconvex positive lens L9, a biconvex positive lens L10, a negative meniscus lens L11 having a convex surface directed toward the object side, and a biconvex positive lens L12. Here, the negative meniscus lens L11 and the biconvex positive lens L12 are cemented.

The fourth lens unit G4 includes a negative meniscus lens L13 having a convex surface directed toward the object side and a positive meniscus lens L14 having a convex surface directed toward the object side. Here, the negative meniscus lens L13 and the positive meniscus lens L14 are cemented.

The fifth lens unit G5 includes a biconvex positive lens L15.

At the time of zooming from a wide angle end to a telephoto end, the first lens unit G1 moves toward the object side, the second lens unit G2 is fixed, the third lens unit G3 moves toward the object side, the fourth lens unit G4 moves toward the object side, and the fifth lens unit G5 is fixed. An aperture stop S moves independently toward the object side.

At the time of focusing, the fourth lens unit G4 moves along an optical axis. More elaborately, at the time of focusing from an object at infinity to an object at a close distance, the fourth lens unit G4 moves toward the image side.

An aspheric surface is provided to a total of eight surfaces namely, both surfaces of the negative meniscus lens L4, both surfaces of the biconcave negative lens L7, both surfaces of the biconvex positive lens L9, and both surfaces of the biconvex positive lens L15.

A zoom lens according to an example 3 includes in order from an object side, a first lens unit G1 having a positive refractive power, a second lens unit G2 having a negative refractive power, a third lens unit G3 having a positive refractive power, a fourth lens unit G4 having a negative refractive power, and a fifth lens unit G5 having a positive refractive power. An aperture stop S is disposed between the second lens unit G2 and the third lens unit G3.

The first lens unit G1 includes a negative meniscus lens L1 having a convex surface directed toward the object side, a biconvex positive lens L2, and a positive meniscus lens L3 having a convex surface directed toward the object side. Here, the negative meniscus lens L1 and the biconvex positive lens L2 are cemented.

The second lens unit G2 includes a negative meniscus lens L4 having a convex surface directed toward the object side, a biconcave negative lens L5, a biconvex positive lens L6, and a negative meniscus lens L7 having a convex surface directed toward an image side.

The third lens unit G3 includes a biconvex positive lens L8, a biconvex positive lens L9, a negative meniscus lens L10 having a convex surface directed toward the object side, a positive meniscus lens L11 having a convex surface directed toward the object side, a negative meniscus lens L12 having a convex surface directed toward the object side, and a biconvex positive lens L13. Here, the negative meniscus lens L10 and the positive meniscus lens L11 are cemented. Moreover, the negative meniscus lens L12 and the biconvex positive lens L13 are cemented.

The fourth lens unit G4 includes a biconcave negative lens L14 and a positive meniscus lens L15 having a convex surface directed toward the object side. Here, the biconcave negative lens L14 and the positive meniscus lens L15 are cemented.

The fifth lens unit G5 includes a biconvex positive lens L16 and a negative meniscus lens L17 having a convex surface directed toward the image side. Here, the biconvex positive lens L16 and the negative meniscus lens L17 are cemented.

At the time of zooming from a wide angle end to a telephoto end, the first lens unit G1 moves toward the object side, the second lens unit G2 moves toward the image side, the third lens unit G3 moves toward the object side, the fourth lens unit G4 moves toward the object side, and the fifth lens unit G5 is fixed. The aperture stop S move independently toward the object side.

At the time of focusing, the fourth lens unit G4 moves along an optical axis. More elaborately, at the time of focusing from an object at infinity to an object at a close distance, the fourth lens unit G4 moves toward the image side. Moreover, at the time of image stabilization, the negative meniscus lens L12 and the biconvex positive lens L13 in the third lens unit G3 move in a direction orthogonal to the optical axis.

An aspheric surface is provided to a total of eight surfaces namely, both surfaces of the biconcave negative lens L5, both surfaces of the negative meniscus lens L7, both surfaces of the biconvex positive lens L8, an image-side surface of the biconvex positive lens L13, and an object-side surface of the biconvex positive lens L16.

A zoom lens according to an example 4 includes in order from an object side, a first lens unit G1 having a positive refractive power, a second lens unit G2 having a negative refractive power, a third lens unit G3 having a positive refractive power, a fourth lens unit G4 having a negative refractive power, and a fifth lens unit G5 having a positive refractive power. An aperture stop S is disposed between the second lens unit G2 and the third lens unit G3.

The first lens unit G1 includes a negative meniscus lens L1 having a convex surface directed toward the object side, a planoconvex positive lens L2 having a convex surface directed toward the object side, and a positive meniscus lens L3 having a convex surface directed toward the object side. Here, the negative meniscus lens L1 and the planoconvex positive lens L2 are cemented.

The second lens unit G2 includes a negative meniscus lens L4 having a convex surface directed toward the object side, a biconcave negative lens L5, a biconvex positive lens L6, and a negative meniscus lens L7 having a convex surface directed toward an image side. Here, the biconcave negative lens L5 and the biconvex positive lens L6 are cemented.

The third lens unit G3 includes a biconvex positive lens 18, a biconvex positive lens L9, a negative meniscus lens L10 having a convex surface directed toward the object side, a positive meniscus lens L11 having a convex surface directed toward the object side, a negative meniscus lens L12 having a convex surface directed toward the object side, and a biconvex positive lens L13. Here, the negative meniscus lens L10 and the positive meniscus lens L11 are cemented. Moreover, the negative meniscus lens L12 and the biconvex positive lens L13 are cemented.

The fourth lens unit G4 includes a negative meniscus lens L14 having a convex surface directed toward the object side and a positive meniscus lens L15 having a convex surface directed toward the object side. Here, the negative meniscus lens L14 and the positive meniscus lens L15 are cemented.

The fifth lens unit G5 includes a biconvex positive lens L16 and a negative meniscus lens L17 having a convex surface directed toward an image side. Here, the biconvex positive lens L16 and the negative meniscus lens L17 are cemented.

At the time of zooming from a wide angle end to a telephoto end, the first lens unit G1 moves toward the object side, the second lens unit G2 moves toward the image side, the third lens unit G3 moves toward the object side, the fourth lens unit G4, after moving toward the object side, moves toward the image side, and the fifth lens unit G5 is fixed. The aperture stop S moves together with the third lens unit G3.

At the time of focusing, the fourth lens unit G4 moves along an optical axis. More elaborately, at the time of focusing from an object at infinity to an object at a close distance, the fourth lens unit G4 moves toward the image side. Moreover, at the time of image stabilization, the negative meniscus lens L12 and the biconvex positive lens L13 in the third lens unit G3 move in a direction orthogonal to the optical axis.

An aspheric surface is provided to a total of six surfaces namely, both surfaces of the negative meniscus lens L4, both surfaces of the biconvex positive lens L8, an image-side surface of the biconvex positive lens L13, and an object-side surface of the biconvex positive lens L16.

A zoom lens according to an example 5 includes in order from an object side, a first lens unit G1 having a positive refractive power, a second lens unit G2 having a negative refractive power, a third lens unit G3 having a positive refractive power, a fourth lens unit G4 having a negative refractive power, and a fifth lens unit G5 having a positive refractive power. An aperture stop S is disposed between the second lens unit G2 and the third lens unit G3.

The first lens unit G1 includes a negative meniscus lens L1 having a convex surface directed toward the object side, a biconvex positive lens L2, and a positive meniscus lens L3 having a convex surface directed toward the object side. Here, the negative meniscus lens L1 and the biconvex positive lens L2 are cemented.

The second lens unit G2 includes a negative meniscus lens L4 having a convex surface directed toward the object side, a biconcave negative lens L5, a biconvex positive lens L6, a biconcave negative lens L7, and a biconvex positive lens L8. Here, the biconcave negative lens L7 and the biconvex positive lens L8 are cemented.

The third lens unit G3 includes a biconvex positive lens L9, a biconvex positive lens L10, a negative meniscus lens L11 having a convex surface directed toward the object side, a positive meniscus lens L12 having a convex surface directed toward the object side, a negative meniscus lens L13 having a convex surface directed toward the object side, and a biconvex positive lens L14. Here, the negative meniscus lens L11 and the positive meniscus lens L12 are cemented. Moreover, the negative meniscus lens L13 and the biconvex positive lens L14 are cemented.

The fourth lens unit G4 includes a negative meniscus lens L15 having a convex surface directed toward the object side and a positive meniscus lens L16 having a convex surface directed toward the object side. Here, the negative meniscus lens L15 and the positive meniscus lens L16 are cemented.

The fifth lens unit G5 includes a biconvex positive lens L17 and a negative meniscus lens L18 having a convex surface directed toward an image side. Here, the biconvex positive lens L17 and the negative meniscus lens L18 are cemented.

At the time of zooming from a wide angle to a telephoto end, the first lens unit G1 moves toward the object side, the second lens unit G2 moves toward the image side, the third lens unit G3 moves toward the object side, the fourth lens unit G4 moves toward the object side, and the fifth lens unit G5 is fixed. The aperture stop S moves independently toward the object side.

At the time of focusing, the fourth lens unit G4 moves along an optical axis. More elaborately, at the time of focusing from an object at infinity to an object at a close distance, the fourth lens unit G4 moves toward the image side. Moreover, at the time of image stabilization, the negative meniscus lens L13 and the biconvex positive lens L14 in the third lens unit G3 move in a direction orthogonal to the optical axis.

An aspheric surface is provided to a total of six surfaces namely, both surfaces of the negative meniscus lens L4, both surfaces of the biconvex positive lens L9, an image-side surface of the biconvex positive lens L14, and an object-side surface of the biconvex positive lens L17.

A zoom lens according to an example 6 includes in order from an object side, a first lens unit G1 having a positive refractive power, a second lens unit G2 having a negative refractive power, a third lens unit G3 having a positive refractive power, a fourth lens unit G4 having a negative refractive power, and a fifth lens unit G5 having a positive refractive power. An aperture stop S is disposed between the second lens unit G2 and the third lens unit G3.

The first lens unit G1 includes a negative meniscus lens L1 having a convex surface directed toward the object side, a positive meniscus lens L2 having a convex surface directed toward the object side, and a positive meniscus lens L3 having a convex surface directed toward the object side. Here, the negative meniscus lens L1 and the positive meniscus lens L2 are cemented.

The second lens unit G2 includes a negative meniscus lens L4 having a convex surface directed toward the object side, a negative meniscus lens L5 having a convex surface directed toward an image side, a positive meniscus lens L6 having a convex surface directed toward the image side, and a negative meniscus lens L7 having a convex surface directed toward the image side. Here, the negative meniscus lens L5 and the positive meniscus lens L6 are cemented.

The third lens unit G3 includes a biconvex positive lens L8, a biconvex positive lens L9, a negative meniscus lens L10 having a convex surface directed toward the object side, a positive meniscus lens L11 having a convex surface directed toward the object side, and a biconvex positive lens L12. Here, the negative meniscus lens L10 and the positive meniscus lens L11 are cemented.

The fourth lens unit G4 includes a negative meniscus lens L13 having a convex surface directed toward the object side and a positive meniscus lens L14 having a convex surface directed toward the object side. Here, the negative meniscus lens L13 and the positive meniscus lens L14 are cemented.

The fifth lens unit G5 includes a negative meniscus lens L15 having a convex surface directed toward the object side and a biconvex positive lens L16. Here, the negative meniscus lens L15 and the biconvex positive lens L16 are cemented.

At the time of zooming from a wide angle end to a telephoto end, the first lens unit G1 moves toward the object side, the second lens unit G2 moves toward the image side, the third lens unit G3 moves toward the object side, the fourth lens unit G4, after moving toward the object side, moves toward the image side, and the fifth lens unit G5 is fixed. The aperture stop S moves together with the third lens unit G3.

At the time of focusing, the fourth lens unit G4 moves along an optical axis. More elaborately, at the time of focusing from an object at infinity to an object at a close distance, the fourth lens unit G4 moves toward the image side. Moreover, at the time of image stabilization, the biconvex positive lens L12 in the third lens unit G3 moves in a direction orthogonal to the optical axis.

An aspheric surface is provided to a total of nine surfaces namely, both surfaces of the negative meniscus lens L4, both surfaces of the negative meniscus lens L7, both surfaces of the biconvex positive lens L8, both surfaces of the biconvex positive lens L12, and an image-side surface of the biconvex positive lens L16.

A zoom lens according to an example 7 includes in order from an object side, a first lens unit G1 having a positive refractive power, a second lens unit G2 having a negative refractive power, a third lens unit G3 having a positive refractive power, a fourth lens unit G4 having a negative refractive power, and a fifth lens unit G5 having a positive refractive power. An aperture stop S is disposed between the second lens unit G2 and the third lens unit G3.

The first lens unit G1 includes a negative meniscus lens L1 having a convex surface directed toward the object side, a positive meniscus lens L2 having a convex surface directed toward the object side, and a positive meniscus lens L3 having a convex surface directed toward the object side. Here, the negative meniscus lens L1 and the positive meniscus lens L2 are cemented.

The second lens unit G2 includes a biconcave negative lens L4, a biconcave negative lens L5, a biconvex positive lens L6, and a negative meniscus lens L7 having a convex surface directed toward an image side. Here, the biconcave negative lens L5 and the biconvex positive lens L6 are cemented.

The third lens unit G3 includes a biconvex positive lens L8, a positive meniscus lens L9 having a convex surface directed toward the image side, a negative meniscus lens L10 having a convex surface directed toward the object side, a positive meniscus lens L11 having a convex surface directed toward the object side, a negative meniscus lens L12 having a convex surface directed toward the object side, and a biconvex positive lens L13. Here, the negative meniscus lens L10 and the positive meniscus lens L11 are cemented. Moreover, the negative meniscus lens L12 and the biconvex positive lens L13 are cemented.

The fourth lens unit G4 includes a negative meniscus lens L14 having a convex surface directed toward the object side and a positive meniscus lens L15 having a convex surface directed toward the object side. Here, the negative meniscus lens L14 and the positive meniscus lens L15 are cemented.

The fifth lens unit G5 includes a biconvex positive lens L16 and a negative meniscus lens L17 having a convex surface directed toward the image side. Here, the biconvex positive lens L16 and the negative meniscus lens L17 are cemented.

At the time of zooming from a wide angle end to a telephoto end, the first lens unit G1 moves toward the object side, the second lens unit G2 moves toward the image side, the third lens unit G3 moves toward the object side, the fourth lens unit G4 moves toward the object side, and the fifth lens unit G5 is fixed. The aperture stop S moves together with the third lens unit G3.

At the time of focusing, the fourth lens unit G4 moves along an optical axis. More elaborately, at the time of focusing from an object at infinity to an object at a close distance, the fourth lens unit G4 moves toward the image side. Moreover, at the time of image stabilization, the negative meniscus lens L12 and the biconvex positive lens L13 in the third lens unit G3 move in a direction orthogonal to the optical axis.

An aspheric surface is provided to a total of five surfaces namely, both surfaces of the biconcave negative lens L4, both surfaces of the biconvex positive lens L8, and an object-side surface of the biconvex positive lens L16.

A zoom lens according to an example 8 includes in order from an object side, a first lens unit G1 having a positive refractive power, a second lens unit G2 having a negative refractive power, a third lens unit G3 having a positive refractive power, a fourth lens unit G4 having a negative refractive power, and a fifth lens unit G5 having a positive refractive power. An aperture stop S is disposed between the second lens unit G2 and the third lens unit G3.

The first lens unit G1 includes a negative meniscus lens L1 having a convex surface directed toward the object side, a positive meniscus lens L2 having a convex surface directed toward the object side, and a positive meniscus lens L3 having a convex surface directed toward the object side. Here, the negative meniscus lens L1 and the positive meniscus lens L2 are cemented.

The second lens unit G2 includes a negative meniscus lens L4 having a convex surface directed toward the object side, a negative meniscus lens L5 having a convex surface directed toward an image side, a positive meniscus lens L6 having a convex surface directed toward the image side, and a negative meniscus lens L7 having a convex surface directed toward the image side. Here, the negative meniscus lens L5 and the positive meniscus lens L6 are cemented.

The third lens unit G3 includes a biconvex positive lens L8, a biconvex positive lens L9, a negative meniscus lens L10 having a convex surface directed toward the object side, a positive meniscus lens L11 having a convex surface directed toward the object side, a negative meniscus lens L12 having a convex surface directed toward the object side, and a biconvex positive lens L13. Here, the negative meniscus lens L10 and the positive meniscus lens L11 are cemented.

The fourth lens unit G4 includes a negative meniscus lens L14 having a convex surface directed toward the object side and a positive meniscus lens L15 having a convex surface directed toward the object side. Here, the negative meniscus lens L14 and the positive meniscus lens L15 are cemented.

The fifth lens unit G5 includes a negative meniscus lens L16 having a convex surface directed toward the object side and a biconvex positive lens L17. Here, the negative meniscus lens L16 and the biconvex positive lens L17 are cemented.

At the time of zooming from a wide angle end to a telephoto end, the first lens unit G1 moves toward the object side, the second lens unit G2, after moving toward the image side, moves toward the object side, the third lens unit G3 moves toward the object side, the fourth lens unit G4 moves toward the object side, and the fifth lens unit G5 is fixed. The aperture stop S moves together with the third lens unit G3.

At the time of focusing, the fourth lens unit G4 moves along an optical axis. More elaborately, at the time of focusing from an object at infinity to an object at a close distance, the fourth lens unit G4 moves toward the image side. Moreover, at the time of image stabilization, the negative meniscus lens L12 and the biconvex positive lens L13 in the third lens unit G3 move in a direction orthogonal to the optical axis.

An optical surface is provided to a total of nine surfaces namely, both surfaces of the negative meniscus lens L4, both surfaces of the negative meniscus lens L7, both surfaces of the biconvex positive lens L8, both surfaces of the biconvex positive lens L13, and an image-side surface of the biconvex positive lens L17.

A zoom lens according to an example 9 includes in order from an object side, a first lens unit G1 having a positive refractive power, a second lens unit G2 having a negative refractive power, a third lens unit G3 having a positive refractive power, a fourth lens unit G4 having a negative refractive power, and a fifth lens unit G5 having a positive refractive power. An aperture stop S is disposed between the second lens unit G2 and the third lens unit G3.

The first lens unit G1 includes a negative meniscus lens L1 having a convex surface directed toward the object side, a positive meniscus lens L2 having a convex surface directed toward the object side, and a positive meniscus lens L3 having a convex surface directed toward the object side. Here, the negative meniscus lens L1 and the positive meniscus lens L2 are cemented.

The second lens unit G2 includes a negative meniscus lens L4 having a convex surface directed toward the object side, a biconcave negative lens L5, a biconvex positive lens L6, and a negative meniscus lens L7 having a convex surface directed toward an image side. Here, the biconcave negative lens L5 and the biconvex positive lens L6 are cemented.

The third lens unit G3 includes a biconvex positive lens L8, a biconvex positive lens L9, a negative meniscus lens L10 having a convex surface directed toward the object side, a positive meniscus lens L11 having a convex surface directed toward the object side, a negative meniscus lens L12 having a convex surface directed toward the object side, and a biconvex positive lens L13. Here, the negative meniscus lens L10 and the positive meniscus lens L11 are cemented. Moreover, the negative meniscus lens L12 and the biconvex positive lens L13 are cemented.

The fourth lens unit G4 includes a negative meniscus lens L14 having a convex surface directed toward the object side and a positive meniscus lens L15 having a convex surface directed toward the object side. Here, the negative meniscus lens L14 and the positive meniscus lens L15 are cemented.

The fifth lens unit G5 includes a biconvex positive lens L16 and a negative meniscus lens L17 having a convex surface directed toward the image side. Here, the biconvex positive lens L16 and the negative meniscus lens L17 are cemented.

At the time of zooming from a wide angle end to a telephoto end, the first lens unit G1 moves toward the object side, the second lens unit G2 moves toward the image side, the third lens unit G3 moves toward the object side, the fourth lens unit G4 moves toward the object side, and the fifth lens unit G5 moves toward the object side. The aperture stops moves together with the third lens unit G3.

At the time of focusing, the fourth lens unit G4 moves along an optical axis. More elaborately, at the time of focusing from an object at infinity to an object at a close distance, the fourth lens unit G4 moves toward the image side. Moreover, at the time of image stabilization, the negative meniscus lens L12 and the biconvex positive lens L13 in the third lens unit G3 move in a direction orthogonal to the optical axis.

An aspheric surface is provided to a total of six surfaces namely, both surfaces of the negative meniscus lens L4, both surfaces of the biconvex positive lens L8, an image-side surface of the biconvex positive lens L13, and an object-side surface of the biconvex positive lens L16.

A zoom lens according to an example 10 includes in order from an object side, a first lens unit G1 having a positive refractive power, a second lens unit G2 having a negative refractive power, a third lens unit G3 having a positive refractive power, a fourth lens unit G4 having a negative refractive power, and a fifth lens unit G5 having a positive refractive power. An aperture stop s is disposed between the second lens unit G2 and the third lens unit G3.

The first lens unit G1 includes a negative meniscus lens L1 having a convex surface directed toward the object side, a positive meniscus lens L2 having a convex surface directed toward the object side, and a positive meniscus lens L3 having a convex surface directed toward the object side. Here, the negative meniscus lens L1 and the positive meniscus lens L2 are cemented.

The second lens unit G2 includes a negative meniscus lens L4 having a convex surface directed toward the object side, a biconcave negative lens L5, a biconvex positive lens L6, and a negative meniscus lens L7 having a convex surface directed toward an image side. Here, the biconcave negative lens L5 and the biconvex positive lens L6 are cemented.

The third lens unit G3 includes a biconvex positive lens L8, a biconvex positive lens L9, a negative meniscus lens L10 having a convex surface directed toward the object side, a positive meniscus lens L11 having a convex surface directed toward the object side, a negative meniscus lens L12 having a convex surface directed toward the object side, and a biconvex positive lens L13. Here, the negative meniscus lens L10 and the positive meniscus lens L11 are cemented. Moreover, the negative meniscus lens L12 and the biconvex positive lens L13 are cemented.

The fourth lens unit G4 includes a negative meniscus lens L14 having a convex surface directed toward the object side and a positive meniscus lens L15 having a convex surface directed toward the object side. Here, the negative meniscus lens L14 and the positive meniscus lens L15 are cemented.

The fifth lens unit G5 includes a biconvex positive lens L16 and a negative meniscus lens L17 having a convex surface directed toward the image side. Here, the biconvex positive lens L16 and the negative meniscus lens L17 are cemented.

At the time of zooming from a wide angle end to a telephoto end, the first lens unit G1 moves toward the object side, the second lens unit G2 moves toward the image side, the third lens unit G3 moves toward the object side, the fourth lens unit G4, after moving toward the object side, moves toward the image side, and the fifth lens unit G5 moves toward the image side. The aperture stop S moves together with the third lens unit G3.

At the time of focusing, the fourth lens unit G4 moves along an optical axis. More elaborately, at the time of focusing from an object at infinity to an object at a close distance, the fourth lens unit G4 moves toward the image side. Moreover, at the time of image stabilization, the negative meniscus lens L12 and the biconvex positive lens L13 in the third lens unit G3 move in a direction orthogonal to the optical axis.

An aspheric surface is provided to a total of six surfaces namely, both surfaces of the negative meniscus lens L4, both surfaces of the biconvex positive lens L8, an image-side surface of the biconvex positive lens L13, and an object-side surface of the biconvex positive lens L16.

A zoom lens according to an example 11 includes in order from an object side, a first lens unit G1 having a positive refractive power, a second lens unit G2 having a negative refractive power, a third lens unit G3 having a positive refractive power, a fourth lens unit G4 having a negative refractive power, and a fifth lens unit G5 having a positive refractive power. An aperture stop S is disposed between the second lens unit G2 and the third lens unit G3.

The first lens unit G1 includes a negative meniscus lens L1 having a convex surface directed toward the object side, a positive meniscus lens L2 having a convex surface directed toward the object side, and a positive meniscus lens L3 having a convex surface directed toward the object side. Here, the negative meniscus lens L1 and the positive meniscus lens L2 are cemented.

The second lens unit G2 includes a negative meniscus lens L4 having a convex surface directed toward the object side, a biconcave negative lens L5, a biconvex positive lens L6, and a negative meniscus lens L7 having a convex surface directed toward an image side. Here, the biconcave negative lens L5 and the biconvex positive lens L6 are cemented.

The third lens unit G3 includes a biconvex positive lens L8, a biconvex positive lens L9, a negative meniscus lens L10 having a convex surface directed toward the image side, a biconcave negative lens L11, and a biconvex positive lens L12. Here, the biconvex positive lens L9 and the negative meniscus lens L10 are cemented. Moreover, the biconcave negative lens L11 and the biconvex positive lens L12 are cemented.

The fourth lens unit G4 includes a negative meniscus lens L13 having a convex surface directed toward the object side and a positive meniscus lens L14 having a convex surface directed toward the object side. Here, the negative meniscus lens L13 and the positive meniscus lens L14 are cemented.

The fifth lens unit G5 includes a biconcave negative lens L15 and a biconvex positive lens L16.

At the time of zooming from a wide angle end to a telephoto end, the first lens unit G1 is fixed, the second lens unit G2 moves toward the image side, the third lens unit G3 moves toward the object side, the fourth lens unit G4, after moving toward the object side, moves toward the image side, and the fifth lens unit G5, after moving toward the image side, moves toward the object side. The aperture stop S moves together with the third lens unit G3.

At the time of focusing, the fourth lens unit G4 moves along an optical axis. More elaborately, at the time of focusing from an object at infinity to an object at a close distance, the fourth lens unit G4 moves toward the image side. Moreover, at the time of image stabilization, the biconcave negative lens L11 and the biconvex positive lens L12 in the third lens unit G3 move in a direction orthogonal to the optical axis.

An aspheric surface is provided to a total of eight surfaces namely, both surfaces of the negative meniscus lens L4, both surfaces of the negative meniscus lens L7, both surfaces of the biconvex positive lens L8, and both surfaces of the biconvex positive lens L16.

A zoom lens according to an example 12 includes in order from an object side, a first lens unit G1 having a positive refractive power, a second lens unit G2 having a negative refractive power, a third lens unit G3 having a positive refractive power, a fourth lens unit G4 having a negative refractive power, and a fifth lens unit G5 having a positive refractive power. An aperture stop S is disposed between the second lens unit G2 and the third lens unit G3.

The first lens unit G1 includes a negative meniscus lens L1 having a convex surface directed toward the object side, a positive meniscus lens L2 having a convex surface directed toward the object side, and positive meniscus lens L3 having a convex surface directed toward the object side. Here, the negative meniscus lens L1 and the positive meniscus lens L2 are cemented.

The second lens unit G2 includes a negative meniscus lens L4 having a convex surface directed toward the object side, a biconcave negative lens L5, a biconvex positive lens L6, and a negative meniscus lens L7 having a convex surface directed toward an image side. Here, the biconcave negative lens L5 and the biconvex positive lens L6 are cemented.

The third lens unit G3 includes a biconvex positive lens L8, a biconvex positive lens L9, a negative meniscus lens L10 having a convex surface directed toward the image side, a negative meniscus lens L11 having a convex surface directed toward the object side, and a biconvex positive lens L12. Here, the biconvex positive lens L9 and the negative meniscus lens L10 are cemented. Moreover, the negative meniscus lens L11 and the biconvex positive lens L12 are cemented.

The fourth lens unit G4 includes a negative meniscus lens L13 having a convex surface directed toward the object side and a positive meniscus lens L14 having a convex surface directed toward the object side. Here, the negative meniscus lens L13 and the positive meniscus lens L14 are cemented.

The fifth lens unit G5 includes a negative meniscus lens L15 having a convex surface directed toward the object side and a biconvex positive lens L16.

At the time of zooming from a wide angle end to a telephoto end, the first lens unit G1 is fixed, the second lens unit G2 moves toward the image side, the third lens unit G3 moves toward the object side, the fourth lens unit G4 after moving toward the object side, moves toward the image side, and the fifth lens unit G5 is fixed. The aperture stop S is fixed.

At the time of focusing, the fourth lens unit G4 moves along an optical axis. More elaborately, at the time of focusing from an object at infinity to an object at a close distance, the fourth lens unit G4 moves toward the image side. Moreover, at the time of image stabilization, the biconvex positive lens L9 and the negative meniscus lens L10 in the third lens unit G3 move in a direction orthogonal to the optical axis.

An aspheric surface is provided to a total of five surfaces namely, an object-side surface of the biconcave negative lens L5, both surfaces of the negative meniscus lens L7, and both surfaces of the biconvex positive lens L8.

A zoom lens according to an example 13 includes in order from an object side, a first lens unit G1 having a positive refractive power, a second lens unit G2 having a negative refractive power, a third lens unit G3 having a positive refractive power, a fourth lens unit G4 having a negative refractive power, and a fifth lens unit G5 having a positive refractive power. An aperture stop S is disposed between the second lens unit G2 and the third lens unit G3.

The first lens unit G1 includes a negative meniscus lens L1 having a convex surface directed toward the object side, a positive meniscus lens L2 having a convex surface directed toward the object side, and a positive meniscus lens L3 having a convex surface directed toward the object side. Here, the negative meniscus lens L1 and the positive meniscus lens L2 are cemented.

The second lens unit G2 includes a negative meniscus lens L4 having a convex surface directed toward the object side, a biconcave negative lens L5, a biconvex positive lens L6, and a negative meniscus lens L7 having a convex surface directed toward an image side.

The third lens unit G3 includes a biconvex positive lens L8, a biconvex positive lens L9, a negative meniscus lens L10 having a convex surface directed toward the image side, a negative meniscus lens L11 having a convex surface directed toward the object side, and a biconvex positive lens 112. Here, the biconvex positive lens L9 and the negative meniscus lens L10 are cemented. Moreover, the negative meniscus lens L11 and the biconvex positive lens L12 are cemented.

The fourth lens unit G4 includes a negative meniscus lens L13 having a convex surface directed toward the object side and a positive meniscus lens L14 having a convex surface directed toward the object side. Here, the negative meniscus lens L13 and the positive meniscus lens L14 are cemented.

The fifth lens unit G5 includes a negative meniscus lens L15 having a convex surface directed toward the object side and a biconvex positive lens L16.

At the time of zooming from a wide angle end to a telephoto end, the first lens unit G1 is fixed, the second lens unit G2 moves toward the image side, the third lens unit G3 moves toward the object side, the fourth lens unit G4, after moving toward the object side, moves toward the image side, and the fifth lens unit G5 is fixed. The aperture stop S is fixed.

At the time of focusing, the fourth lens unit G4 moves along an optical axis. More elaborately, at the time of focusing from an object at infinity to an object at a close distance, the fourth lens unit G4 moves toward the image side. Moreover, at the time of image stabilization, the negative meniscus lens L11 and the biconvex positive lens L12 in the third lens unit G3 move in a direction orthogonal to the optical axis.

An aspheric surface is provided to a total of four surfaces namely, both surfaces of the biconcave negative lens L5 and both surfaces of the biconvex positive lens L8.

A zoom lens according to an example 14 includes in order from an object side, a first lens unit G1 having a positive refractive power, a second lens unit G2 having a negative refractive power, a third lens unit G3 having a positive refractive power, a fourth lens unit G4 having a negative refractive power, and a fifth lens unit G5 having a positive refractive power. An aperture stop S is disposed between the second lens unit G2 and the third lens unit G3.

The first lens unit G1 includes a negative meniscus lens L1 having a convex surface directed toward the object side, a positive meniscus lens L2 having a convex surface directed toward the object side, and a positive meniscus lens L3 having a convex surface directed toward the object side. Here, the negative meniscus lens L1 and the positive meniscus lens L2 are cemented.

The second lens unit G2 includes a negative meniscus lens L4 having a convex surface directed toward the object side, a biconcave negative lens L5, a biconvex positive lens L6, and a negative meniscus lens L7 having a convex surface directed toward an image side. Here, the biconcave negative lens L5 and the biconvex positive lens L6 are cemented.

The third lens unit G3 includes a biconvex positive lens L8, a negative meniscus lens L9 having a convex surface directed toward the object side, a biconvex positive lens L10, a negative meniscus lens L11 having a convex surface directed toward the object side, and a biconvex positive lens L12. Here, the negative meniscus lens L9 and the biconvex positive lens L10 are cemented. Moreover, the negative meniscus lens L11 and the biconvex positive lens L12 are cemented.

The fourth lens unit G4 includes a positive meniscus lens L13 having a convex surface directed toward the image side and a biconcave negative lens L14. Here, the positive meniscus lens L13 and the biconcave negative lens L14 are cemented.

The fifth lens unit G5 includes a biconvex positive lens L15 and a negative meniscus lens L16 having a convex surface directed toward the image side. Here, the biconvex positive lens L15 and the negative meniscus lens L16 are cemented.

At the time of zooming from a wide angle end to a telephoto end, the first lens unit G1, after moving toward the image side, moves toward the object side, the second lens unit G2 moves toward the image side, the third lens unit G3 is fixed, the fourth lens unit G4 moves toward the image side, and the fifth lens unit G5 is fixed. The aperture stop S is fixed.

At the time of focusing, the fourth lens unit G4 moves along an optical axis. More elaborately, at the time of focusing from an object at infinity to an object at a close distance, the fourth lens unit G4 moves toward the image side. Moreover, at the time of image stabilization, the negative meniscus lens L11 and the biconvex positive lens L12 in the third lens unit G3 move in a direction orthogonal to the optical axis.

An aspheric surface is provided to a total of six surfaces namely, both surfaces of the negative meniscus lens L4, both surfaces of the biconvex positive lens L8, an image-side surface of the biconvex positive lens L12, and an image-side surface of the biconcave negative lens L14.

A zoom lens according to an example 15 includes in order from an object side, a first lens unit G1 having a positive refractive power, a second lens unit G2 having a negative refractive power, a third lens unit G3 having a positive refractive power, a fourth lens unit G4 having a negative refractive power, and a fifth lens unit G5 having a positive refractive power. An aperture stop S is disposed between the second lens unit G2 and the third lens unit G3.

The first lens unit G1 includes a negative meniscus lens L1 having a convex surface directed toward the object side, a positive meniscus lens L2 having a convex surface directed toward the object side, and a positive meniscus lens L3 having a convex surface directed toward the object side. Here, the negative meniscus lens L1 and the positive meniscus lens L2 are cemented.

The second lens unit G2 includes a negative meniscus lens L4 having a convex surface directed toward the object side, a biconcave negative lens L5, a biconvex positive lens L6, and a biconcave negative lens L7. Here, the biconcave negative lens L5 and the biconvex positive lens L6 are cemented.

The third lens unit G3 includes a biconvex positive lens L8, a biconcave negative lens L9, a biconvex positive lens L10, a negative meniscus lens L11 having a convex surface directed toward the object side, and a biconvex positive lens L12. Here, the biconcave negative lens L9 and the biconvex positive lens L10 are cemented. Moreover, the negative meniscus lens L11 and the biconvex positive lens L12 are cemented.

The fourth lens unit G4 includes a positive meniscus lens L13 having a convex surface directed toward an image side and a biconcave negative lens L14. Here, the positive meniscus lens L13 and the biconcave negative lens L14 are cemented.

The fifth lens unit G5 includes a biconvex positive lens L15 and a negative meniscus lens L16 having a convex surface directed toward the image side. Here, the biconvex positive lens L15 and the negative meniscus lens L16 are cemented.

At the time of zooming from a wide angle end to a telephoto end, the first lens unit G1, after moving toward the image side, moves toward the object side, the second lens unit G2 moves toward the image side, the third lens unit G3 is fixed, the fourth lens unit G4 moves toward the image side, and the fifth lens unit G5 moves toward the image side. The aperture stop S is fixed.

At the time of focusing, the fourth lens unit G4 moves along an optical axis. More elaborately, at the time of focusing from an object and infinity to an object at a close distance, the fourth lens unit G4 moves toward the image side. Moreover, at the time of image stabilization, the negative meniscus lens L11 and the biconvex positive lens L12 in the third lens unit G3 move in a direction orthogonal to the optical axis.

An aspheric surface is provided to a total of six surfaces namely, both surfaces of the negative meniscus lens L4, both surfaces of the biconvex positive lens L8, an image-side surface of the biconvex positive lens L12, and an image-side surface of the biconcave negative lens L14.

Next, numerical data of optical components comprising the zoom lens of each above example are shown. In numerical data of each example, r1, r2, . . . denotes a curvature radius of each lens surface, d1, d2, . . . denotes a thickness of each lens or an air distance between adjacent lens surfaces, nd1, nd2, . . . denotes a refractive index of each lens for d-line, vd1, vd2, . . . denotes an Abbe number of each lens, * denotes an aspheric surface. Moreover, in zoom data, WE denotes a wide angle end, ST denotes an intermediate state, TE denotes a telephoto end, f denotes a focal length of the entire zoom lens system, FNO. denotes an F number, ω denotes a half angle of view, LTL denotes a lens total length of the optical system, FB denotes a back focus, each of f1, f2 . . . is a focal length of each lens unit. The lens total length is a distance from a frontmost lens surface to the rearmost lens surface plus back focus. The back focus is a unit which is expressed upon air conversion of a distance from a rearmost lens surface to a paraxial image surface. Moreover, the numerical data is a data when focused to an object at infinity.

A shape of an aspheric surface is defined by the following expression where the direction of the optical axis is represented by z, the direction orthogonal to the optical axis is represented by y, a conical coefficient is represented by K, aspheric surface coefficients are represented by A4, A6, A8, A10, A12:

$$Z=(y^2/r)/[1+\{1-(1+k)(y/r)^2\}^{1/2}]+A4y^4+A6y^6+A8y^8+A10y^{10}+A12y^{12}$$

Further, in the aspherical surface coefficients, 'e-n' (where, n is an integral number) indicates '$10^{-n}$'. Moreover, these symbols are commonly used in the following numerical data for each example.

Example 1

| Unit mm | | | | |
|---|---|---|---|---|
| Surface data | | | | |
| Surface no. | r | d | nd | vd |
| Object plane | ∞ | ∞ | | |
| 1 | 83.330 | 1.700 | 1.85478 | 24.80 |
| 2 | 57.192 | 6.236 | 1.49700 | 81.61 |
| 3 | −2638.825 | 0.150 | | |
| 4 | 55.676 | 4.801 | 1.49700 | 81.61 |
| 5 | 280.127 | Variable | | |
| 6* | −214.906 | 1.800 | 1.74320 | 49.34 |
| 7* | 12.623 | 6.700 | | |
| 8 | −26.244 | 1.200 | 1.49700 | 81.61 |
| 9 | 62.822 | 2.813 | 1.85478 | 24.80 |
| 10 | −27.095 | 1.448 | | |
| 11* | −15.473 | 1.200 | 1.74320 | 49.34 |
| 12* | −55.735 | Variable | | |
| 13 (Stop) | ∞ | 1.500 | | |
| 14* | 16.974 | 5.852 | 1.58313 | 59.38 |
| 15* | −76.148 | 1.136 | | |
| 16 | −475.191 | 2.300 | 1.63930 | 44.87 |
| 17 | −32.066 | 0.300 | | |
| 18 | 132.650 | 1.000 | 1.90366 | 31.32 |
| 19 | 13.751 | 5.825 | 1.49700 | 81.61 |
| 20* | −27.166 | Variable | | |
| 21 | 125.473 | 1.869 | 1.80518 | 25.42 |
| 22 | −117.052 | 1.000 | 1.58313 | 59.38 |
| 23* | 22.259 | Variable | | |
| 24 | 127.365 | 6.510 | 1.49700 | 81.61 |
| 25 | −19.078 | 1.300 | 1.85478 | 24.80 |
| 26 | −26.030 | Variable | | |
| Image plane | ∞ | | | |

Aspherical surface data

6th surface k = 0.0000
A4 = 3.5684e−005, A6 = −7.3312e−008, A8 = 0.0000e+000,
A10 = 0.0000e+000, A12 = 0.0000e+000, A14 = 0.0000e+000

7th surface k = 0.0000
A4 = 2.3193e−005, A6 = 3.9017e−007, A8 = −9.5112e−010,
A10 = 5.4619e−011, A12 = 0.0000e+000, A14 = 0.0000e+000

11th surface k = 0.0000
A4 = 4.3153e−005, A6 = 2.5210e−007, A8 = −8.9826e−010,
A10 = −3.4890e−012, A12 = 0.0000e+000, A14 = 0.0000e+000

12th surface k = 0.0000
A4 = 1.2446e−005, A6 = 4.8207e−008, A8 = −1.2565e−009,
A10 = 0.0000e+000, A12 = 0.0000e+000, A14 = 0.0000e+000

-continued

| Unit mm |
|---|
| 14th surface | k = 0.0000
A4 = −3.1521e−005, A6 = 4.0187e−008, A8 = −5.9613e−010,
A10 = 7.2686e−013, A12 = 0.0000e+000, A14 = 0.0000e+000

15th surface k = 0.0000
A4 = 5.3000e−005, A6 = −8.2690e−008, A8 = 2.4317e−011,
A10 = 0.0000e+000, A12 = 0.0000e+000, A14 = 0.0000e+000

20th surface k = 0.0000
A4 = −6.9843e−006, A6 = 5.9426e−008, A8 = 0.0000e+000,
A10 = 0.0000e+000, A12 = 0.0000e+000, A14 = 0.0000e+000

23th surface k = 0.0000
A4 = 6.3774e−006, A6 = −3.5640e−008, A8 = 0.0000e+000,
A10 = 0.0000e+000, A12 = 0.0000e+000, A14 = 0.0000e+000

| Zoom data | | | |
|---|---|---|---|
|  | WE | ST | TE |
| f | 12.372 | 35.588 | 98.005 |
| FNO. | 4.061 | 4.074 | 4.072 |
| 2ω | 90.6 | 32.5 | 12.2 |
| FB | 18.362 | 16.649 | 15.680 |
| LTL | 101.728 | 123.637 | 159.102 |
| d5 | 0.500 | 19.263 | 43.611 |
| d12 | 19.800 | 5.761 | 1.000 |
| d20 | 2.000 | 16.819 | 17.988 |
| d23 | 4.426 | 8.505 | 24.183 |
| d26 | 18.362 | 16.649 | 15.680 |

| Unit focal length |
|---|
| f1 = 88.672   f2 = −11.551   f3 = 20.203   f4 = −56.871   f5 = 55.303 |

Example 2

| Unit mm | | | | |
|---|---|---|---|---|
| Surface data | | | | |
| Surface no. | r | d | nd | νd |
| Object plane | ∞ | ∞ | | |
| 1 | 57.514 | 1.400 | 1.90366 | 31.32 |
| 2 | 43.202 | 7.500 | 1.49700 | 81.61 |
| 3 | 344.317 | 0.200 | | |
| 4 | 63.135 | 4.200 | 1.49700 | 81.61 |
| 5 | 222.298 | Variable | | |
| 6* | 468.367 | 1.200 | 1.80139 | 45.45 |
| 7* | 13.283 | 5.632 | | |
| 8 | −43.235 | 1.218 | 1.80400 | 46.58 |
| 9 | 94.296 | 0.150 | | |
| 10 | 105.915 | 2.674 | 1.85478 | 24.80 |
| 11 | −37.594 | 2.241 | | |
| 12* | −14.220 | 0.900 | 1.49700 | 81.61 |
| 13* | 1214.972 | 0.100 | | |
| 14 | 78.971 | 2.200 | 1.80000 | 29.84 |
| 15 | −105.866 | Variable | | |
| 16 (Stop) | ∞ | Variable | | |
| 17* | 17.072 | 6.696 | 1.58913 | 61.14 |
| 18* | −41.817 | 0.379 | | |
| 19 | 37.316 | 4.232 | 1.49700 | 81.61 |
| 20 | −38.028 | 0.100 | | |
| 21 | 7385.309 | 0.800 | 1.91082 | 35.25 |
| 22 | 11.565 | 6.395 | 1.49700 | 81.61 |
| 23 | −39.166 | Variable | | |
| 24 | 888.684 | 0.700 | 1.71999 | 50.23 |
| 25 | 13.659 | 1.800 | 1.80810 | 22.76 |
| 26 | 18.913 | Variable | | |
| 27* | 36.240 | 6.000 | 1.49700 | 81.61 |
| 28* | −44.083 | 15.700 | | |
| Image plane | ∞ | | | |

| Aspherical surface data |
|---|
| 6th surface | k = 0.0000
A4 = −2.5765e−006, A6 = 2.0798e−007, A8 = −8.1344e−010,
A10 = 1.2111e−012, A12 = 0.0000e+000, A14 = 0.0000e+000

7th surface k = 0.0000
A4 = −3.9505e−005, A6 = 2.7652e−007, A8 = −1.5931e−009,
A10 = 2.8563e−011, A12 = 0.0000e+000, A14 = 0.0000e+000

12th surface k = 0.0000
A4 = −1.3529e−005, A6 = 3.9708e−007, A8 = 6.2625e−010,
A10 = −1.5563e−011, A12 = 0.0000e+000, A14 = 0.0000e+000

13th surface k = 0.0000
A4 = −1.4948e−005, A6 = 4.4034e−007, A8 = −2.8038e−009,
A10 = 3.4123e−013, A12 = 0.0000e+000, A14 = 0.0000e+000

17th surface k = 0.0000
A4 = −3.1826e−005, A6 = 9.3015e−009, A8 = −2.7312e−010,
A10 = −2.3047e−012, A12 = 0.0000e+000, A14 = 0.0000e+000

18th surface k = 0.0000
A4 = 3.7300e−005, A6 = −1.2953e−008, A8 = 5.8604e−010,
A10 = −2.3311e−012, A12 = 0.0000e+000, A14 = 0.0000e+000

27th surface k = 0.0000
A4 = 2.2320e−005, A6 = 1.2133e−008, A8 = −2.4420e−010,
A10 = 1.3290e−013, A12 = 0.0000e+000, A14 = 0.0000e+000

28th surface k = 0.0000
A4 = 3.2583e−005, A6 = −3.6593e−008, A8 = −1.9488e−010,
A10 = 0.0000e+000, A12 = 0.0000e+000, A14 = −0.0000e+000

| Zoom data | | | |
|---|---|---|---|
|  | WE | ST | TE |
| f | 12.250 | 34.428 | 98.042 |
| FNO. | 4.082 | 4.070 | 4.053 |
| 2ω | 83.4 | 34.1 | 12.2 |
| FB | 15.700 | 15.700 | 15.700 |
| LTL | 109.613 | 129.583 | 155.109 |
| d5 | 0.641 | 20.611 | 46.138 |
| d15 | 19.976 | 6.650 | 1.513 |
| d16 | 9.840 | 5.993 | 1.532 |
| d23 | 1.993 | 8.426 | 16.174 |
| d26 | 4.745 | 15.485 | 17.335 |

| Unit focal length |
|---|
| f1 = 95.323   f2 = −13.174   f3 = 20.222   f4 = −28.452   f5 = 41.036 |

Example 3

Unit mm

Surface data

| Surface no. | r | d | nd | vd |
|---|---|---|---|---|
| Object plane | ∞ | ∞ | | |
| 1 | 85.868 | 2.250 | 1.85478 | 24.80 |
| 2 | 60.902 | 6.000 | 1.49700 | 81.54 |
| 3 | −1493.460 | 0.150 | | |
| 4 | 48.944 | 4.602 | 1.49700 | 81.54 |
| 5 | 134.439 | Variable | | |
| 6 | 174.592 | 1.500 | 1.88300 | 40.76 |
| 7 | 12.382 | 5.950 | | |
| 8* | −61.925 | 1.600 | 1.49700 | 81.54 |
| 9* | 34.608 | 1.091 | | |
| 10 | 6000.000 | 5.664 | 1.85478 | 24.80 |
| 11 | −20.382 | 0.997 | | |
| 12* | −15.460 | 1.200 | 1.80610 | 40.92 |
| 13* | −33.768 | Variable | | |
| 14 (Stop) | ∞ | Variable | | |
| 15* | 21.437 | 4.468 | 1.58313 | 59.38 |
| 16* | −302.665 | 3.401 | | |
| 17 | 35.824 | 3.367 | 1.49700 | 81.54 |
| 18 | −89.832 | 0.200 | | |
| 19 | 55.128 | 1.000 | 1.91082 | 35.25 |
| 20 | 13.177 | 3.413 | 1.53996 | 59.46 |
| 21 | 26.168 | 1.200 | | |
| 22 | 22.428 | 1.150 | 1.74077 | 27.79 |
| 23 | 18.137 | 6.467 | 1.49700 | 81.54 |
| 24* | −40.530 | Variable | | |
| 25 | −409.537 | 0.900 | 1.80610 | 40.92 |
| 26 | 13.247 | 2.996 | 1.80810 | 22.76 |
| 27 | 25.765 | Variable | | |
| 28* | 49.615 | 9.340 | 1.59201 | 67.02 |
| 29 | −17.859 | 1.300 | 1.90366 | 31.32 |
| 30 | −32.538 | 15.322 | | |
| Image plane | ∞ | | | |

Aspherical surface data

8th surface k = 0.0000
A4 = 1.9753e−005, A6 = −2.4680e−007, A8 = 3.0050e−010,
A10 = 0.0000e+000, A12 = 0.0000e+000, A14 = 0.0000e+000

9th surface k = 0.0000
A4 = −3.5396e−005, A6 = −2.9197e−007, A8 = 0.0000e+000,
A10 = 0.0000e+000, A12 = 0.0000e+000, A14 = 0.0000e+000

12th surface k = 0.0000
A4 = 1.3572e−005, A6 = 5.8250e−008, A8 = 0.0000e+000,
A10 = 0.0000e+000, A12 = 0.0000e+000, A14 = 0.0000e+000

13th surface k = 0.0000
A4 = −1.2282e−005, A6 = 0.0000e+000, A8 = 0.0000e+000,
A10 = 0.0000e+000, A12 = 0.0000e+000, A14 = 0.0000e+000

15th surface k = 0.0000
A4 = −8.8594e−006, A6 = −8.6927e−009, A8 = −4.7820e−011,
A10 = −1.0166e−014, A12 = 0.0000e+000, A14 = 0.0000e+000

16th surface k = 0.0000
A4 = 1.3582e−005, A6 = −1.4620e−008, A8 = 0.0000e+000,
A10 = 0.0000e+000, A12 = 0.0000e+000, A14 = 0.0000e+000

24th surface k = 0.0000
A4 = 1.7867e−005, A6 = 1.1887e−008, A8 = −4.8566e−011,
A10 = 0.0000e+000, A12 = 0.0000e+000, A14 = 0.0000e+000

-continued

Unit mm

28th surface k = 0.0000
A4 = 2.4885e−006, A6 = 2.0316e−008, A8 = 0.0000e+000,
A10 = 0.0000e+000, A12 = 0.0000e+000, A14 = 0.0000e+000

Zoom data

| | WE | ST | TE |
|---|---|---|---|
| f | 12.238 | 34.627 | 97.981 |
| FNO. | 4.075 | 4.075 | 4.073 |
| 2ω | 84.5 | 34.2 | 12.3 |
| FB | 15.322 | 15.322 | 15.322 |
| LTL | 131.582 | 137.230 | 166.417 |
| d5 | 0.600 | 14.011 | 44.110 |
| d13 | 17.691 | 6.972 | 1.000 |
| d14 | 21.000 | 5.014 | 1.506 |
| d24 | 2.500 | 13.300 | 19.586 |
| d27 | 4.263 | 12.406 | 14.689 |

Unit focal length f1 = 91.703   f2 = −14.082   f3 = 24.409   f4 = −30.024   f5 = 46.269

Example 4

Unit mm

Surface data

| Surface no. | r | d | nd | vd |
|---|---|---|---|---|
| Object plane | ∞ | ∞ | | |
| 1 | 90.000 | 2.300 | 1.85478 | 24.80 |
| 2 | 65.592 | 7.382 | 1.49700 | 81.54 |
| 3 | ∞ | 0.150 | | |
| 4 | 59.096 | 5.131 | 1.49700 | 81.54 |
| 5 | 173.762 | Variable | | |
| 6* | 464.875 | 1.500 | 1.88202 | 37.22 |
| 7* | 14.784 | 7.450 | | |
| 8 | −20.119 | 1.200 | 1.61800 | 63.40 |
| 9 | 35.728 | 5.000 | 2.00069 | 25.46 |
| 10 | −33.690 | 1.914 | | |
| 11 | −19.739 | 1.300 | 1.88300 | 40.76 |
| 12 | −42.267 | Variable | | |
| 13 (Stop) | ∞ | 1.500 | | |
| 14* | 23.000 | 5.000 | 1.58313 | 59.38 |
| 15* | −262.448 | 3.259 | | |
| 16 | 43.079 | 3.715 | 1.49700 | 81.54 |
| 17 | −41.898 | 0.400 | | |
| 18 | 85.095 | 1.000 | 1.91082 | 35.25 |
| 19 | 15.097 | 3.279 | 1.49700 | 81.54 |
| 20 | 45.596 | 1.200 | | |
| 21 | 23.870 | 0.800 | 1.85478 | 24.80 |
| 22 | 17.905 | 5.079 | 1.58313 | 59.38 |
| 23* | −53.454 | Variable | | |
| 24 | 155.034 | 0.900 | 1.83481 | 42.73 |
| 25 | 10.571 | 3.278 | 1.80809 | 22.76 |
| 26 | 17.967 | Variable | | |
| 27* | 59.278 | 9.078 | 1.49700 | 81.54 |
| 28 | −17.171 | 1.300 | 2.00100 | 29.13 |
| 29 | −22.118 | 16.052 | | |
| Image plane | ∞ | | | |

Aspherical surface data

6th surface k = 0.0000
A4 = −5.5689e−006, A6 = 1.3408e−007, A8 = −4.4733e−010,
A10 = 7.1015e−013, A12 = 0.0000e+000, A14 = 0.0000e+000

-continued

| Unit mm | | | | |
|---|---|---|---|---|
| 7th surface | | | | | k = 0.0000
A4 = −2.8514e−005, A6 = 6.4243e−008, A8 = 1.9884e−010,
A10 = 2.2609e−012, A12 = 0.0000e+000, A14 = 0.0000e+000
14th surface k = 0.0000
A4 = −5.3982e−006, A6 = −2.4500e−008, A8 = 5.7642e−012,
A10 = −3.0015e−014, A12 = 0.0000e+000, A14 = 0.0000e+000
15th surface k = 0.0000
A4 = 2.4015e−005, A6 = −2.9581e−008, A8 = 2.3042e−011,
A10 = 0.0000e+000, A12 = 0.0000e+000, A14 = 0.0000e+000
23th surface k = 0.0000
A4 = 9.6902e−006, A6 = 1.3598e−008, A8 = −1.8927e−012,
A10 = 3.3501e−013, A12 = 0.0000e+000, A14 = 0.0000e+000
27th surface k = 0.0000
A4 = −3.7000e−006, A6 = 3.8872e−008, A8 = −3.7481e−011,
A10 = 0.0000e+000, A12 = 0.0000e+000, A14 = 0.0000e+000

| Zoom data | | | |
|---|---|---|---|
| | WE | ST | TE |
| f | 12.239 | 34.636 | 97.921 |
| FNO. | 4.080 | 4.080 | 4.080 |
| 2ω | 83.3 | 33.8 | 12.1 |
| FB | 16.052 | 16.052 | 16.052 |
| LTL | 131.58 | 146.438 | 172.588 |
| d5 | 0.600 | 22.300 | 51.610 |
| d12 | 34.928 | 12.189 | 1.321 |
| d23 | 2.400 | 9.868 | 17.863 |
| d27 | 4.485 | 12.915 | 12.627 |

Unit focal length f1 = 104.212  f2 = −13.280  f3 = 22.297  f4 = −23.946  f5 = 41.573

Example 5

| Unit mm | | | | |
|---|---|---|---|---|
| Surface data | | | | |
| Surface no. | r | d | nd | νd |
| Object plane | ∞ | ∞ | | |
| 1 | 103.528 | 2.100 | 1.90366 | 31.32 |
| 2 | 66.407 | 7.069 | 1.49700 | 81.54 |
| 3 | −1175.958 | 0.150 | | |
| 4 | 55.990 | 5.410 | 1.49700 | 81.54 |
| 5 | 218.620 | Variable | | |
| 6 | 547.313 | 1.500 | 1.80610 | 40.88 |
| 7* | 14.637 | 6.141 | | |
| 8 | −47.513 | 1.100 | 1.88300 | 40.76 |
| 9 | 31.696 | 0.000 | | |
| 10 | 31.696 | 3.987 | 1.72825 | 28.46 |
| 11 | −44.962 | 2.095 | | |
| 12 | −16.749 | 1.000 | 1.49700 | 81.54 |
| 13 | 55.628 | 2.688 | 1.91082 | 35.25 |
| 14 | −63.523 | Variable | | |
| 15 (Stop) | ∞ | Variable | | |
| 16* | 23.283 | 3.762 | 1.58313 | 59.38 |
| 17* | −467.386 | 1.736 | | |
| 18 | 32.536 | 4.580 | 1.49700 | 81.54 |
| 19 | −40.128 | 0.157 | | |
| 20 | 89.775 | 1.000 | 1.88300 | 40.76 |
| 21 | 14.365 | 3.130 | 1.49700 | 81.54 |
| 22 | 30.877 | 1.200 | | |
| 23 | 24.456 | 0.900 | 1.85478 | 24.80 |
| 24 | 16.410 | 5.200 | 1.58313 | 59.38 |
| 25* | −45.111 | Variable | | |
| 26 | 871.626 | 0.900 | 1.72000 | 41.98 |
| 27 | 10.464 | 3.338 | 1.80810 | 22.76 |
| 28 | 15.385 | Variable | | |
| 29* | 35.348 | 10.327 | 1.49700 | 81.54 |
| 30 | −16.421 | 1.300 | 1.90366 | 31.32 |
| 31 | −25.684 | 15.233 | | |
| Image plane | ∞ | | | |

Aspherical surface data

6th surface k = 0.0000
A4 = −2.8364e−006, A6 = 1.6908e−007, A8 = −1.0182e−009,
A10 = 2.9041e−012, A12 = −3.3911e−015, A14 = 0.0000e+000
7th surface k = 0.0000
A4 = −2.2090e−005, A6 = 2.2977e−007, A8 = −9.9659e−010,
A10 = 9.5578e−012, A12 = −4.0453e−014, A14 = 0.0000e+000
16th surface k = 0.0000
A4 = −1.1596e−005, A6 = −1.4295e−007, A8 = 1.2772e−009,
A10 = −1.4071e−011, A12 = 0.0000e+000, A14 = 0.0000e+000
17th surface k = 0.0000
A4 = 1.8764e−005, A6 = −1.4606e−007, A8 = 1.2128e−009,
A10 = −1.3563e−011, A12 = 0.0000e+000, A14 = 0.0000e+000
25th surface k = 0.0000
A4 = 8.8921e−006, A6 = 8.7418e−009, A8 = −3.1606e−010,
A10 = 6.3295e−012, A12 = −3.8820e−014, A14 = 0.0000e+000
29th surface k = 0.0000
A4 = 5.3025e−006, A6 = 3.9054e−008, A8 = −4.7497e−012,
A10 = −1.9075e−013, A12 = 7.9584e−016, A14 = 0.0000e+000

| Zoom data | | | |
|---|---|---|---|
| | WE | ST | TE |
| f | 12.232 | 34.291 | 100.530 |
| FNO. | 4.080 | 4.079 | 4.080 |
| 2ω | 84.5 | 34.0 | 11.9 |
| FB | 15.233 | 15.233 | 15.233 |
| LTL | 134.679 | 141.237 | 170.377 |
| d5 | 0.600 | 21.709 | 52.560 |
| d14 | 30.550 | 8.755 | 1.000 |
| d15 | 10.000 | 4.700 | 1.500 |
| d26 | 1.700 | 10.085 | 16.190 |
| d29 | 5.825 | 9.984 | 13.124 |

Unit focal length f1 = 103.872  f2 = −14.425  f3 = 22.375  f4 = −23.604  f5 = 42.251

Example 6

Unit mm

Surface data

| Surface no. | r | d | nd | vd |
|---|---|---|---|---|
| Object plane | ∞ | ∞ | | |
| 1 | 76.710 | 2.200 | 1.85478 | 24.80 |
| 2 | 58.604 | 5.389 | 1.49700 | 81.61 |
| 3 | 635.668 | 0.150 | | |
| 4 | 56.439 | 3.626 | 1.49700 | 81.61 |
| 5 | 140.492 | Variable | | |
| 6* | 200.000 | 1.800 | 1.74320 | 49.34 |
| 7* | 12.374 | 8.850 | | |
| 8 | −20.267 | 1.200 | 1.49700 | 81.61 |
| 9 | −332.236 | 3.198 | 1.85478 | 24.80 |
| 10 | −23.822 | 1.064 | | |
| 11* | −17.262 | 1.200 | 1.74320 | 49.34 |
| 12* | −36.569 | Variable | | |
| 13 (Stop) | ∞ | 1.500 | | |
| 14* | 20.060 | 4.952 | 1.58313 | 59.38 |
| 15* | −155.822 | 1.782 | | |
| 16 | 34.309 | 4.568 | 1.48749 | 70.23 |
| 17 | −46.826 | 0.417 | | |
| 18 | 173.112 | 1.000 | 1.91082 | 35.25 |
| 19 | 12.971 | 4.545 | 1.49700 | 81.61 |
| 20 | 41.229 | 1.000 | | |
| 21* | 24.835 | 4.551 | 1.49700 | 81.61 |
| 22* | −41.414 | Variable | | |
| 23 | 158.700 | 1.000 | 1.88300 | 40.80 |
| 24 | 12.593 | 2.082 | 1.89286 | 20.36 |
| 25 | 18.843 | Variable | | |
| 26 | 38.408 | 1.400 | 1.92286 | 18.90 |
| 27 | 32.340 | 6.750 | 1.49700 | 81.61 |
| 28* | −31.711 | 15.320 | | |
| Image plane | ∞ | | | |

Aspherical surface data

6th surface k = 0.0000
A4 = −4.9802e−006, A6 = 2.7430e−008, A8 = −4.5015e−012,
A10 = 0.0000e+000, A12 = 0.0000e+000, A14 = 0.0000e+000

7th surface k = 0.0000
A4 = −3.0291e−005, A6 = −9.0575e−008, A8 = −8.4857e−010,
A10 = 0.0000e+000, A12 = 0.0000e+000, A14 = 0.0000e+000

11th surface k = 0.0000
A4 = 9.7473e−006, A6 = −5.3009e−008, A8 = −9.7378e−011,
A10 = 0.0000e+000, A12 = 0.0000e+000, A14 = 0.0000e+000

12th surface k = 0.0000
A4 = −4.8913e−006, A6 = −8.0015e−008, A8 = 4.0951e−012,
A10 = 0.0000e+000, A12 = 0.0000e+000, A14 = 0.0000e+000

14th surface k = 0.0000
A4 = −1.1749e−005, A6 = −2.4832e−009, A8 = −4.7360e−011,
A10 = 0.0000e+000, A12 = 0.0000e+000, A14 = 0.0000e+000

15th surface k = 0.0000
A4 = 1.8806e−005, A6 = 6.4442e−009, A8 = 1.5000e−011,
A10 = 0.0000e+000, A12 = 0.0000e+000, A14 = 0.0000e+000

21th surface k = 0.0000
A4 = −1.0679e−005, A6 = 1.0015e−009, A8 = 0.0000e+000,
A10 = 0.0000e+000, A12 = 0.0000e+000, A14 = 0.0000e+000

22th surface k = 0.0000
A4 = 8.1649e−006, A6 = 0.0000e+000, A8 = 0.0000e+000,
A10 = 0.0000e+000, A12 = 0.0000e+000, A14 = 0.0000e+000

28th surface k = 0.0000
A4 = 6.2872e−006, A6 = −2.3159e−008, A8 = 3.1313e−011,
A10 = 0.0000e+000, A12 = 0.0000e+000, A14 = 0.0000e+000

Zoom data

| | WE | ST | TE |
|---|---|---|---|
| f | 12.239 | 34.633 | 98.020 |
| FNO. | 4.058 | 4.064 | 4.078 |
| 2ω | 85.8 | 34.2 | 12.2 |
| FB | 15.320 | 15.320 | 15.320 |
| LTL | 128.08 | 140.328 | 166.594 |
| d5 | 0.600 | 18.176 | 46.140 |
| d12 | 38.318 | 13.608 | 1.000 |
| d22 | 2.500 | 10.701 | 23.133 |
| d25 | 7.119 | 18.300 | 16.778 |

Unit focal length f1 = 104.489  f2 = −14.099  f3 = 23.071  f4 = −24.650  f5 = 38.903

Example 7

Unit mm

Surface data

| Surface no. | r | d | nd | vd |
|---|---|---|---|---|
| Object plane | ∞ | ∞ | | |
| 1 | 80.000 | 2.250 | 1.85478 | 24.80 |
| 2 | 59.167 | 5.626 | 1.49700 | 81.54 |
| 3 | 546.310 | 0.150 | | |
| 4 | 51.514 | 4.590 | 1.49700 | 81.54 |
| 5 | 174.852 | Variable | | |
| 6* | −222.088 | 1.500 | 1.88202 | 37.22 |
| 7* | 15.586 | 8.174 | | |
| 8 | −20.946 | 1.000 | 1.61800 | 63.40 |
| 9 | 41.170 | 5.035 | 2.00069 | 25.46 |
| 10 | −36.009 | 3.347 | | |
| 11 | −18.651 | 1.000 | 1.88300 | 40.76 |
| 12 | −29.364 | Variable | | |
| 13(Stop) | ∞ | 1.500 | | |
| 14* | 20.100 | 4.452 | 1.58313 | 59.38 |
| 15* | −87.433 | 2.452 | | |
| 16 | −179.947 | 3.465 | 1.49700 | 81.54 |
| 17 | −22.336 | 0.809 | | |
| 18 | 442.634 | 1.000 | 1.91082 | 35.25 |
| 19 | 17.416 | 2.402 | 1.49700 | 81.54 |
| 20 | 31.167 | 1.300 | | |
| 21 | 23.658 | 1.100 | 1.95375 | 32.31 |
| 22 | 13.218 | 5.897 | 1.72916 | 54.68 |
| 23 | −59.692 | Variable | | |
| 24 | 417.171 | 0.900 | 1.83481 | 42.73 |
| 25 | 11.189 | 3.042 | 1.80810 | 22.76 |
| 26 | 18.964 | Variable | | |
| 27* | 65.196 | 9.352 | 1.49700 | 81.54 |
| 28 | −16.001 | 1.300 | 1.90366 | 31.32 |
| 29 | −20.290 | 15.122 | | |
| Image plane | ∞ | | | |

-continued

Unit mm

Aspherical Surface data

6th surface k = 0.0000
A4 = 7.1131e−006, A6 = 5.6112e−008, A8 = −2.2970e−010,
A10 = 3.6374e−013, A12 = 0.0000e+000, A14 = 0.0000e+000
7th surface k = 0.0000
A4 = −2.0193e−005, A6 = 3.1058e−008, A8 = 2.4791e−010, A10 =
−1.9050e−012, A12 = 0.0000e+000, A14 = 0.0000e+000
14th surface k = 0.0000
A4 = −1.2537e−006, A6 = 6.4298e−008, A8 = 5.3707e−011,
A10 = 7.1636e−013, A12 = 0.0000e+000, A14 = 0.0000e+000
15th surface k = 0.0000
A4 = 5.6025e−005, A6 = 8.3512e−008, A8 = 3.2703e−010,
A10 = 0.0000e+000, A12 = 0.0000e+000, A14 = 0.0000e+000
27th surface k = 0.0000
A4 = −1.2610e−005, A6 = 1.6806e−008, A8 = 3.1468e−011,
A10 = 0.0000e+000, A12 = 0.0000e+000, A14 = 0.0000e+000

Zoom data

|  | WE | ST | TE |
|---|---|---|---|
| f | 12.238 | 30.963 | 78.455 |
| FNO. | 4.080 | 4.080 | 4.079 |
| 2ω | 83.1 | 37.7 | 15.1 |
| FB | 15.122 | 15.122 | 15.122 |
| LTL | 130.303 | 136.766 | 158.575 |
| d5 | 0.600 | 14.507 | 39.496 |
| d12 | 35.599 | 12.430 | 1.200 |
| d23 | 2.886 | 9.471 | 17.007 |
| d26 | 4.455 | 13.593 | 14.108 |

Unit focal length f1 = 94.859   f2 = −13.920   f3 = 22.454   f4 = −23.266   f5 = 37.967

Example 8

Unit mm

Surface data

| Surface no. | r | d | nd | vd |
|---|---|---|---|---|
| Object plane | ∞ | ∞ | | |
| 1 | 88.362 | 2.200 | 1.85478 | 24.80 |
| 2 | 65.713 | 5.265 | 1.49700 | 81.61 |
| 3 | 804.941 | 0.150 | | |
| 4 | 56.711 | 4.040 | 1.49700 | 81.61 |
| 5 | 150.833 | Variable | | |
| 6* | 200.000 | 1.800 | 1.74320 | 49.34 |
| 7* | 12.446 | 9.250 | | |
| 8 | −21.103 | 1.200 | 1.49700 | 81.61 |
| 9 | −346.622 | 3.486 | 1.85478 | 24.80 |
| 10 | −22.905 | 1.035 | | |
| 11* | −17.268 | 1.200 | 1.74320 | 49.34 |
| 12* | −42.882 | Variable | | |
| 13(Stop) | ∞ | 1.500 | | |
| 14* | 21.818 | 4.671 | 1.58313 | 59.38 |
| 15* | −222.346 | 1.854 | | |
| 16 | 32.622 | 4.522 | 1.48749 | 70.23 |
| 17 | −60.155 | 0.300 | | |
| 18 | 70.858 | 1.000 | 1.91082 | 35.25 |
| 19 | 13.249 | 4.365 | 1.51823 | 58.90 |
| 20 | 32.193 | 1.000 | | |
| 21 | 22.863 | 1.000 | 1.74077 | 27.79 |
| 22 | 17.843 | 0.200 | | |
| 23* | 17.993 | 5.711 | 1.49700 | 81.61 |
| 24* | −41.482 | Variable | | |
| 25 | 766.427 | 1.000 | 1.88300 | 40.80 |
| 26 | 13.824 | 2.028 | 1.89286 | 20.36 |
| 27 | 21.179 | Variable | | |
| 28 | 34.859 | 1.400 | 1.92286 | 18.90 |
| 29 | 30.846 | 6.759 | 1.49700 | 81.61 |
| 30* | −31.743 | 15.319 | | |
| Image plane | ∞ | | | |

Aspherical surface data

6th surface k = 0.0000
A4 = −1.7203e−006, A6 = 1.7291e−008, A8 = −4.1594e−012,
A10 = 0.0000e+000, A12 = 0.0000e+000, A14 = 0.0000e+000
7th surface k = 0.0000
A4 = −2.4489e−005, A6 = −9.9069e−008, A8 = −3.5578e−010,
A10 = −1.9169e−012, A12 = 0.0000e+000, A14 = 0.0000e+000
11th surface k = 0.0000
A4 = 6.7356e−006, A6 = −1.6986e−008, A8 = −1.4198e−011,
A10 = 0.0000e+000, A12 = 0.0000e+000, A14 = 0.0000e+000
12th surface k = 0.0000
A4 = −7.1761e−006, A6 = −4.9345e−008, A8 = 0.0000e+000,
A10 = 0.0000e+000, A12 = 0.0000e+000, A14 = 0.0000e+000
14th surface k = 0.0000
A4 = −7.8682e−006, A6 = −1.6447e−008, A8 = 8.3392e−011,
A10 = −6.6610e−013, A12 = 0.0000e+000, A14 = 0.0000e+000
15th surface k = 0.0000
A4 = 1.6823e−005, A6 = −4.5088e−009, A8 = 5.1032e−011,
A10 = −5.4726e−013, A12 = 0.0000e+000, A14 = 0.0000e+000
23th surface k = 0.0000
A4 = −5.6000e−006, A6 = −9.0015e−010, A8 = 0.0000e+000,
A10 = 0.0000e+000, A12 = 0.0000e+000, A14 = 0.0000e+000
24th surface k = 0.0000
A4 = 1.0524e−005, A6 = 1.6467e−010, A8 = −2.3347e−011,
A10 = 0.0000e+000, A12 = 0.0000e+000, A14 = 0.0000e+000
30th surface k = 0.0000
A4 = 1.0800e−005, A6 = −2.4680e−008, A8 = 4.9501e−011,
A10 = 0.0000e+000, A12 = 0.0000e+000, A14 = 0.0000e+000

Zoom data

|  | WE | ST | TE |
|---|---|---|---|
| f | 12.239 | 34.633 | 98.018 |
| FNO. | 2.878 | 3.860 | 4.043 |
| 2ω | 85.7 | 34.0 | 12.2 |
| FB | 15.319 | 15.319 | 15.319 |
| LTL | 129.944 | 143.433 | 174.594 |
| d5 | 0.600 | 19.600 | 49.206 |
| d12 | 36.886 | 12.427 | 1.000 |
| d24 | 2.500 | 12.333 | 25.231 |
| d27 | 7.702 | 16.817 | 16.902 |

Unit mm

Unit focal length f1 = 109.656   f2 = −13.878   f3 = 23.480   f4 = −24.886   f5 = 36.530

Example 9

Unit mm

Surface data

| Surface no. | r | d | nd | νd |
|---|---|---|---|---|
| Object plane | ∞ | ∞ | | |
| 1 | 90.000 | 2.300 | 1.85478 | 24.80 |
| 2 | 65.592 | 7.382 | 1.53775 | 74.70 |
| 3 | 800.000 | 0.150 | | |
| 4 | 63.000 | 5.131 | 1.53775 | 74.70 |
| 5 | 173.762 | Variable | | |
| 6* | 464.875 | 1.500 | 1.88202 | 37.22 |
| 7* | 14.784 | 7.450 | | |
| 8 | −20.119 | 1.200 | 1.61800 | 63.40 |
| 9 | 35.728 | 5.000 | 2.00069 | 25.46 |
| 10 | −33.690 | 1.914 | | |
| 11 | −19.739 | 1.300 | 1.88202 | 37.22 |
| 12 | −42.267 | Variable | | |
| 13(Stop) | ∞ | 1.500 | | |
| 14* | 23.000 | 5.000 | 1.58313 | 59.38 |
| 15* | −262.448 | 3.259 | | |
| 16 | 48.000 | 3.715 | 1.53775 | 74.70 |
| 17 | −44.500 | 0.400 | | |
| 18 | 85.095 | 1.000 | 1.91082 | 35.25 |
| 19 | 15.097 | 3.279 | 1.48749 | 70.23 |
| 20 | 45.596 | 1.200 | | |
| 21 | 23.870 | 0.800 | 1.85478 | 24.80 |
| 22 | 17.905 | 5.079 | 1.58313 | 59.38 |
| 23* | −53.454 | Variable | | |
| 24 | 155.034 | 0.900 | 1.83481 | 42.73 |
| 25 | 10.571 | 3.278 | 1.80809 | 22.76 |
| 26 | 17.967 | Variable | | |
| 27* | 59.278 | 9.078 | 1.49700 | 81.54 |
| 28 | −17.171 | 1.300 | 2.00100 | 29.13 |
| 29 | −22.118 | Variable | | |
| Image plane | ∞ | | | |

Aspherical Surface data

6th surface k = 0.0000
A4 = −5.5689e−006, A6 = 1.3408e−007, A8 = −4.4733e−010,
A10 = 7.1015e−013, A12 = 0.0000e+000, A14 = 0.0000e+000

7th surface k = 0.0000
A4 = −3.7000e−005, A6 = 6.4243e−008, A8 = 1.0000e−011,
A10 = 2.2609e−012, A12 = 0.0000e+000, A14 = 0.0000e+000

14th surface k = 0.0000
A4 = −5.3982e−006, A6 = −2.4500e−008, A8 = 2.2000e−011,
A10 = −3.0015e−014, A12 = 0.0000e+000, A14 = 0.0000e+000

15th surface k = 0.0000
A4 = 2.4015e−005, A6 = −2.9581e−008, A8 = 2.3042e−011,
A10 = 0.0000e+000, A12 = 0.0000e+000, A14 = 0.0000e+000

23th surface k = 0.0000
A4 = 9.6902e−006, A6 = 1.3598e−008, A8 = −1.8927e−012,
A10 = 3.3501e−013, A12 = 0.0000e+000, A14 = 0.0000e+000

27th surface k = 0.0000
A4 = −3.7000e−006, A6 = 3.8872e−008, A8 = −3.7481e−011,
A10 = 0.0000e+000, A12 = 0.0000e+000, A14 = 0.0000e+000

Zoom data

| | WE | ST | TE |
|---|---|---|---|
| f | 12.438 | 34.965 | 98.119 |
| FNO. | 4.144 | 4.128 | 4.147 |
| 2ω | 81.2 | 33.4 | 12.1 |
| FB | 17.012 | 18.052 | 19.805 |
| LTL | 132.5397 | 148.437 | 176.3413 |
| d5 | 0.600 | 22.300 | 51.610 |
| d12 | 34.928 | 12.189 | 1.321 |
| d23 | 2.400 | 9.868 | 17.863 |
| d26 | 4.485 | 12.915 | 12.627 |
| d29 | 17.012 | 18.052 | 19.805 |

Unit focal length f1 = 105.827   f2 = −13.288   f3 = 22.460   f4 = −23.946   f5 = 41.573

Example 10

Unit mm

Surface data

| Surface no. | r | d | nd | νd |
|---|---|---|---|---|
| Object plane | ∞ | ∞ | | |
| 1 | 90.000 | 2.300 | 1.85478 | 24.80 |
| 2 | 65.592 | 7.382 | 1.53775 | 74.70 |
| 3 | 800.000 | 0.150 | | |
| 4 | 63.000 | 5.131 | 1.53775 | 74.70 |
| 5 | 173.762 | Variable | | |
| 6* | 464.875 | 1.500 | 1.88202 | 37.22 |
| 7* | 14.784 | 7.450 | | |
| 8 | −20.119 | 1.200 | 1.59282 | 68.63 |
| 9 | 35.728 | 5.000 | 2.00100 | 29.13 |
| 10 | −33.690 | 1.914 | | |
| 11 | −19.739 | 1.300 | 1.88300 | 40.76 |
| 12 | −42.267 | Variable | | |
| 13(Stop) | ∞ | 1.500 | | |
| 14* | 23.000 | 5.000 | 1.58313 | 59.38 |
| 15* | −262.448 | 3.259 | | |
| 16 | 48.000 | 3.715 | 1.53996 | 59.46 |
| 17 | −44.500 | 0.400 | | |
| 18 | 85.095 | 1.000 | 1.91082 | 35.25 |
| 19 | 15.097 | 3.279 | 1.48749 | 70.23 |
| 20 | 45.596 | 1.200 | | |
| 21 | 23.870 | 0.800 | 1.85478 | 24.80 |
| 22 | 17.905 | 5.079 | 1.58313 | 59.38 |
| 23* | −53.454 | Variable | | |
| 24 | 155.034 | 0.900 | 1.83481 | 42.73 |
| 25 | 10.571 | 3.278 | 1.80518 | 25.42 |
| 26 | 17.967 | Variable | | |
| 27* | 59.278 | 9.078 | 1.49700 | 81.54 |
| 28 | −17.171 | 1.300 | 1.95375 | 32.32 |
| 29 | −22.118 | Variable | | |
| Image plane | ∞ | | | |

Aspherical surface data

6th surface k = 0.0000
A4 = −5.5689e−006, A6 = 1.3408e−007, A8 = −4.4733e−010,
A10 = 7.8000e−013, A12 = 0.0000e+000, A14 = 0.0000e+000

-continued

| Unit mm | | | | |
|---|---|---|---|---|

7th surface k = 0.0000
A4 = −3.7000e−005, A6 = 6.4243e−008, A8 = 1.0000e−011,
A10 = 2.2609e−012, A12 = 0.0000e+000, A14 = 0.0000e+000
14th surface k = 0.0000
A4 = −5.6000e−006, A6 = −2.4500e−008, A8 = 2.2000e−011,
A10 = −3.0015e−014, A12 = 0.0000e+000, A14 = 0.0000e+000
15th surface k = 0.0000
A4 = 2.4015e−005, A6 = −2.9581e−008, A8 = 2.3042e−011,
A10 = 0.0000e+000, A12 = 0.0000e+000, A14 = 0.0000e+000
23th surface k = 0.0000
A4 = 9.6902e−006, A6 = 1.3598e−008, A8 = −1.8927e−012,
A10 = 3.3501e−013, A12 = 0.0000e+000, A14 = 0.0000e+000
27th surface k = 0.0000
A4 = −1.0000e−005, A6 = 3.8872e−008, A8 = −3.7481e−011,
A10 = 0.0000e+000, A12 = 0.0000e+000, A14 = 0.0000e+000

Zoom data

| | WE | ST | TE |
|---|---|---|---|
| f | 12.584 | 34.890 | 95.501 |
| FNO. | 4.100 | 4.100 | 4.100 |
| 2ω | 79.4 | 33.0 | 12.3 |
| FB | 16.276 | 15.467 | 13.660 |
| LTL | 131.804 | 145.853 | 170.1962 |
| d5 | 0.600 | 22.300 | 51.610 |
| d12 | 34.928 | 12.189 | 1.321 |
| d23 | 2.400 | 9.868 | 17.863 |
| d26 | 4.485 | 12.915 | 12.627 |
| d29 | 16.276 | 15.467 | 13.660 |

Unit focal length f1 = 105.827   f2 = −13.813   f3 = 22.426   f4 = −23.868   f5 = 40.734

Example 11

| Unit mm | | | | |
|---|---|---|---|---|
| Surface data | | | | |
| Surface no. | r | d | nd | vd |
| Object plane | ∞ | ∞ | | |
| 1 | 79.408 | 2.000 | 1.85478 | 24.80 |
| 2 | 59.668 | 5.539 | 1.49700 | 81.61 |
| 3 | 235.475 | 0.150 | | |
| 4 | 53.577 | 4.446 | 1.49700 | 81.61 |
| 5 | 233.265 | Variable | | |
| 6* | 198.906 | 1.800 | 1.80610 | 40.92 |
| 7* | 14.495 | 11.300 | | |
| 8 | −22.422 | 1.200 | 1.49700 | 81.61 |
| 9 | 369.232 | 4.042 | 1.85478 | 24.80 |
| 10 | −33.522 | 0.470 | | |
| 11* | −30.265 | 1.200 | 1.80610 | 40.92 |
| 12* | −52.305 | Variable | | |
| 13(Stop) | ∞ | 1.500 | | |
| 14* | 24.819 | 6.000 | 1.58313 | 59.38 |
| 15* | −59.945 | 0.966 | | |
| 16 | 45.695 | 6.394 | 1.54814 | 45.79 |
| 17 | −29.322 | 1.000 | 1.83481 | 42.73 |
| 18 | −40.872 | 0.512 | | |
| 19 | −430.143 | 1.000 | 1.90366 | 31.32 |
| 20 | 16.022 | 8.019 | 1.49700 | 81.61 |
| 21 | −29.237 | Variable | | |
| 22 | 76.020 | 1.000 | 1.88300 | 40.80 |
| 23 | 11.751 | 1.960 | 1.89286 | 20.36 |
| 24 | 15.630 | Variable | | |
| 25 | −70.763 | 1.000 | 1.83481 | 42.73 |
| 26 | 110.058 | 0.300 | | |
| 27* | 33.654 | 7.739 | 1.49700 | 81.61 |
| 28* | −20.834 | Variable | | |
| Image plane | ∞ | | | |

Aspherical surface data

6th surface k = 0.0000
A4 = −8.6297e−006, A6 = 2.5958e−008, A8 = −2.1256e−011,
A10 = 0.0000e+000, A12 = 0.0000e+000, A14 = 0.0000e+000
7th surface k = 0.0000
A4 = −2.0264e−005, A6 = −9.4477e−008, A8 = 2.9605e−010,
A10 = −2.2803e−012, A12 = 0.0000e+000, A14 = 0.0000e+000
11th surface k = 0.0000
A4 = 7.7031e−006, A6 = −6.1316e−008, A8 = 2.1189e−012,
A10 = 0.0000e+000, A12 = 0.0000e+000, A14 = 0.0000e+000
12th surface k = 0.0000
A4 = 6.7012e−007, A6 = −5.7023e−008, A8 = 0.0000e+000,
A10 = 0.0000e+000, A12 = 0.0000e+000, A14 = 0.0000e+000
14th surface k = 0.0000
A4 = −8.1238e−006, A6 = 2.4677e−008, A8 = −3.5824e−011,
A10 = 5.0000e−014, A12 = 0.0000e+000, A14 = 0.0000e+000
15th surface k = 0.0000
A4 = 2.1718e−005, A6 = 1.7140e−008, A8 = 0.0000e+000,
A10 = 0.0000e+000, A12 = 0.0000e+000, A14 = 0.0000e+000
27th surface k = 0.0000
A4 = −2.1241e−005, A6 = 1.3862e−008, A8 = 0.0000e+000,
A10 = 0.0000e+000, A12 = 0.0000e+000, A14 = 0.0000e+000
28th surface k = 0.0000
A4 = 5.1554e−006, A6 = −2.0026e−008, A8 = 3.4886e−011,
A10 = 0.0000e+000, A12 = 0.0000e+000, A14 = 0.0000e+000

Zoom data

| | WE | ST | TE |
|---|---|---|---|
| f | 12.241 | 34.633 | 98.028 |
| FNO. | 4.080 | 4.080 | 4.080 |
| 2ω | 85.6 | 34.1 | 12.1 |
| FB | 18.479 | 15.332 | 15.660 |
| LTL | 160.398 | 160.398 | 160.398 |
| d5 | 0.600 | 20.300 | 36.609 |
| d12 | 63.803 | 28.711 | 1.000 |
| d21 | 2.500 | 6.739 | 21.329 |
| d24 | 5.478 | 19.778 | 16.262 |
| d28 | 18.479 | 15.332 | 15.660 |

Unit focal length f1 = 102.083   f2 = −17.283   f3 = 24.786   f4 = −22.943   f5 = 49.460

Example 12

| Unit mm | | | | |
|---|---|---|---|---|
| Surface data | | | | |
| Surface no. | r | d | nd | vd |
| Object plane | ∞ | ∞ | | |
| 1 | 73.887 | 2.000 | 1.85478 | 24.80 |
| 2 | 56.556 | 5.991 | 1.49700 | 81.61 |
| 3 | 323.743 | 0.150 | | |
| 4 | 57.323 | 3.990 | 1.49700 | 81.61 |
| 5 | 192.585 | Variable | | |
| 6 | 199.559 | 1.800 | 1.88300 | 40.76 |
| 7 | 15.042 | 8.440 | | |
| 8* | −43.065 | 1.200 | 1.49700 | 81.61 |
| 9 | 254.272 | 7.448 | 1.85478 | 24.80 |
| 10 | −25.917 | 1.346 | | |
| 11* | −19.230 | 1.200 | 1.80610 | 40.92 |
| 12* | −54.478 | Variable | | |
| 13(Stop) | ∞ | Variable | | |
| 14* | 23.015 | 6.183 | 1.58313 | 59.38 |
| 15* | −70.285 | 0.481 | | |
| 16 | 74.535 | 5.214 | 1.57099 | 50.80 |
| 17 | −37.787 | 1.000 | 1.83481 | 42.73 |
| 18 | −41.275 | 0.501 | | |
| 19 | 4240.886 | 1.000 | 1.90366 | 31.32 |
| 20 | 16.865 | 8.185 | 1.49700 | 81.61 |
| 21 | −27.974 | Variable | | |
| 22 | 941.015 | 1.000 | 1.88300 | 40.80 |
| 23 | 12.413 | 3.212 | 1.89286 | 20.36 |
| 24 | 18.593 | Variable | | |
| 25 | 76.706 | 1.000 | 1.83481 | 42.73 |
| 26 | 34.645 | 0.300 | | |
| 27 | 27.574 | 6.203 | 1.49700 | 81.61 |
| 28 | −34.758 | 21.100 | | |
| Image plane | ∞ | | | |

Aspherical Surface data

8th surface k = 5.4219
A4 = 2.8880e−005, A6 = −9.5092e−008, A8 = −3.1381e−010,
A10 = 0.0000e+000, A12 = 0.0000e+000, A14 = 0.0000e+000
11th surface k = −0.5456
A4 = 2.2461e−005, A6 = 1.4225e−007, A8 = −1.9185e−010,
A10 = 0.0000e+000, A12 = 0.0000e+000, A14 = 0.0000e+000
12th surface k = −9.0527
A4 = 1.4885e−005, A6 = 4.7628e−008, A8 = −2.2602e−010,
A10 = 0.0000e+000, A12 = 0.0000e+000, A14 = 0.0000e+000
14th surface k = 0.0000
A4 = −7.8664e−006, A6 = 1.8014e−008, A8 = −2.2097e−011,
A10 = 0.0000e+000, A12 = 0.0000e+000, A14 = 0.0000e+000
15th surface k = 0.0000
A4 = 3.0706e−005, A6 = 1.2196e−008, A8 = 1.0207e−012,
A10 = 0.0000e+000, A12 = 0.0000e+000, A14 = 0.0000e+000

Zoom data

| | WE | ST | TE |
|---|---|---|---|
| f | 12.304 | 34.573 | 98.479 |
| FNO. | 4.100 | 4.100 | 4.100 |
| 2ω | 84.8 | 34.6 | 12.1 |
| FB | 21.100 | 21.100 | 21.100 |
| LTL | 160.998 | 160.998 | 160.998 |
| d5 | 0.598 | 21.445 | 40.743 |
| d12 | 41.332 | 20.494 | 1.188 |
| d13 | 23.807 | 7.983 | 0.913 |
| d21 | 1.880 | 6.012 | 18.198 |
| d24 | 4.438 | 16.122 | 11.014 |

Unit focal length f1 = 102.015  f2 = −17.323  f3 = 23.915  f4 = −21.680  f5 = 52.920

Example 13

| Unit mm | | | | |
|---|---|---|---|---|
| Surface data | | | | |
| Surface no. | r | d | nd | vd |
| Object plane | ∞ | ∞ | | |
| 1 | 84.112 | 2.000 | 1.85478 | 24.80 |
| 2 | 63.072 | 5.787 | 1.49700 | 81.61 |
| 3 | 541.140 | 0.150 | | |
| 4 | 54.160 | 4.372 | 1.49700 | 81.61 |
| 5 | 207.880 | Variable | | |
| 6 | 163.461 | 1.800 | 1.88300 | 40.76 |
| 7 | 16.593 | 9.402 | | |
| 8* | −21.474 | 1.200 | 1.49700 | 81.61 |
| 9* | 137.235 | 0.200 | | |
| 10 | 332001.250 | 5.331 | 1.85478 | 24.80 |
| 11 | −27.704 | 2.869 | | |
| 12 | −18.646 | 1.200 | 1.80610 | 40.92 |
| 13 | −28.723 | Variable | | |
| 14 (Stop) | ∞ | Variable | | |
| 15* | 22.214 | 6.638 | 1.58313 | 59.38 |
| 16* | −66.357 | 0.169 | | |
| 17 | 57.820 | 4.990 | 1.54814 | 45.79 |
| 18 | −47.153 | 1.000 | 1.83481 | 42.73 |
| 19 | −50.946 | 0.217 | | |
| 20 | 749.388 | 1.000 | 1.90366 | 31.32 |
| 21 | 15.820 | 8.703 | 1.49700 | 81.61 |
| 22 | −32.469 | Variable | | |
| 23 | 361.077 | 1.000 | 1.88300 | 40.80 |
| 24 | 12.943 | 3.228 | 1.89286 | 20.36 |
| 25 | 18.839 | Variable | | |
| 26 | 60.646 | 1.000 | 1.83481 | 42.73 |
| 27 | 31.523 | 0.300 | | |
| 28 | 27.131 | 6.124 | 1.49700 | 81.61 |
| 29 | −34.293 | 20.650 | | |
| Image plane | ∞ | | | |

Aspherical surface data

8th surface k = 0.6333
A4 = 1.8614e−005, A6 = −1.2451e−008, A8 = 3.9104e−010,
A10 = 0.0000e+000, A12 = 0.0000e+000, A14 = 0.0000e+000
9th surface k = 3.9864
A4 = −2.0845e−005, A6 = −1.9826e−008, A8 = 1.0492e−011,
A10 = 0.0000e+000, A12 = 0.0000e+000, A14 = 0.0000e+000
15th surface k = 0.0000
A4 = −1.1463e−005, A6 = −3.0389e−009, A8 = 3.3649e−011,
A10 = 0.0000e+000, A12 = 0.0000e+000, A14 = 0.0000e+000
16th surface k = 0.0000
A4 = 2.2780e−005, A6 = −1.3444e−008, A8 = 8.0200e−011,
A10 = 0.0000e+000, A12 = 0.0000e+000, A14 = 0.0000e+000

-continued

Unit mm

Zoom data

|   | WE | ST | TE |
|---|---|---|---|
| f | 12.274 | 34.612 | 98.502 |
| FNO. | 4.040 | 4.046 | 4.056 |
| 2ω | 82.3 | 34.4 | 12.1 |
| FB | 20.650 | 20.650 | 20.650 |
| LTL | 160.548 | 160.548 | 160.548 |
| d5 | 0.667 | 20.688 | 38.892 |
| d13 | 39.423 | 19.402 | 1.198 |
| d14 | 24.907 | 8.784 | 0.916 |
| d22 | 1.946 | 6.280 | 18.564 |
| d25 | 4.275 | 16.064 | 11.648 |

Unit focal length f1 = 96.751  f2 = −17.287  f3 = 24.643  f4 = −22.796  f5 = 50.430

Example 14

Unit mm

Surface data

| Surface no. | r | d | nd | νd |
|---|---|---|---|---|
| Object plane | ∞ | ∞ | | |
| 1 | 87.558 | 2.200 | 1.85478 | 24.80 |
| 2 | 60.691 | 6.423 | 1.49700 | 81.54 |
| 3 | 440.007 | 0.150 | | |
| 4 | 73.906 | 5.103 | 1.65160 | 58.55 |
| 5 | 304.702 | Variable | | |
| 6* | 657.311 | 1.800 | 1.80610 | 40.92 |
| 7* | 15.035 | 9.898 | | |
| 8 | −30.070 | 1.200 | 1.49700 | 81.54 |
| 9 | 26.309 | 5.063 | 1.92119 | 23.96 |
| 10 | −185.120 | 0.995 | | |
| 11 | −54.904 | 1.200 | 2.00069 | 25.46 |
| 12 | −298.087 | Variable | | |
| 13 (Stop) | ∞ | 0.942 | | |
| 14* | 24.194 | 3.775 | 1.58313 | 59.38 |
| 15* | −77.521 | 1.308 | | |
| 16 | 183.306 | 1.000 | 1.88300 | 40.76 |
| 17 | 24.629 | 3.694 | 1.49700 | 81.54 |
| 18 | −54.780 | 1.177 | | |
| 19 | 40.868 | 1.000 | 2.00100 | 29.13 |
| 20 | 24.665 | 5.337 | 1.49700 | 81.54 |
| 21* | −19.586 | Variable | | |
| 22 | −186.897 | 2.495 | 1.75211 | 25.05 |
| 23 | −14.655 | 1.000 | 1.74320 | 49.34 |
| 24* | 14.081 | Variable | | |
| 25 | 30.309 | 7.340 | 1.49700 | 81.54 |
| 26 | −20.357 | 1.400 | 1.92286 | 20.88 |
| 27 | −31.754 | 24.567 | | |
| Image plane | ∞ | | | |

Aspherical surface data

6th surface k = −9.0113
A4 = 1.0190e−005, A6 = −3.4485e−008, A8 = 6.5676e−011,
A10 = −5.5320e−014, A12 = 0.0000e+000, A14 = 0.0000e+000

7th surface k = −0.2292
A4 = 1.0226e−005, A6 = 2.6993e−008, A8 = −3.5447e−010,
A10 = 1.6036e−012, A12 = 0.0000e+000, A14 = 0.0000e+000

-continued

Unit mm

14th surface k = 0.0000
A4 = 4.8386e−006, A6 = 1.6207e−007, A8 = 9.4568e−010,
A10 = 0.0000e+000, A12 = 0.0000e+000, A14 = 0.0000e+000

15th surface k = 0.0000
A4 = 5.7409e−005, A6 = 1.8471e−007, A8 = 1.3158e−009,
A10 = 0.0000e+000, A12 = 0.0000e+000, A14 = 0.0000e+000

21st surface k = 0.0000
A4 = 3.5256e−006, A6 = 3.2055e−009, A8 = 0.0000e+000,
A10 = 0.0000e+000, A12 = 0.0000e+000, A14 = 0.0000e+000

24th surface k = 0.1042
A4 = −3.2305e−005, A6 = −1.0747e−007, A8 = −1.6505e−009,
A10 = 0.0000e+000, A12 = 0.0000e+000, A14 = 0.0000e+000

Zoom data

|   | WE | ST | TE |
|---|---|---|---|
| f | 12.340 | 34.991 | 98.412 |
| FNO. | 4.078 | 4.080 | 4.083 |
| 2ω | 85.2 | 34.0 | 12.0 |
| FB | 24.567 | 24.567 | 24.567 |
| LTL | 167.07 | 138.291 | 165.744 |
| d5 | 0.503 | 15.348 | 52.984 |
| d12 | 55.517 | 11.892 | 1.708 |
| d21 | 1.864 | 10.536 | 14.506 |
| d24 | 20.122 | 11.450 | 7.480 |

Unit focal length f1 = 106.397  f2 = −14.409  f3 = 20.194  f4 = −17.668  f5 = 41.759

Example 15

Unit mm

Surface data

| Surface no. | r | d | nd | νd |
|---|---|---|---|---|
| Object plane | ∞ | ∞ | | |
| 1 | 96.723 | 2.200 | 1.85478 | 24.80 |
| 2 | 65.506 | 6.652 | 1.49700 | 81.54 |
| 3 | 902.604 | 0.150 | | |
| 4 | 78.718 | 4.955 | 1.65160 | 58.55 |
| 5 | 315.968 | Variable | | |
| 6* | 650.849 | 1.800 | 1.80610 | 40.92 |
| 7* | 16.021 | 9.118 | | |
| 8 | −44.184 | 1.200 | 1.49700 | 81.54 |
| 9 | 21.518 | 5.812 | 1.92119 | 23.96 |
| 10 | −626.313 | 0.913 | | |
| 11 | −70.937 | 1.200 | 2.00069 | 25.46 |
| 12 | 164.529 | Variable | | |
| 13 (Stop) | ∞ | 0.978 | | |
| 14* | 24.562 | 3.334 | 1.58313 | 59.38 |
| 15* | −49.960 | 0.769 | | |
| 16 | −91.780 | 1.000 | 1.88300 | 40.76 |
| 17 | 41.364 | 3.116 | 1.49700 | 81.54 |
| 18 | −41.479 | 1.128 | | |
| 19 | 69.211 | 1.000 | 2.00100 | 29.13 |
| 20 | 33.816 | 5.038 | 1.49700 | 81.54 |
| 21* | −17.742 | Variable | | |
| 22 | −387.298 | 2.322 | 1.75211 | 25.05 |
| 23 | −16.503 | 1.000 | 1.74320 | 49.34 |
| 24* | 15.857 | Variable | | |
| 25 | 36.916 | 8.589 | 1.49700 | 81.54 |

-continued

Unit mm

| 26 | −19.371 | 1.400 | 1.92286 | 20.88 |
|---|---|---|---|---|
| 27 | −28.706 | Variable | | |
| Image plane | ∞ | | | |

Aspherical surface data

6th surface k = 0.0000
A4 = 1.3145e−005, A6 = −6.5845e−008, A8 = 1.4733e−010,
A10 = −1.2121e−013, A12 = 0.0000e+000, A14 = 0.0000e+000
7th surface k = 0.0867
A4 = 6.5478e−006, A6 = −2.4918e−008, A8 = −4.0563e−010,
A10 = 2.4500e−013, A12 = 0.0000e+000, A14 = 0.0000e+000
14th surface k = 0.0000
A4 = 9.3433e−007, A6 = 2.6679e−007, A8 = 1.9714e−009,
A10 = 0.0000e+000, A12 = 0.0000e+000, A14 = 0.0000e+000
15th surface k = 0.0000
A4 = 6.5900e−005, A6 = 3.3926e−007, A8 = 2.5984e−009,
A10 = 0.0000e+000, A12 = 0.0000e+000, A14 = 0.0000e+000
21th surface k = 0.0000
A4 = 1.1164e−006, A6 = −2.8877e−008, A8 = 2.0108e−010,
A10 = 0.0000e+000, A12 = 0.0000e+000, A14 = 0.0000e+000
24th surface k = 0.7014
A4 = −3.6840e−005, A6 = −1.7126e−007, A8 = −1.6182e−009,
A10 = 0.0000e+000, A12 = 0.0000e+000, A14 = 0.0000e+000

Zoom data

| | WE | ST | TE |
|---|---|---|---|
| f | 12.394 | 34.614 | 98.395 |
| FNO. | 4.080 | 4.080 | 4.080 |
| 2ω | 84.4 | 34.1 | 12.0 |
| FB | 27.235 | 26.770 | 21.664 |
| LTL | 167.133 | 140.320 | 168.432 |
| d5 | 0.600 | 15.330 | 54.232 |
| d12 | 54.446 | 12.902 | 2.101 |
| d21 | 1.804 | 11.287 | 17.737 |
| d24 | 19.374 | 10.356 | 9.012 |
| d27 | 27.235 | 26.770 | 21.664 |

Unit focal length f1 = 110.903  f2 = −15.008  f3 = 20.731  f4 = −20.649  f5 = 43.476

Aberration diagrams of each example will be described below. Each aberration diagram is an aberration diagram when focused to an object at infinity. In each aberration diagram, FIY denotes the maximum image height.

FIG. 16A, FIG. 17A, FIG. 18A, FIG. 19A, FIG. 20A, FIG. 21A, FIG. 22A, FIG. 23A, FIG. 24A, FIG. 25A, FIG. 26A, FIG. 27A, FIG. 28A, FIG. 29A, and FIG. 30A show a spherical aberration (SA) at the wide angle end.

FIG. 16B, FIG. 17B, FIG. 18B, FIG. 19B, FIG. 20B, FIG. 21B, FIG. 22B, FIG. 23B, FIG. 24B, FIG. 25S, FIG. 26B, FIG. 27B, FIG. 28B, FIG. 29B, and FIG. 30B show an astigmatism (AS) at the wide angle end.

FIG. 16C, FIG. 17C, FIG. 18C, FIG. 19C, FIG. 20C, FIG. 21C, FIG. 22C, FIG. 23C, FIG. 24C, FIG. 25C, FIG. 26C, FIG. 27C, FIG. 28C, FIG. 29C, and FIG. 30C show a distortion (DT) at the wide angle end.

FIG. 16D, FIG. 17D, FIG. 18D, FIG. 19D, FIG. 20D, FIG. 21D, FIG. 22D, FIG. 23D, FIG. 24D, FIG. 25D, FIG. 26D, FIG. 27D, FIG. 28D, FIG. 29D, and FIG. 30D show a chromatic aberration of magnification (CC) at the wide angle end.

FIG. 16E, FIG. 17E, FIG. 18E, FIG. 19E, FIG. 20E, FIG. 21E, FIG. 22E, FIG. 23E, FIG. 24E, FIG. 25E, FIG. 26E, FIG. 27E, FIG. 28E, FIG. 29E, and FIG. 30E show a spherical aberration (SA) in the intermediate focal length state.

FIG. 16F, FIG. 17F, FIG. 18F, FIG. 19F, FIG. 20F, FIG. 21F, FIG. 22F, FIG. 23F, FIG. 24F, FIG. 25F, FIG. 26F, FIG. 27F, FIG. 28F, FIG. 29F, and FIG. 30F show an astigmatism (AS) in the intermediate focal length state.

FIG. 16G, FIG. 17G, FIG. 18G, FIG. 19G, FIG. 20G, FIG. 21G, FIG. 22G, FIG. 23G, FIG. 24G, FIG. 25G, FIG. 26G, FIG. 27G, FIG. 28G, FIG. 29G, and FIG. 30O show a distortion (DT) in the intermediate focal length state.

FIG. 16H, FIG. 17H, FIG. 18H, FIG. 19H, FIG. 20H, FIG. 21H, FIG. 22H, FIG. 23H, FIG. 24H, FIG. 25H, FIG. 26H, FIG. 27H, FIG. 28H, FIG. 29H, and FIG. 30H show a chromatic aberration of magnification (CC) in the intermediate focal length state.

FIG. 16I, FIG. 17I, FIG. 18I, FIG. 19I, FIG. 20I, FIG. 21I, FIG. 22I, FIG. 23I, FIG. 24I, FIG. 25I, FIG. 26I, FIG. 27I, FIG. 28I, FIG. 29I, and FIG. 30I show a spherical aberration (SA) at the telephoto end.

FIG. 16J, FIG. 17J, FIG. 18J, FIG. 19J, FIG. 20J, FIG. 21J, FIG. 22J, FIG. 23J, FIG. 24J, FIG. 25J, FIG. 26J, FIG. 27J, FIG. 28J, FIG. 29J, and FIG. 30J show an astigmatism (AS) at the telephoto end.

FIG. 16K, FIG. 17K, FIG. 18K, FIG. 19K, FIG. 20K, FIG. 21K, FIG. 22K, FIG. 23K, FIG. 24K, FIG. 25K, FIG. 26K, FIG. 27K, FIG. 28K, FIG. 29K, and FIG. 30K show a distortion (DT) at the telephoto end.

FIG. 16L, FIG. 17L, FIG. 18L, FIG. 19L, FIG. 20L, FIG. 21L, FIG. 22L, FIG. 23L, FIG. 24L, FIG. 25L, FIG. 26L, FIG. 27L, FIG. 28L, FIG. 29L, and FIG. 30L show a chromatic aberration of magnification (CC) at the telephoto end.

Next, the values of conditional expressions (1) to (26) in each example are shown below.

| Conditional expression | Example 1 | Example 2 | Example 3 |
|---|---|---|---|
| (1) $Tp_{2G\_min\_p}$ | 0.01038 | 0.01038 | 0.01038 |
| (2) $vd_{1G\_max\_p}$ | 81.61 | 81.61 | 81.54 |
| (3) $nd_{2G\_max\_p}$ | 1.8548 | 1.8548 | 1.8548 |
| (4) $|f_2/f_3|$ | 0.57 | 0.65 | 0.58 |
| (5) $f_1/f_3$ | 4.39 | 4.71 | 3.76 |
| (6) $|\Phi_{max}/f_2|$ | 2.08 | 1.84 | 1.71 |
| (7) $vd_{2G\_max\_n}$ | 81.61 | 81.61 | 81.54 |
| (8) $vd_{3G\_max\_p}$ | 81.61 | 81.61 | 81.54 |
| (9) $vd_{4G\_max\_n} - vd_{4G\_min\_p}$ | 33.96 | 27.47 | 18.16 |
| (10) $vd_{5G\_min\_p}$ | 81.61 | 81.61 | 67.02 |
| (11) $Tp_{2G\_max\_n}$ | 0.027876 | 0.027876 | 0.027876 |
| (12) $nd_{2G\_max\_n}$ | 1.74320 | 1.80400 | 1.88300 |
| (13) $Tp_{3G\_max\_p}$ | 0.027876 | 0.027876 | 0.027876 |
| (14) $LTL_t/f_t$ | 1.62 | 1.58 | 1.7 |
| (15) $LTL_w/f_t$ | 1.04 | 1.12 | 1.34 |
| (16) $f_1/f_t$ | 0.9 | 0.97 | 0.94 |
| (17) $Tp_{1G\_max\_p}$ | 0.027876 | 0.027876 | 0.027876 |
| (18) $nd_{2G\_n1}$ | 1.7432 | 1.804 | 1.883 |
| (19) $vd_{G3\_IS\_p} - vd_{G3\_IS\_n}$ | — | — | 53.75 |
| (20) $vd_{G2\_min\_p}$ | 24.7985 | 24.7985 | 24.7985 |
| (21) $f_t/exp_t$ | −0.170 | −0.434 | −0.487 |
| (22) $|f_1/f_2|$ | 7.676 | 7.236 | 6.512 |
| (23) $|f_3/f_4|$ | 0.355 | 0.711 | 0.813 |
| (24) $|f_4/f_5|$ | 1.028 | 0.693 | 0.649 |
| (25) $f_t/f_w$ | 7.922 | 8.003 | 8.006 |
| (26) $Fno_t$ | 4.07166 | 4.0525 | 4.07439 |

| Conditional expression | Example 4 | Example 5 | Example 6 |
|---|---|---|---|
| (1) $Tp_{2G\_min\_p}$ | 0.012736 | 0.011736 | 0.01038 |
| (2) $vd_{1G\_max\_p}$ | 81.54 | 81.54 | 81.61 |
| (3) $nd_{2G\_max\_p}$ | 2.0007 | 1.9108 | 1.8548 |
| (4) $|f_2/f_3|$ | 0.60 | 0.64 | 0.61 |
| (5) $f_1/f_3$ | 4.67 | 4.64 | 4.53 |
| (6) $|\Phi_{max}/f_2|$ | 1.81 | 1.71 | 1.7 |
| (7) $vd_{2G\_max\_n}$ | 63.4 | 81.54 | 81.61 |
| (8) $vd_{3G\_max\_p}$ | 81.54 | 81.54 | 81.61 |
| (9) $vd_{4G\_max\_n} - vd_{4G\_min\_p}$ | 19.97 | 19.22 | 20.44 |
| (10) $vd_{5G\_min\_p}$ | 81.54 | 81.54 | 81.61 |
| (11) $Tp_{2G\_max\_n}$ | 4.00E−05 | 0.027876 | 0.027876 |
| (12) $nd_{2G\_max\_n}$ | 1.88300 | 1.88300 | 1.74320 |
| (13) $Tp_{3G\_max\_p}$ | 0.027876 | 0.027876 | 0.027876 |
| (14) $LTL_t/f_t$ | 1.76 | 1.69 | 1.7 |
| (15) $LTL_w/f_t$ | 1.34 | 1.34 | 1.31 |
| (16) $f_1/f_t$ | 1.06 | 1.03 | 1.07 |
| (17) $Tp_{1G\_max\_p}$ | 0.027876 | 0.027876 | 0.027876 |
| (18) $nd_{2G\_n1}$ | 1.88202 | 1.883 | 1.7432 |
| (19) $vd_{G3\_IS\_p} - vd_{G3\_IS\_n}$ | 34.58 | 34.58 | 22.37 |
| (20) $vd_{G2\_min\_p}$ | 25.46 | 28.46 | 24.7985 |
| (21) $f_t/exp_t$ | −0.491 | −0.672 | −0.214 |
| (22) $|f_1/f_2|$ | 7.847 | 7.201 | 7.411 |
| (23) $|f_3/f_4|$ | 0.931 | 0.948 | 0.936 |
| (24) $|f_4/f_5|$ | 0.576 | 0.559 | 0.634 |
| (25) $f_t/f_w$ | 8.001 | 8.218 | 8.009 |
| (26) $Fno_t$ | 4.08 | 4.08 | 4.07846 |

| Conditional expression | Example 7 | Example 8 | Example 9 |
|---|---|---|---|
| (1) $Tp_{2G\_min\_p}$ | 0.012736 | 0.01038 | 0.012736 |
| (2) $vd_{1G\_max\_p}$ | 81.54 | 81.61 | 74.7 |
| (3) $nd_{2G\_max\_p}$ | 2.0007 | 1.8548 | 2.00069 |
| (4) $|f_2/f_3|$ | 0.62 | 0.59 | 0.59 |
| (5) $f_1/f_3$ | 4.22 | 4.67 | 4.711 |
| (6) $|\Phi_{max}/f_2|$ | 1.38 | 1.75 | 1.78 |
| (7) $vd_{2G\_max\_n}$ | 63.4 | 81.61 | 63.4 |
| (8) $vd_{3G\_max\_p}$ | 81.54 | 81.61 | 74.7 |
| (9) $vd_{4G\_max\_n} - vd_{4G\_min\_p}$ | 19.97 | 20.44 | 19.97 |
| (10) $vd_{5G\_min\_p}$ | 81.54 | 81.61 | 81.54 |
| (11) $Tp_{2G\_max\_n}$ | 4.00E−05 | 0.027876 | 4.00E−05 |
| (12) $nd_{2G\_max\_n}$ | 1.88300 | 1.74320 | 1.88202 |
| (13) $Tp_{3G\_max\_p}$ | 0.027876 | 0.027876 | 0.01722 |
| (14) $LTL_t/f_t$ | 2.02 | 1.78 | 1.792 |
| (15) $LTL_w/f_t$ | 1.66 | 1.33 | 1.35 |
| (16) $f_1/f_t$ | 1.21 | 1.12 | 1.0785 |
| (17) $Tp_{1G\_max\_p}$ | 0.027876 | 0.027876 | 0.01722 |
| (18) $nd_{2G\_n1}$ | 1.88202 | 1.7432 | 1.88202 |
| (19) $vd_{G3\_IS\_p} - vd_{G3\_IS\_n}$ | 22.37 | 53.82 | 34.58 |
| (20) $vd_{G2\_min\_p}$ | 25.46 | 24.7985 | 25.46 |
| (21) $f_t/exp_t$ | −0.162 | −0.016 | 0.4843 |
| (22) $|f_1/f_2|$ | 6.815 | 7.902 | 7.964 |
| (23) $|f_3/f_4|$ | 0.965 | 0.943 | 0.938 |
| (24) $|f_4/f_5|$ | 0.613 | 0.681 | 0.576 |
| (25) $f_t/f_w$ | 6.411 | 8.009 | 7.889 |
| (26) $Fno_t$ | 4.08 | 4.04297 | 4.147 |

| Conditional expression | Example 10 | Example 11 | Example 12 |
|---|---|---|---|
| (1) $Tp_{2G\_min\_p}$ | 0.00451 | 0.01038 | 0.01038 |
| (2) $vd_{1G\_max\_p}$ | 74.7 | 81.61 | 81.61 |
| (3) $nd_{2G\_max\_p}$ | 2.001 | 1.8548 | 1.8548 |
| (4) $|f_2/f_3|$ | 0.62 | 0.70 | 0.72 |
| (5) $f_1/f_3$ | 4.7188 | 4.12 | 4.27 |
| (6) $|\Phi_{max}/f_2|$ | 1.686 | 1.39 | 1.39 |
| (7) $vd_{2G\_max\_n}$ | 68.63 | 81.61 | 81.61 |
| (8) $vd_{3G\_max\_p}$ | 70.23 | 81.61 | 81.61 |
| (9) $vd_{4G\_max\_n} - vd_{4G\_min\_p}$ | 17.31 | 20.44 | 20.44 |
| (10) $vd_{5G\_min\_p}$ | 81.54 | 81.61 | 81.61 |
| (11) $Tp_{2G\_max\_n}$ | 0.01241 | 0.027876 | 0.027876 |
| (12) $nd_{2G\_max\_n}$ | 1.883 | 1.80610 | 1.88300 |
| (13) $Tp_{3G\_max\_p}$ | 0.00087 | 0.027876 | 0.027876 |
| (14) $LTL_t/f_t$ | 1.782 | 1.64 | 1.63 |
| (15) $LTL_w/f_t$ | 1.38 | 1.64 | 1.63 |
| (16) $f_1/f_t$ | 1.108 | 1.04 | 1.04 |
| (17) $Tp_{1G\_max\_p}$ | 0.01722 | 0.027876 | 0.027876 |
| (18) $nd_{2G\_n1}$ | 1.88202 | 1.8061 | 1.883 |
| (19) $vd_{G3\_IS\_p} - vd_{G3\_IS\_n}$ | 34.58 | 50.29 | 50.29 |
| (20) $vd_{G2\_min\_p}$ | 29.13 | 24.7985 | 24.7985 |
| (21) $f_t/exp_t$ | 0.4479 | −0.523 | −1.141 |
| (22) $|f_1/f_2|$ | 7.661 | 5.906 | 5.889 |
| (23) $|f_3/f_4|$ | 0.940 | 1.080 | 1.103 |
| (24) $|f_4/f_5|$ | 0.586 | 0.464 | 0.410 |
| (25) $f_t/f_w$ | 7.589 | 8.008 | 8.004 |
| (26) $Fno_t$ | 4.1 | 4.08 | 4.1 |

| Conditional expression | Example 13 | Example 14 | Example 15 |
|---|---|---|---|
| (1) $Tp_{2G\_min\_p}$ | 0.01038 | 0.017036 | 0.017036 |
| (2) $vd_{1G\_max\_p}$ | 81.61 | 81.54 | 81.54 |
| (3) $nd_{2G\_max\_p}$ | 1.8548 | 1.9212 | 1.9212 |
| (4) $|f_2/f_3|$ | 0.70 | 0.71 | 0.72 |
| (5) $f_1/f_3$ | 3.93 | 5.27 | 5.35 |
| (6) $|\Phi_{max}/f_2|$ | 1.4 | 1.67 | 1.61 |
| (7) $vd_{2G\_max\_n}$ | 81.61 | 81.54 | 81.54 |
| (8) $vd_{3G\_max\_p}$ | 81.61 | 81.54 | 81.54 |
| (9) $vd_{4G\_max\_n} - vd_{4G\_min\_p}$ | 20.44 | 24.29 | 24.29 |
| (10) $vd_{5G\_min\_p}$ | 81.61 | 81.54 | 81.54 |
| (11) $Tp_{2G\_max\_n}$ | 0.027876 | 0.027876 | 0.027876 |
| (12) $nd_{2G\_max\_n}$ | 1.88300 | 2.00069 | 2.00069 |
| (13) $Tp_{3G\_max\_p}$ | 0.027876 | 0.027876 | 0.027876 |
| (14) $LTL_t/f_t$ | 1.63 | 1.68 | 1.71 |
| (15) $LTL_w/f_t$ | 1.63 | 1.7 | 1.7 |
| (16) $f_1/f_t$ | 0.98 | 1.08 | 1.13 |
| (17) $Tp_{1G\_max\_p}$ | 0.027876 | 0.027876 | 0.027876 |
| (18) $nd_{2G\_n1}$ | 1.883 | 2.00069 | 2.00069 |
| (19) $vd_{G3\_IS\_p} - vd_{G3\_IS\_n}$ | 50.29 | 52.41 | 52.41 |
| (20) $vd_{G2\_min\_p}$ | 24.7985 | 23.9557 | 23.9557 |
| (21) $f_t/exp_t$ | −1.046 | −1.310 | −1.100 |
| (22) $|f_1/f_2|$ | 5.597 | 7384 | 7.389 |
| (23) $|f_3/f_4|$ | 1.081 | 1143 | 1.004 |
| (24) $|f_4/f_5|$ | 0.452 | 0423 | 0.475 |
| (25) $f_t/f_w$ | 8.025 | 7.975 | 7.941 |
| (26) $Fno_t$ | 4.05609 | 4.08319 | 4.0804 |

Figure 31:
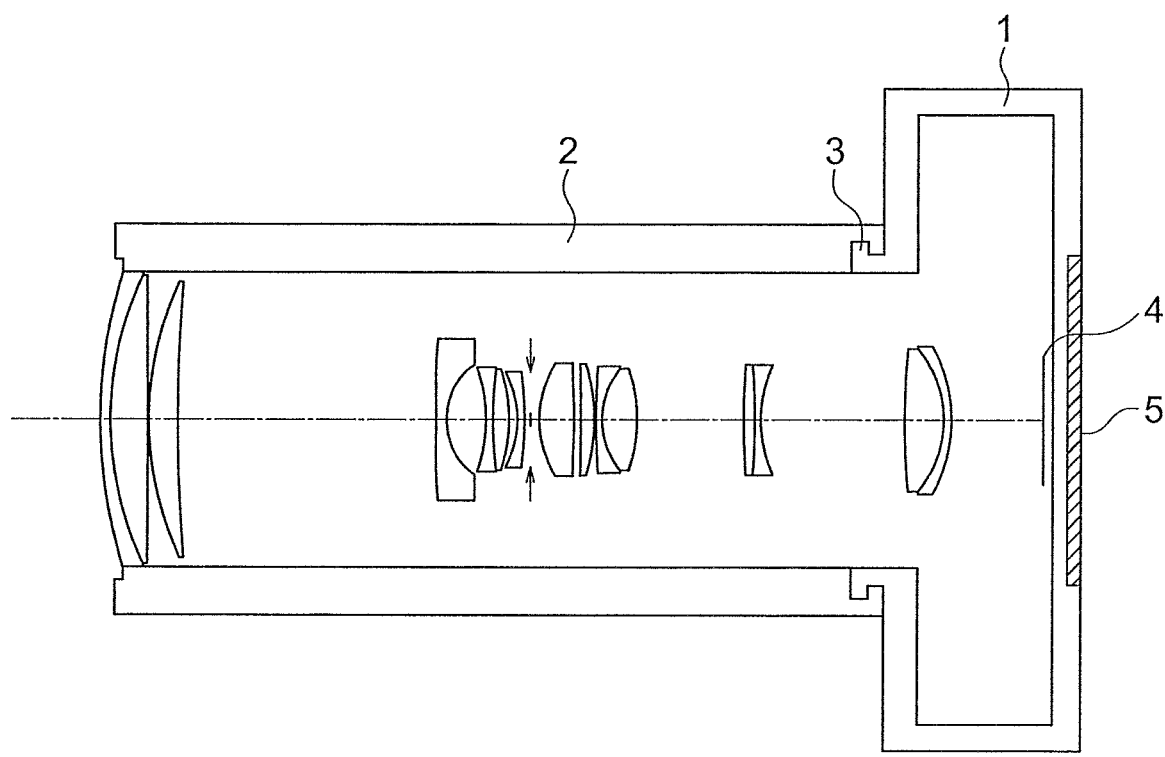
FIG. 31 is a cross-sectional view of an image pickup apparatus.

FIG. 31 is a cross-sectional view of a single-lens mirrorless camera as an electronic image pickup apparatus. In FIG. 31, a photographic optical system 2 is disposed inside a lens barrel of a single-lens mirrorless camera 1. A mount portion 3 enables the photographic optical system 2 to be detachable from a body of the single-lens mirrorless camera 1. As the mount portion 3, a mount such as a screw-type mount and a bayonet-type mount is to be used. In this example, a bayonet-type mount is used. Moreover, an image pickup element surface 4 and a back monitor 5 are disposed in the body of the single-lens mirrorless camera 1. As an image pickup element, an element such as a small-size CCD (charge coupled device) or a CMOS (complementary metal-oxide semiconductor) is to be used.

Moreover, as the photographic optical system 2 of the single-lens mirrorless camera 1, the zoom lens described in any one of the examples from the first example to the fifteenth example is to be used.

Figure 32:
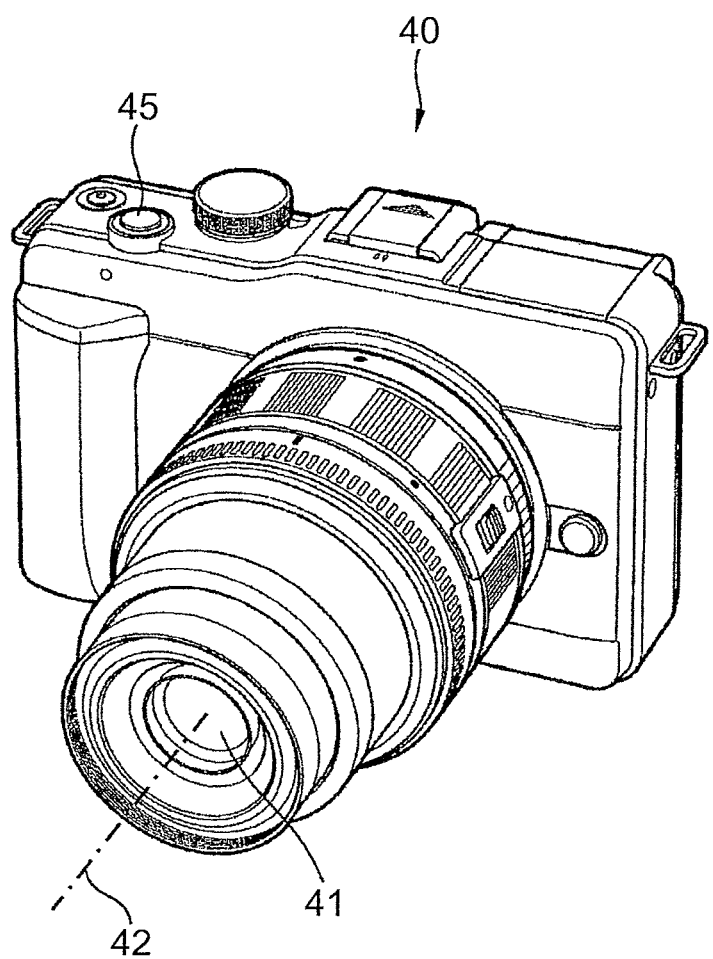
FIG. 32 is a front perspective view showing an appearance of the image pickup apparatus.
Figure 33:
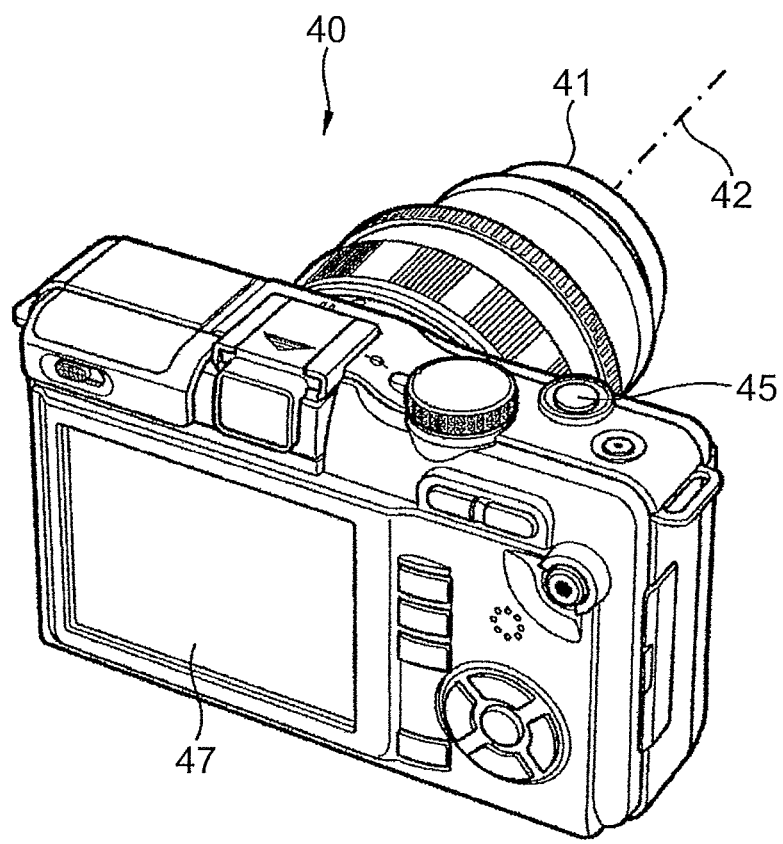
FIG. 33 is a rear perspective view of the image pickup apparatus.

FIG. 32 and FIG. 33 are conceptual diagrams of an arrangement of the image pickup apparatus having the zoom lenses shown in examples from the first example to the fifteenth example. FIG. 32 is a front perspective view showing an appearance of a digital camera 40 as the image pickup apparatus, and FIG. 33 is a rear perspective view of the digital camera 40. The zoom lens according to the present example is used in a photographic optical system 41 of the digital camera 40.

The digital camera 40 according to the present embodiment includes the photographic optical system 41 which is positioned in a photographic optical path 42, a shutter button 45, and a liquid-crystal display monitor 47. As the shutter button 45 disposed on an upper portion of the digital camera 40 is pressed, in conjunction with the pressing of the shutter button 45, photography is carried out by the photographic optical system 41 such as the zoom lens according to the first example. An object image which is formed by the photographic optical system 41 is formed on an image pickup element (photoelectric conversion surface) which is provided near an image forming surface. The object image which has been received optically by the image pickup element is displayed on the liquid-crystal display monitor 47 which is provided to a rear surface of the camera, as an electronic image by a processing means. Moreover, it is possible to record the electronic image which has been photographed, in a storage means.

Figure 34:
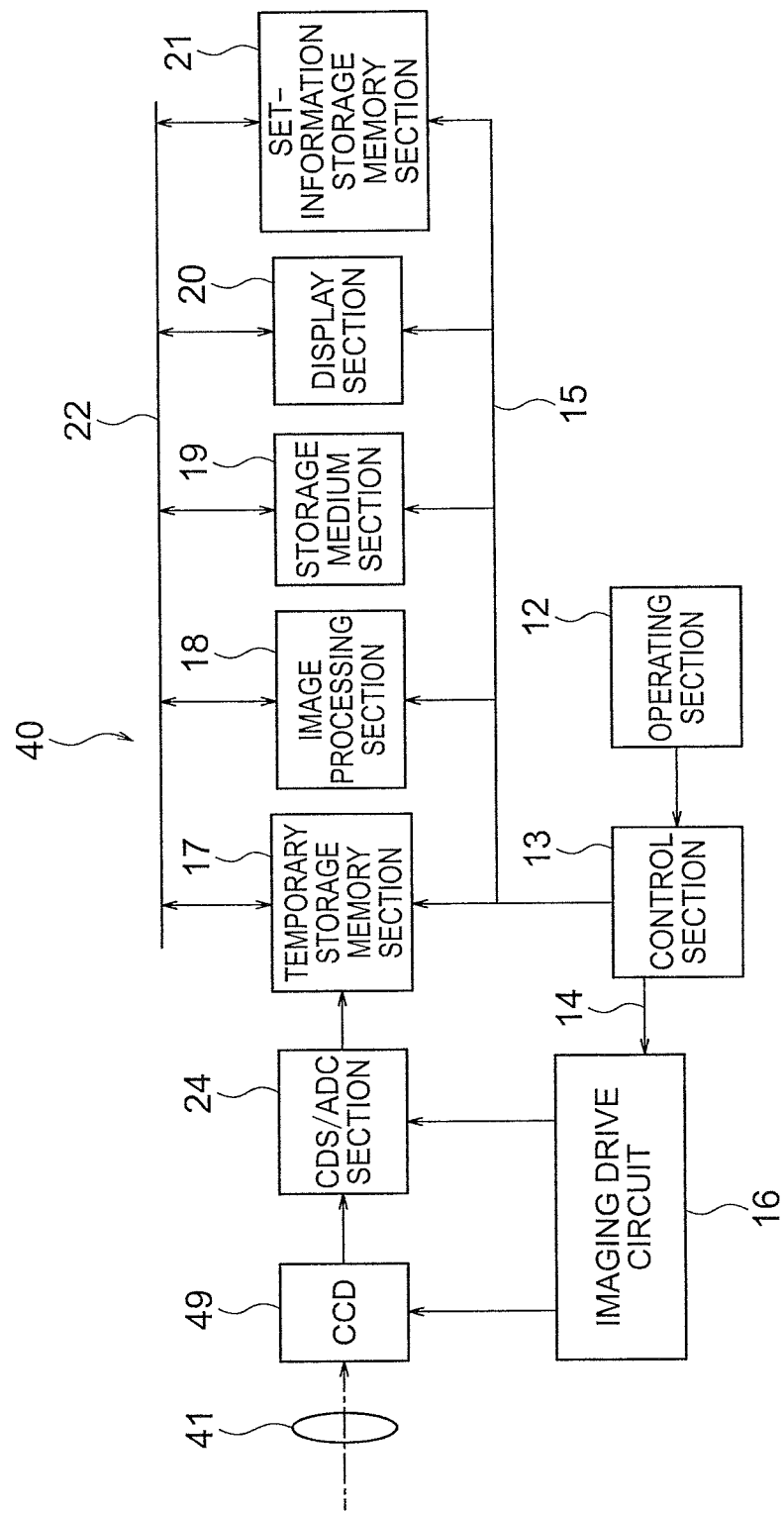
FIG. 34 is a structural block diagram of an internal circuit of main components of the image pickup apparatus.

FIG. 34 is a structural block diagram of an internal circuit of main components of the digital camera 40. In the following description, the processing means described above includes for instance, a CDS/ADC section 24, a temporary storage memory 117, and an image processing section 18, and a storage means consists of a storage medium section 19 for example.

As shown in FIG. 34, the digital camera 40 includes an operating section 12, a control section 13 which is connected to the operating section 12, the temporary storage memory 17 and an imaging drive circuit 16 which are connected to a control-signal output port of the control section 13, via a bus 14 and a bus 15, the image processing section 18, the storage medium section 19, a display section 20, and a set-information storage memory section 21.

The temporary storage memory 17, the image processing section 18, the storage medium section 19, the display section 20, and the set-information storage memory section 21 are structured to be capable of mutually inputting and outputting data via a bus 22. Moreover, the CCD 49 and the CDS/ADC section 24 are connected to the imaging drive circuit 16.

The operating section 12 includes various input buttons and switches, and informs the control section 13 of event information which is input from outside (by a user of the digital camera) via these input buttons and switches. The control section 13 is a central processing unit (CPU), and has a built-in computer program memory which is not shown in the diagram. The control section 13 controls the entire digital camera 40 according to a computer program stored in this computer program memory.

The CCD 49 is driven and controlled by the imaging drive circuit 16, and which converts an amount of light for each pixel of the object image formed by the photographic optical system 41 to an electric signal, and outputs to the CDS/ADC section 24.

The CDS/ADC section 24 is a circuit which amplifies the electric signal which is input from the CCD 49, and carries out analog/digital conversion, and outputs to the temporary storage memory 17 image raw data (Bayer data, hereinafter called as 'RAW data') which is only amplified and converted to digital data.

The temporary storage memory 17 is a buffer which includes an SDRAM (Synchronous Dynamic Random Access Memory) for example, and is a memory device which stores temporarily the RAW data which is output from the CDS/ADC section 24. The image processing section 18 is a circuit which reads the RAW data stored in the temporary storage memory 17, or the RAW data stored in the storage medium section 19, and carries out electrically various image-processing including the distortion correction, based on image-quality parameters specified by the control section 13.

The storage medium section 19 is a recording medium in the form of a card or a stick including a flash memory for instance, detachably mounted. The storage medium section 19 records and maintains the RAW data transferred from the temporary storage memory 17 and image data subjected to image processing in the image processing section 18 in the card flash memory and the stick flash memory.

The display section 20 includes the liquid-crystal display monitor, and displays photographed RAW data, image data and operation menu on the liquid-crystal display monitor. The set-information storage memory section 21 includes a ROM section in which various image quality parameters are stored in advance, and a RAM section which stores image quality parameters which are selected by an input operation on the operating section 12, from among the image quality parameters which are read from the ROM section.

By using the zoom lens according to the example as the photographic optical system 41, it is possible to let the digital camera 40 configured in such manner to be an image pickup apparatus which is suitable for video photography while being bright and small-sized with an improved performance.

The present invention can have various modified examples without departing from the scope of the invention. Moreover, shapes of lenses and the number of lenses are not necessarily restricted to the shapes and the number of lenses indicated in the examples. In the examples described heretofore, the cover glass C may not be disposed necessarily. A lens that is not shown in the diagrams of the examples described above, and that does not have a refractive power practically may be disposed in a lens unit or outside the lens unit. In each of the examples described above, it is possible to make an arrangement such that the zoom lens includes five lens units practically.

According to the present invention, it is possible to provide a zoom lens having a short overall length, in which various aberrations are corrected favorably, while having a wide angle of view and high zoom ratio, and an image pickup apparatus using such zoom lens.

As described above, the present invention is suitable for a zoom lens having a short overall length, in which various aberrations are corrected favorably, while having a wide angle of view and a high zoom ratio, and for an image pickup apparatus using such zoom lens.

What is claimed is:

1. A zoom lens comprising in order from an object side:
a first lens unit having a positive refractive power;
a second lens unit having a negative refractive power;
a third lens unit having a positive refractive power;
a fourth lens unit having a negative refractive power; and
a fifth lens unit having a positive refractive power,
wherein:
the zoom lens does not include diffractive optical elements,
each of a distance between the first lens unit and the second lens unit and a distance between the second lens unit and the third lens unit changes when the zoom lens zooms from a wide angle end to a telephoto end,
the first lens unit includes a positive lens, and
the second lens unit includes a positive lens, and the following conditional expressions (1), (2), (3), and (4) are satisfied:

$$-0.015 \leq Tp_{2G\_min\_p} \leq 0.015 \quad (1),$$

$$70.3 \leq vd_{1G\_max\_p} \quad (2),$$

$$1.76 \leq nd_{2G\_max\_p} \leq 2.3 \quad (3), \text{ and}$$

$$0.3 \leq |f_2/f_3| \leq 0.9 \quad (4)$$

where,
$Tp_{2G\_min\_p} = \theta gF_{2G\_p} - (-0.0016 \times vd_{2G\_p} + 0.6415)$,
$\theta gF_{2G\_p} = (ng_{2G\_p} - nF_{2G\_p})/(nF_{2G\_p} - nC_{2G\_p})$
$vd_{2G\_p}$ denotes Abbe number for a predetermined positive lens in the second lens unit,
$ng_{2G\_p}$, $nF_{2G\_p}$, and $nC_{2G\_p}$ denote refractive indices of the predetermined positive lens in the second lens unit, for a g-line, for an F-line, and for a C-line respectively, here
the predetermined positive lens in the second lens unit is a lens for which Abbe number is the smallest, from among the positive lenses in the second lens unit,
$vd_{1G\_max\_p}$ denotes a maximum Abbe number from among Abbe numbers for the positive lenses in the first lens unit,
$nd_{2G\_max\_p}$ denotes a maximum refractive index from among refractive indices of the positive lenses in the second lens unit,
$f_2$ denotes a focal length of the second lens unit, and
$f_3$ denotes a focal length of the third lens unit.

2. The zoom lens according to claim 1, wherein the following conditional expression (4') is satisfied:

$$0.3 \leq |f_2/f_3| \leq 0.89 \quad (4')$$

where,
$f_2$ denotes the focal length of the second lens unit, and
$f_3$ denotes the focal length of the third lens unit.

3. The zoom lens according to claim 1, wherein the following conditional expression (5) is satisfied $$2.0 \leq f_1/f_3 \leq 6.3 \quad (5)$$

where,
$f_1$ denotes a focal length of the first lens unit, and
$f_3$ denotes the focal length of the third lens unit.

4. The zoom lens according to claim 1, wherein the following conditional expression (6) is satisfied $$1.05 \leq |\Phi_{maxt}/f_2| \leq 3.0 \quad (6)$$

where,
$\Phi_{maxt}$ denotes a maximum diameter of an entrance pupil at the telephoto end, and is expressed by $\Phi_{maxt} = f_t/Fno_t$, here
$f_t$ denotes a focal length of the overall zoom lens system at the telephoto end, and
$Fno_t$ denotes a smallest F-number at the telephoto end, and
$f_2$ denotes the focal length of the second lens unit.

5. The zoom lens according to claim 1, wherein:
the second lens unit includes at least a negative lens and a positive lens, and
the following conditional expression (7') is satisfied $$55 \leq vd_{2G\_max\_n} \quad (7'):$$

where,
$vd_{2G\_max\_n}$ denotes a maximum Abbe number from among Abbe numbers for the negative lenses in the second lens unit.

6. The zoom lens according to claim 1, wherein the following conditional expression (11) is satisfied:

$$-0.012 \leq Tp_{2G\_max\_n} \leq 0.06 \quad (11)$$

where,
$Tp_{2G\_max\_n} = \theta gF_{2G\_n} - (-0.0016 \times vd_{2G\_n} + 0.6415)$,
$\theta gF_{2G\_n} = (ng_{2G\_n} - nF_{2G\_n})/(nF_{2G\_n} - nC_{2G\_n})$
$vd_{2G\_n}$ denotes Abbe number for a predetermined negative lens in the second lens unit, and
$ng_{2G\_n}$, $nF_{2G\_n}$, and $nC_{2G\_n}$ denote refractive indices of the predetermined negative lens in the second lens unit, for a g-line, for an F-line, and for a C-line respectively, here
the predetermined negative lens in the second lens unit is a lens for which Abbe number is the largest, from among the negative lenses in the second lens unit.

7. The zoom lens according to claim 1, wherein the following conditional expression (8) is satisfied:

$$63 \leq vd_{3G\_max\_p} \quad (8)$$

where,
$vd_{3G\_max\_p}$ denotes a maximum Abbe number from among Abbe numbers for the positive lenses in the third lens unit.

8. The zoom lens according to claim 1, wherein the following conditional expression (13) is satisfied:

$$0.005 \leq Tp_{3G\_max\_p} \leq 0.06 \quad (13)$$

where,
$Tp_{3G\_max\_p} = \theta gF_{3G\_p} - (-0.0016 \times vd_{3G\_p} + 0.6415)$,
$\theta gF_{3G\_p} = (ng_{3G\_p} - nF_{3G\_p})/(nF_{3G\_p} - nC_{3G\_p})$
$vd_{3G\_p}$ denotes Abbe number for a predetermined positive lens in the third lens unit, and
$ng_{3G\_p}$, $nF_{3G\_p}$, and $nC_{3G\_p}$ denote refractive indices of the predetermined positive lens in the third lens unit, for a g-line, for an F-line, and for a C-line respectively, here
the predetermined positive lens in the third lens unit is a lens for which Abbe number is the largest, from among the positive lenses in the third lens unit.

9. The zoom lens according to claim 1, wherein the following conditional expression (9) is satisfied:

$$1.0 \leq vd_{4G\_max\_n} - vd_{4G\_min\_p} \leq 50 \quad (9)$$

where,
$vd_{4G\_max\_n}$ denotes a maximum Abbe number from among Abbe numbers for the negative lenses in the fourth lens unit, and
$vd_{4G\_min\_p}$ denotes a minimum Abbe number from among Abbe numbers for the positive lenses in the fourth lens unit.

10. The zoom lens according to claim 1, wherein the following conditional expression (14) is satisfied:

$$1.0 \leq LTL_t/f_t \leq 2.8 \quad (14)$$

where,
$LTL_t$ denotes a total length of the overall zoom lens system at the telephoto end, and
$f_t$ denotes a focal length of the overall zoom lens system at the telephoto end.

11. The zoom lens according to claim 1, wherein the following conditional expression (15) is satisfied:

$$0.7 \leq LTL_w/f_t \leq 2.2 \quad (15)$$

where,
$LTL_w$ denotes a total length of the overall zoom lens system at the wide angle end, and $f_t$ denotes a focal length of the overall zoom lens system at the telephoto end.

12. The zoom lens according to claim 1, wherein the following conditional expression (16) is satisfied:

$$0.7 \le f_1/f_t \le 1.6 \quad (16)$$

where, $f_1$ denotes a focal length of the first lens unit, and
$f_t$ denotes a focal length of the overall zoom lens system at the telephoto end.

13. The zoom lens according to claim 1, wherein the following conditional expression (17) is satisfied:

$$0.005 \le Tp_{1G\_max\_p} \le 0.06 \quad (17)$$

where, $Tp_{1G\_max\_p} = \theta gF_{1G\_p} - (-0.0016 \times vd_{1G\_p} + 0.6415)$,
$\theta gF_{1G\_p} = (ng_{1G\_p} - nF_{1G\_p})/(nF_{1G\_p} - nC_{1G\_p})$
$vd_{1G\_p}$ denotes Abbe number for a predetermined positive lens in the first lens unit, and
$ng_{1G\_p}$, $nF_{1G\_p}$, and $nC_{1G\_p}$ denote refractive indices of the predetermined positive lens in the first lens unit, for a g-line, for an F-line, and for a C-line respectively, and here
the predetermined positive lens in the first lens unit is a lens for which Abbe number is the largest, from among the positive lenses in the first lens unit.

14. The zoom lens according to claim 1, wherein the fourth lens unit is a focusing lens unit.

15. The zoom lens according to claim 1, wherein the second lens unit includes at least two negative lenses and one positive lens.

16. The zoom lens according to claim 1, wherein the following conditional expression (12') is satisfied:

$$1.73 \le nd_{2G\_max\_n} \le 2.3 \quad (12')$$

where, $nd_{2G\_max\_n}$ denotes a maximum refractive index from among refractive indices of the negative lenses in the second lens unit.

17. The zoom lens according to claim 1, wherein:
the second lens unit includes a negative lens having a concave surface directed toward the image side, which is positioned nearest to object, and
in the negative lens which is positioned nearest to object, an absolute value of a radius of curvature of an image-side surface is smaller as compared to an absolute value of a radius of curvature of an object-side surface, and
the following conditional expression (18) is satisfied:

$$1.73 \le nd_{2G\_n1} \le 2.3 \quad (18)$$

where, $nd_{2G\_n1}$ denotes a refractive index of the negative lens nearest to object in the second lens unit.

18. The zoom according to claim 1, wherein:
the third lens unit includes a positive lens for image stabilization, and
an image shift due to camera shake is corrected by shifting the positive lens for image stabilization in a direction perpendicular to an optical axis.

19. The zoom lens according to claim 18, wherein:
the third lens unit includes a negative lens for image stabilization, and
the following conditional expression (19) is satisfied:

$$6 \le vd_{G3\_IS\_p} - vd_{G3\_IS\_n} \le 65 \quad (19)$$

where, $vd_{G3\_IS\_p}$ denotes a maximum Abbe number from among Abbe numbers for the positive lens for image stabilization, and
$vd_{G3\_IS\_n}$ denotes a minimum Abbe number from among Abbe numbers for the negative lens for image stabilization.

20. The zoom lens according to claim 1, wherein:
the second lens unit includes at least a negative lens and a positive lens, and
the following conditional expression (20) is satisfied:

$$15 \le vd_{G2\_min\_p} \le 32 \quad (20)$$

where, $vd_{G2\_min\_p}$ denotes a minimum Abbe number from among Abbe numbers for the positive lenses in the second lens unit.

21. The zoom lens according to claim 1, wherein the first lens unit includes at least one negative lens and two positive lenses.

22. The zoom lens according to claim 1, wherein:
the second lens unit includes in order from the object side to the image side, a negative lens having a concave surface directed toward the image side, a negative lens, and a positive lens having a convex surface directed toward the image side, and
in the negative lens having the concave surface directed toward the image side, an absolute value of a radius of curvature of an image-side surface is smaller as compared to an absolute value of a radius of curvature of an object-side surface.

23. The zoom lens according to claim 1, wherein the first lens unit moves to be positioned on the object side at the telephoto end than at the wide angle end.

24. The zoom lens according to claim 1, wherein an aperture stop is disposed between the second lens unit and the third lens unit.

25. The zoom lens according to claim 1, wherein a lens component is a single lens, a cemented lens, or a compound lens, and
the third lens unit includes at least two lens components having a positive refractive power.

26. The zoom lens according to claim 1, wherein the following conditional expression (21) is satisfied:

$$-2.5 \le f_t/\exp_t \le 0.6 \quad (21)$$

where, $f_t$ denotes a focal length of the overall zoom lens system at the telephoto end, and
$\exp_t$ denotes a distance from a paraxial image forming surface up to an exit pupil of the zoom lens at the telephoto end.

27. An image pickup apparatus comprising:
a zoom lens according to claim 1; and
an image pickup element which has an image pickup surface.

28. The zoom lens according to claim 1, wherein the total number of lens units in the zoom lens is five.

29. The zoom lens according to claim 1, wherein the fourth lens unit includes a positive lens and a negative lens.

30. The zoom lens according to claim 1, wherein at a time of zooming from the wide angle end to the telephoto end, each of the first lens unit, the second lens unit, the third lens unit, the fourth lens unit, and the fifth lens unit moves to change distances between the lens units.

31. The zoom lens according to claim 1, wherein the fourth lens unit moves at a time of zooming.

32. The zoom lens according to claim 1, wherein the following conditional expression (1') is satisfied:

$$-0.015 \leq Tp_{2G\_min\_p} \leq 0.014 \quad (1')$$

where,
$Tp_{2G\_min\_p} = \theta gF_{2G\_p} - (-0.0016 \times vd_{2G\_p} + 0.6415)$,
$\theta gF_{2G\_p} = (ng_{2G\_p} - nF_{2G\_p})/(nF_{2G\_p} - nC_{2G\_p})$
$vd_{2G\_p}$ denotes Abbe number for a predetermined positive lens in the second lens unit,
$ng_{2G\_p}$, $nF_{2G\_p}$, and $nC_{2G\_p}$ denote refractive indices of the predetermined positive lens in the second lens unit, for a g-line, for an F-line, and for a C-line respectively, here
the predetermined positive lens in the second lens unit is a lens for which Abbe number is the smallest, from among the positive lenses in the second lens unit.

33. A zoom lens comprising in order from an object side:
a first lens unit having a positive refractive power;
a second lens unit having a negative refractive power;
a third lens unit having a positive refractive power;
a fourth lens unit having a negative refractive power; and
a fifth lens unit having a positive refractive power,
wherein:
the zoom lens does not include diffractive optical elements,
each of a distance between the first lens unit and the second lens unit and a distance between the second lens unit and the third lens unit changes when the zoom lens zooms from a wide angle end to a telephoto end,
the first lens unit includes a positive lens, and
the second lens unit includes a positive lens, and
the following conditional expressions (1), (2'), (3'), and (5) are satisfied:

$$-0.015 \leq Tp_{2G\_min\_p} \leq 0.015 \quad (1),$$

$$70.5 \leq vd_{1G\_max\_p} \quad (2'),$$

$$1.7 \leq nd_{2G\_max\_p} \leq 2.3 \quad (3'), \text{ and}$$

$$2.0 \leq f_1/f_3 \leq 6.3 \quad (5)$$

where,
$Tp_{2G\_min\_p} = \theta gF_{2G\_p} - (-0.0016 \times vd_{2G\_p} + 0.6415)$,
$\theta gF_{2G\_p} = (ng_{2G\_p} - nF_{2G\_p})/(nF_{2G\_p} - nC_{2G\_p})$
$vd_{2G\_p}$ denotes Abbe number for a predetermined positive lens in the second lens unit,
$ng_{2G\_p}$, $nF_{2G\_p}$, and $nC_{2G\_p}$ denote refractive indices of the predetermined positive lens in the second lens unit, for a g-line, for an F-line, and for a C-line respectively, here
the predetermined positive lens in the second lens unit is a lens for which Abbe number is the smallest, from among the positive lenses in the second lens unit,
$vd_{1G\_max\_p}$ denotes a maximum Abbe number from among Abbe numbers for the positive lenses in the first lens unit,
$nd_{2G\_max\_p}$ denotes a maximum refractive index from among refractive indices of the positive lenses in the second lens unit,
$f_1$ denotes a focal length of the first lens unit, and
$f_3$ denotes a focal length of the third lens unit.

34. A zoom lens comprising in order from an object side:
a first lens unit having a positive refractive power;
a second lens unit having a negative refractive power;
a third lens unit having a positive refractive power;
a fourth lens unit having a negative refractive power; and
a fifth lens unit having a positive refractive power,
wherein:
the zoom lens does not include diffractive optical elements,
each of a distance between the first lens unit and the second lens unit and a distance between the second lens unit and the third lens unit changes when the zoom lens zooms from a wide angle end to a telephoto end,
the first lens unit includes a positive lens, and
the second lens unit includes a positive lens, and
the following conditional expressions (1), (2"), (3'), and (6) are satisfied:

$$-0.015 \leq Tp_{2G\_min\_p} \leq 0.015 \quad (1),$$

$$64 \leq vd_{1G\_max\_p} \quad (2"),$$

$$1.7 \leq nd_{2G\_max\_p} \leq 2.3 \quad (3'), \text{ and}$$

$$1.05 \leq |\Phi_{maxt}/f_2| \leq 3.0 \quad (6)$$

where,
$Tp_{2G\_min\_p} = \theta gF_{2G\_p} - (-0.0016 \times vd_{2G\_p} + 0.6415)$,
$\theta gF_{2G\_p} = (ng_{2G\_p} - nF_{2G\_p})/(nF_{2G\_p} - nC_{2G\_p})$
$vd_{2G\_p}$ denotes Abbe number for a predetermined positive lens in the second lens unit,
$ng_{2G\_p}$, $nF_{2G\_p}$, and $nC_{2G\_p}$ denote refractive indices of the predetermined positive lens in the second lens unit, for a g-line, for an F-line, and for a C-line respectively, here
the predetermined positive lens in the second lens unit is a lens for which Abbe number is the smallest, from among the positive lenses in the second lens unit,
$vd_{1G\_max\_p}$ denotes a maximum Abbe number from among Abbe numbers for the positive lenses in the first lens unit,
$nd_{2G\_max\_p}$ denotes a maximum refractive index from among refractive indices of the positive lenses in the second lens unit,
$\Phi_{maxt}$ denotes a maximum diameter of an entrance pupil at the telephoto end, and is expressed by $\Phi_{maxt} = f_t/Fno_t$, here
$f_t$ denotes a focal length of the overall zoom lens system at the telephoto end, and
$Fno_t$ denotes a smallest F-number at the telephoto end, and
$f_2$ denotes a focal length of the second lens unit.

35. A zoom lens comprising in order from an object side:
a first lens unit having a positive refractive power;
a second lens unit having a negative refractive power;
a third lens unit having a positive refractive power;
a fourth lens unit having a negative refractive power; and
a fifth lens unit having a positive refractive power,
wherein:
the zoom lens does not include diffractive optical elements,
each of a distance between the first lens unit and the second lens unit and a distance between the second lens unit and the third lens unit changes when the zoom lens zooms from a wide angle end to a telephoto end,
the first lens unit includes a positive lens, and
the second lens unit includes a negative lens, and
the third lens unit includes a positive lens, and
the second lens unit includes a negative lens having a concave surface directed toward an image side, which is positioned nearest to object, and
in the negative lens which is positioned nearest to object, an absolute value of a radius of curvature of an image-side surface is smaller as compared to an absolute value of a radius of curvature of an object-side surface, and the following conditional expressions (2), (7'), (8'), (11), and (12) are satisfied:

$$70.3 \leq vd_{1G\_max\_p} \quad (2),$$

$$55 \leq vd_{2G\_max\_n} \quad (7'),$$

$$70.5 \leq vd_{3G\_max\_p} \quad (8'),$$

$$-0.012 \leq Tp_{2G\_max\_n} \leq 0.06 \quad (11), \text{ and}$$

$$1.78 \leq nd_{2G\_max\_n} \leq 2.3 \quad (12)$$

where, $vd_{1G\_max\_p}$ denotes a maximum Abbe number from among Abbe numbers for the positive lenses in the first lens unit, $vd_{2G\_max\_n}$ denotes a maximum Abbe number from among Abbe numbers for the negative lenses in the second lens unit, $vd_{3G\_max\_p}$ denotes a maximum Abbe number from among Abbe numbers for the positive lenses in the third lens unit, $Tp_{2G\_max\_n} = \theta gF_{2G\_n} - (-0.0016 \times vd_{2G\_n} + 0.6415)$, $\theta gF_{2G\_n} = (ng_{2G\_n} - nF_{2G\_n})/(nF_{2G\_n} - nC_{2G\_n})$ $vd_{2G\_n}$ denotes Abbe number for a predetermined negative lens in the second lens unit, $ng_{2G\_n}$, $nF_{2G\_n}$, and $nC_{2G\_n}$ denote refractive indices of the predetermined negative lens in the second lens unit, for a g-line, for an F-line, and for a C-line respectively, here the predetermined negative lens in the second lens unit is a lens for which Abbe number is the largest, from among the negative lenses in the second lens unit, and $nd_{2G\_max\_n}$ denotes a maximum refractive index from among refractive indices of the negative lenses in the second lens unit.

* * * * *